US009098964B2

(12) United States Patent
Kelly

(10) Patent No.: US 9,098,964 B2
(45) Date of Patent: Aug. 4, 2015

(54) PLAYER GAMING CONSOLE, GAMING MACHINE, NETWORKED GAMING SYSTEM

(75) Inventor: Bryan M. Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 1294 days.

(21) Appl. No.: 12/264,203

(22) Filed: Nov. 3, 2008

(65) Prior Publication Data

US 2009/0131143 A1 May 21, 2009

Related U.S. Application Data

(63) Continuation-in-part of application No. 11/938,666, filed on Nov. 12, 2007, now abandoned, and a continuation-in-part of application No. 11/470,606, filed on Sep. 6, 2006, now Pat. No. 8,678,902, and a continuation-in-part of application No. 10/943,771, filed on Sep. 16, 2004, now Pat. No. 7,950,999, and a continuation-in-part of application No. 11/065,757, filed on Feb. 24, 2005, now Pat. No. 7,749,076.

(60) Provisional application No. 60/987,402, filed on Nov. 12, 2007, provisional application No. 60/865,649, filed on Nov. 14, 2006.

(51) Int. Cl.
*A63F 13/30* (2014.01)
*G07F 17/32* (2006.01)

(52) U.S. Cl.
CPC ............ *G07F 17/32* (2013.01); *G07F 17/3227* (2013.01); *G07F 17/3239* (2013.01); *G07F 17/3267* (2013.01)

(58) Field of Classification Search
CPC . G07F 17/32; G07F 17/3244; G07F 17/3258; G07F 17/3267
USPC .......................................... 463/16, 20, 40–42
See application file for complete search history.

(56) References Cited

U.S. PATENT DOCUMENTS

| | | | | |
|---|---|---|---|---|
| 7,758,423 | B2 | 7/2010 | Foster et al. | |
| 2007/0117608 | A1 * | 5/2007 | Roper et al. | 463/16 |
| 2009/0124365 | A1 * | 5/2009 | Surmacz et al. | 463/27 |
| 2010/0137052 | A1 * | 6/2010 | Bennett | 463/16 |

* cited by examiner

*Primary Examiner* — Ronald Laneau
*Assistant Examiner* — Ross Williams
(74) *Attorney, Agent, or Firm* — Brooke W. Quist; Marvin A. Hein; Philip J. Anderson

(57) ABSTRACT

Games, networked gaming systems, gaming machines and methods are disclosed that provide various player-centric games and rewards the casino patrons, as well as systems games, rewards, and tournaments to the casino patrons.

15 Claims, 65 Drawing Sheets

*A light illuminates for each accrued threshold counter.*

*The reward level increments as play points are earned. The number of play points a play has earned once a game starts determines the paytable used for the game.*

*When all the green lights are lit up, the Play Game button illuminates. This indicates that the game play threshold has been met to play a bonus game.*

PLAYER GAMING CONSOLE, GAMING MACHINE, NETWORKED GAMING SYSTEM

CROSS-REFERENCE TO RELATED APPLICATIONS

This application claims the benefit of Provisional Patent Application No. 60/987,402, filed Nov. 12, 2007, which is hereby incorporated by reference. This application is a continuation-in-part of U.S. patent application Ser. No. 11/938,666, filed Nov. 12, 2007, entitled PLAYER GAMING CONSOLE, GAMING MACHINE, NETWORKED GAMING SYSTEM AND METHOD, which claims the benefit of Provisional Patent Application No. 60/865,649, filed Nov. 14, 2006, both of which are hereby incorporated by reference. This application is a continuation-in-part of U.S. patent application Ser. No. 11/470,606, filed Sep. 6, 2006, entitled SYSTEM GAMING APPARATUS AND METHOD, which is hereby incorporated herein by reference. This application is a continuation-in-part of U.S. patent application Ser. No. 10/943,771 filed Sep. 16, 2004, entitled USER INTERFACE SYSTEM AND METHOD FOR A GAMING MACHINE, which is hereby incorporated herein by reference. This application is also a continuation-in-part of U.S. patent application Ser. No. 11/065,757, filed Feb. 24, 2005, entitled SYSTEM AND METHOD FOR AN ALTERABLE STORAGE MEDIA IN A GAMING MACHINE, which is hereby incorporated herein by reference. This application is related to copending U.S. patent application Ser. No. 12/264,192, filed Nov. 3, 2008, entitled PLAYER GAMING CONSOLE, GAMING MACHINE, NETWORKED GAMING METHOD, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This disclosure relates to wagering games, and more specifically to networked gaming systems and methods which offer or provide games, such as systems-based games, to players based on player patronage, or networked systems-based games.

BACKGROUND

Modern gaming establishments offer a variety of electronic wagering games including multimedia and/or mechanical slot machines providing video card games, such as poker, blackjack and the like, video keno, video bingo, video pachinko, and various other video or reel-based games. In addition, casinos offer a variety of table games, such as poker, blackjack, craps, roulette, and the like. In many instances, the slot machines and table games are computerized or include electronic circuitry performing various functions, and are connected via a networked gaming environment to a host computer and associated servers. The networking of gaming machines has provided additional gaming opportunities both directly generated within the gaming machine and from network based gaming programs.

Software programs provide gaming establishments with the ability to compile information about casino players, to monitor the status of games, and to provide promotions, bonuses, and rewards. Examples of promotions include advertisements and rewards, which serve as incentives for casino players to continue wagering and to return to the same establishment. These types of rewards and others are popular, and, there continues to be a need to develop creative methods and systems to provide various types of rewards to patrons.

SUMMARY

Briefly, and in general terms, various embodiments are directed to a game, gaming console, gaming machine, or networked gaming system, and associated methods are provided that offer one or more player-centric gaming rewards, such as a bonus game having various thresholds triggered by an accumulation of a player points.

In one embodiment, the system game having a player console includes a rewards level scale associated with rewards amounts achievable in a bonus game, where the player's reward level is determined based on the player's play of a base game.

In accordance with one embodiment, a game, gaming console, gaming machine, networked gaming system, and associated methods are provided that offer one or more system-based games, which may be triggered by various vehicles.

In another embodiment, the system game having a player console includes a tournament mode, where the players may compete for various rewards.

Other features and advantages of the various embodiments will become apparent from the following detailed description when viewed in conjunction with the corresponding drawings.

DETAILED DESCRIPTION

Figure 1:
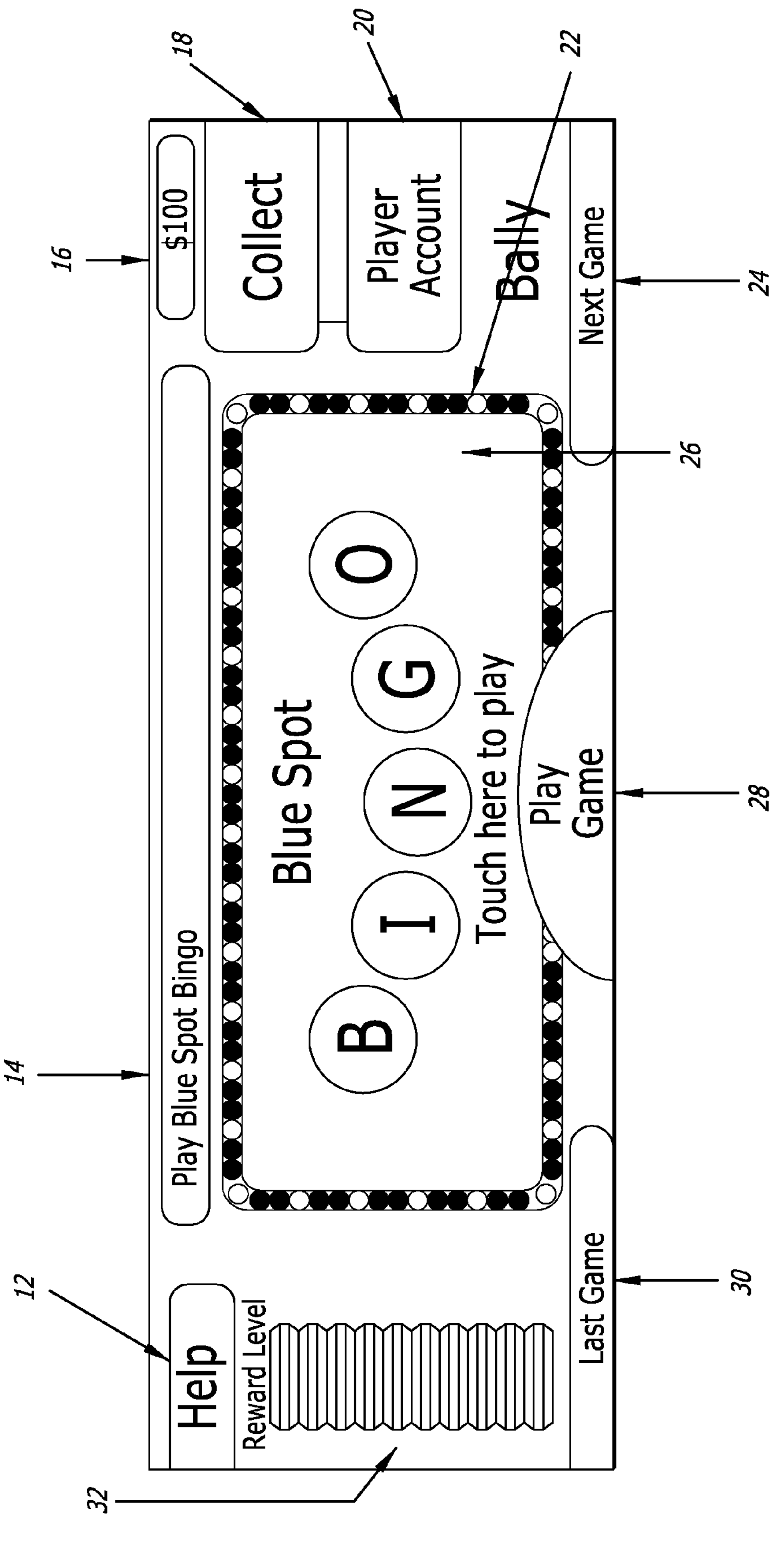
FIG. 1 illustrates a main game panel on a player console in accordance with one or more embodiments.

Referring now to the drawings, wherein like reference numbers denote like or corresponding elements throughout the drawings, and more particularly referring to FIG. 1, player console 101 is shown, such as may be utilized to provide games, such as wagering games, to eligible patrons based upon pre-selected criteria, in accordance with one or more embodiments.

Referring further to FIG. 1, player console 101 may comprise a touch sensitive display and a console processor board and be constructed as part of a player interface unit, such as a commercially available Bally iVIEW, which may include a touch panel display, wherein the display shown on player console 101 in each of the respective figures may be conventionally generated by a microprocessor, digital signal processor, or controller using coding to generate the respective fields shown. The respective fields or areas of the display may be pressure sensitive to allow a player to transmit requests, inquiries, or commands. In another embodiment, there may be keys or buttons that may surround or be situated about the perimeter of the display portion of player console 101. In an embodiment, player console 101 may be conventionally generated on a wireless device, such as a Blackberry cellular phone or a tablet-style laptop computer.

In one or more aspects, player console 101 connects with a gaming apparatus, such as a gaming server or gaming machine, that may include one or more games, such as video games (for example the Blue Spot Bingo game shown in the figures), or electronic card games (such as the Payday poker game shown in the figures). The games may be executed on the gaming server or gaming machine, in which case player console 101 displays the game driven remotely, receives the signals to display the game information, and transmits requests or commands from the player. Player console 101 may have programming imposed restrictions on game play, such as playing thresholds to be achieved by a player prior to the player console game being enabled.

In one or more alternatives, player console 101 may display various games that are available for play, where any of the games may be selected by a player, such as by pressing the surface area in the case of a touch-sensitive display, or by pressing an adjacent button. The game software may reside on a supporting game processor board which may be connected directly to the display portion of player console 101, or the game software or portions thereof may reside on the console processor board. In one or more alternatives, when a player selects a game, the game software may be transmitted from a server or gaming machine onto the console processor board.

Continuing to refer to FIG. 1, player console 101 displays a main panel for a bingo game. In the example panel, the game is Blue Spot Bingo. As part of the display panel, a rewards level accumulator is shown which displays the current player reward level, where the reward level is determined by the amount of games played on the base game. In the example, the player has reached reward level 32 and the reward level scale may be illuminated up to the level achieved. The reward level is determined by the amount played on the base game. For example, reward level 32 may correspond to an eighty percentile level on the scale and eighty percent of the scale may be illuminated green, while the remaining portion may be unlit. The panel further shows a help area 12 which may be pressed to bring forward an informational display panel that may include the rules for playing the game and a paytable. Press to view the rules and the playback table for the displayed bonus game. Also, shown is a name section 14 displaying the name of the current game selected on player console 101 and a central name section with the logo for the game 26.

The central name section of the main panel may include a perimeter of lights 22 which may illuminate as a player plays a base game and earns sufficient playing points to play the bonus game with player console 101. The base game may be a game that is played in the gaming machine that houses player console 101, or it may be any game that a player plays and accumulates points that may be reflected on player console 101. As a player plays one or more base games, the green lights may illuminate sequentially around the perimeter 22 and correspond to playing points accrued by the player. By example, a player may accumulate one player point for every dollar wagered or there may be some other basis connected to the player's wagering. Once all the lights around the perimeter of the central name section have been illuminated, then the player has accumulated sufficient player points to play the bonus game.

The main panel of player console 101 further may include a promotional cash level area 16 providing a display of the promotional cash available to transfer to a game, such as a base game, a player account area 20 that may be touch sensitive to bring forward a player account panel which may contain player points and available funds accessible through a player account which may by example be maintained on a player account server connected over a network with player console 101. The promotional cash level area 16 shows the total amount of promotional cash winnings available for electronic transfer to the game. The main panel may further include a funds collection area 18 that may bring forward a funds request panel. The funds request panel may allow a player to draw funds down to a base game or gaming machine which can then be either used for further wagering or cashed out if the funds have no restrictions. An example of restricted funds are those that may be used only for play on one of the games of a casino operator.

The main panel of player console 101 may further include a game selector area or areas 24 and 30 which may be touch sensitive and enable a player to scroll backward (such as is shown by the area labelled "Last Game 30" referring to a previous game's main panel) or scroll forward (such as by pressing the area labeled "Next Game 24" to view a next bonus game's main panel from a list of available games).

In addition, the main panel of player console 101 may include a game initiator area 28 with a header, such as "Play Game". The game initiator area 28 may be illuminated when sufficient points have been accrued by a player to play the bonus game. Illumination of the game initiator area 28 may alert a player that the player is eligible to play the bonus game. Alternatively, by pressing the button, the player may initiate the sequence shown in FIG. 3 below. At any time before the bonus game begins by selection of the blue spot numbers, a player may return to the main panel and browse for other games of interest.

Figures 1, 14:
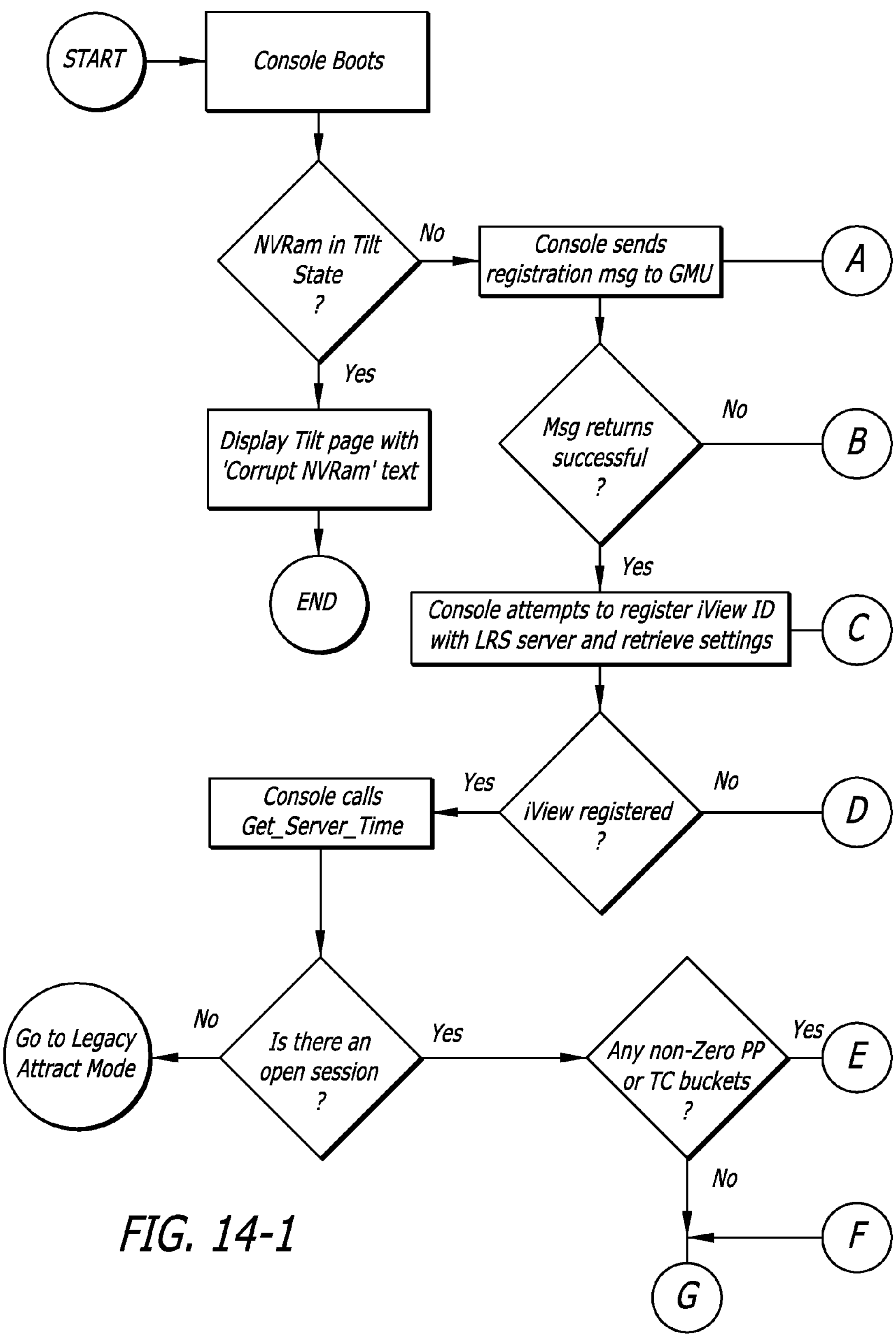
FIG. 14 is a flowchart of the boot-up recovery process of the Live Rewards games on iVIEW.
Figures 2, 14:
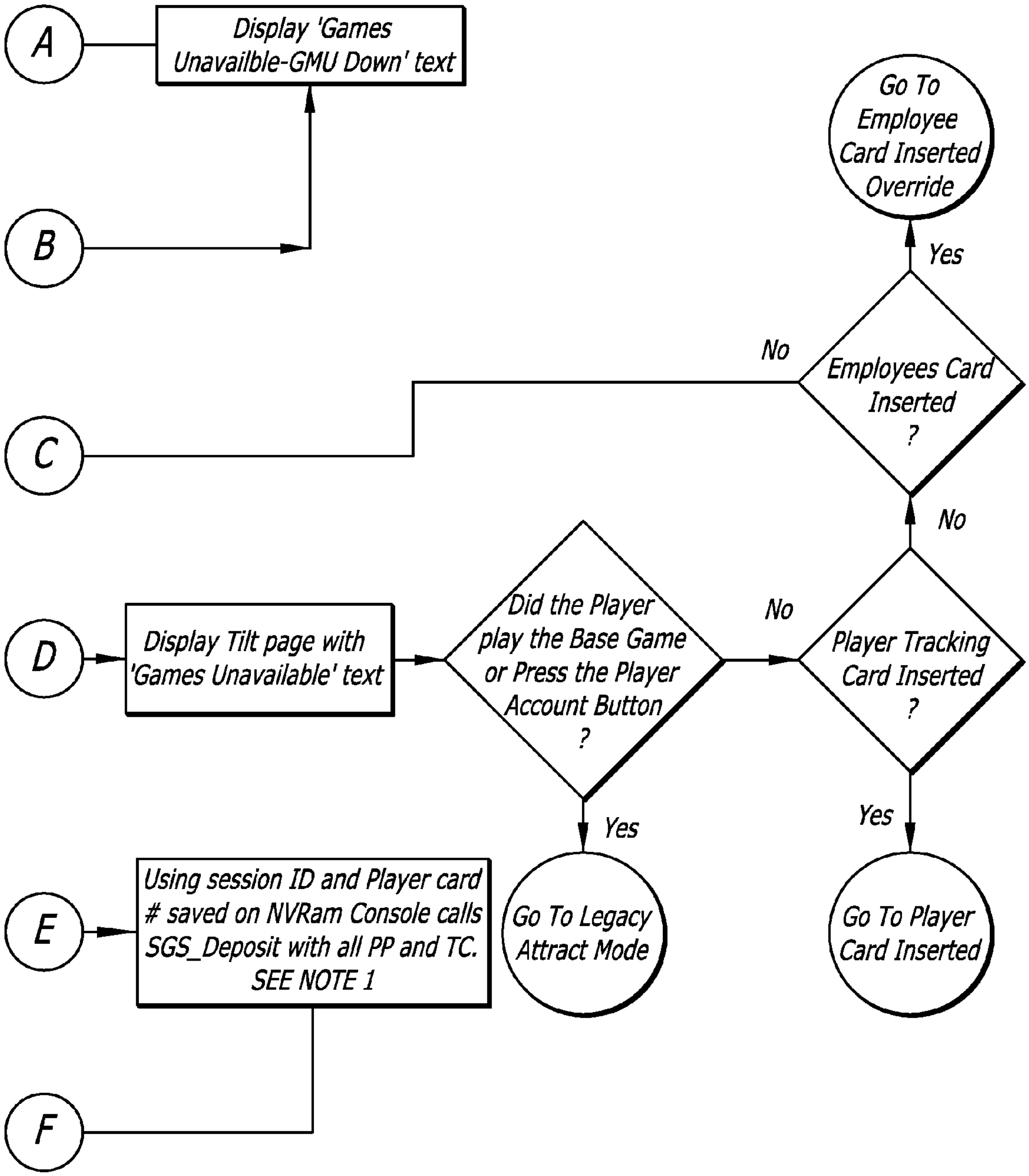
Figures 3, 14:
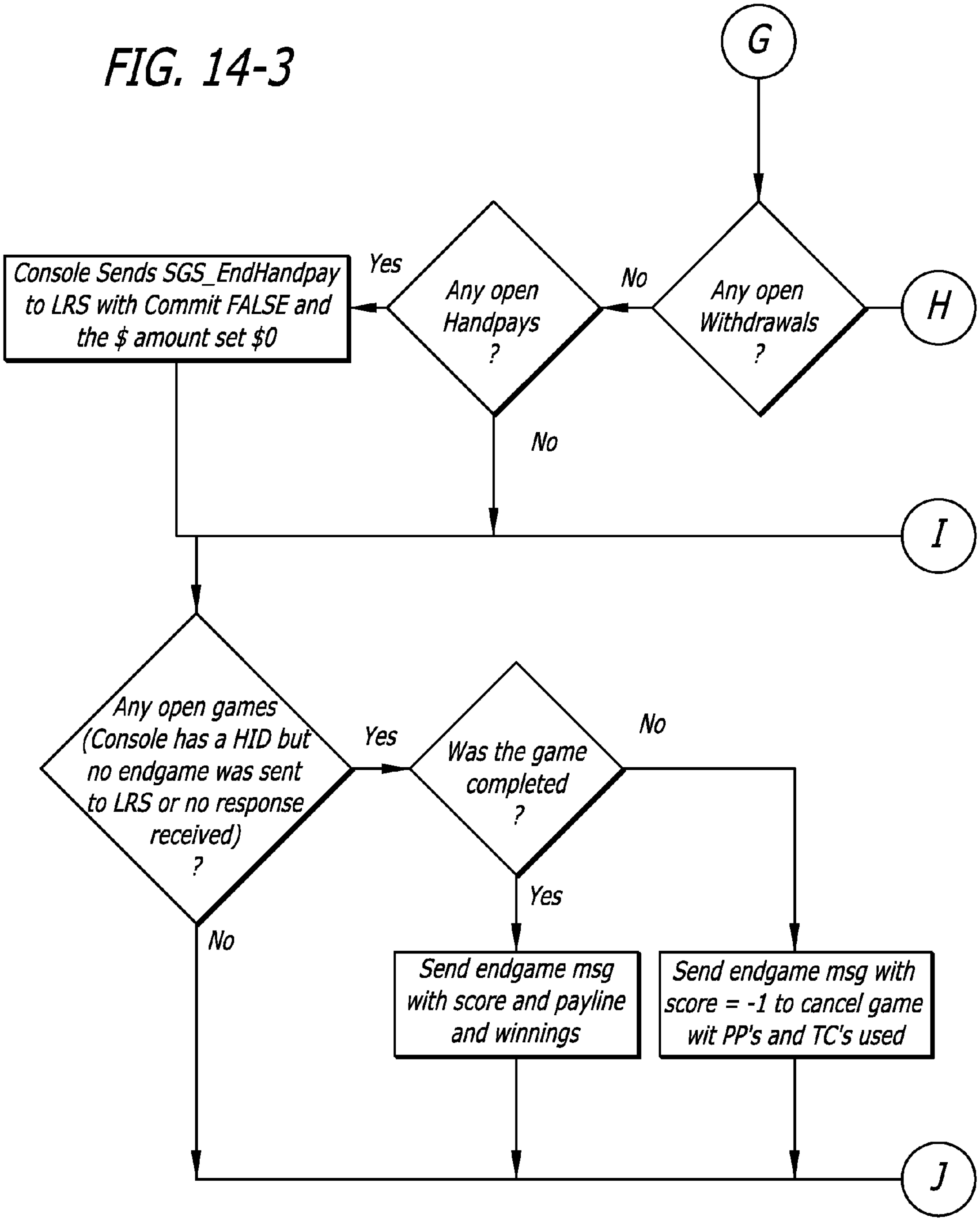
Figures 4, 14:
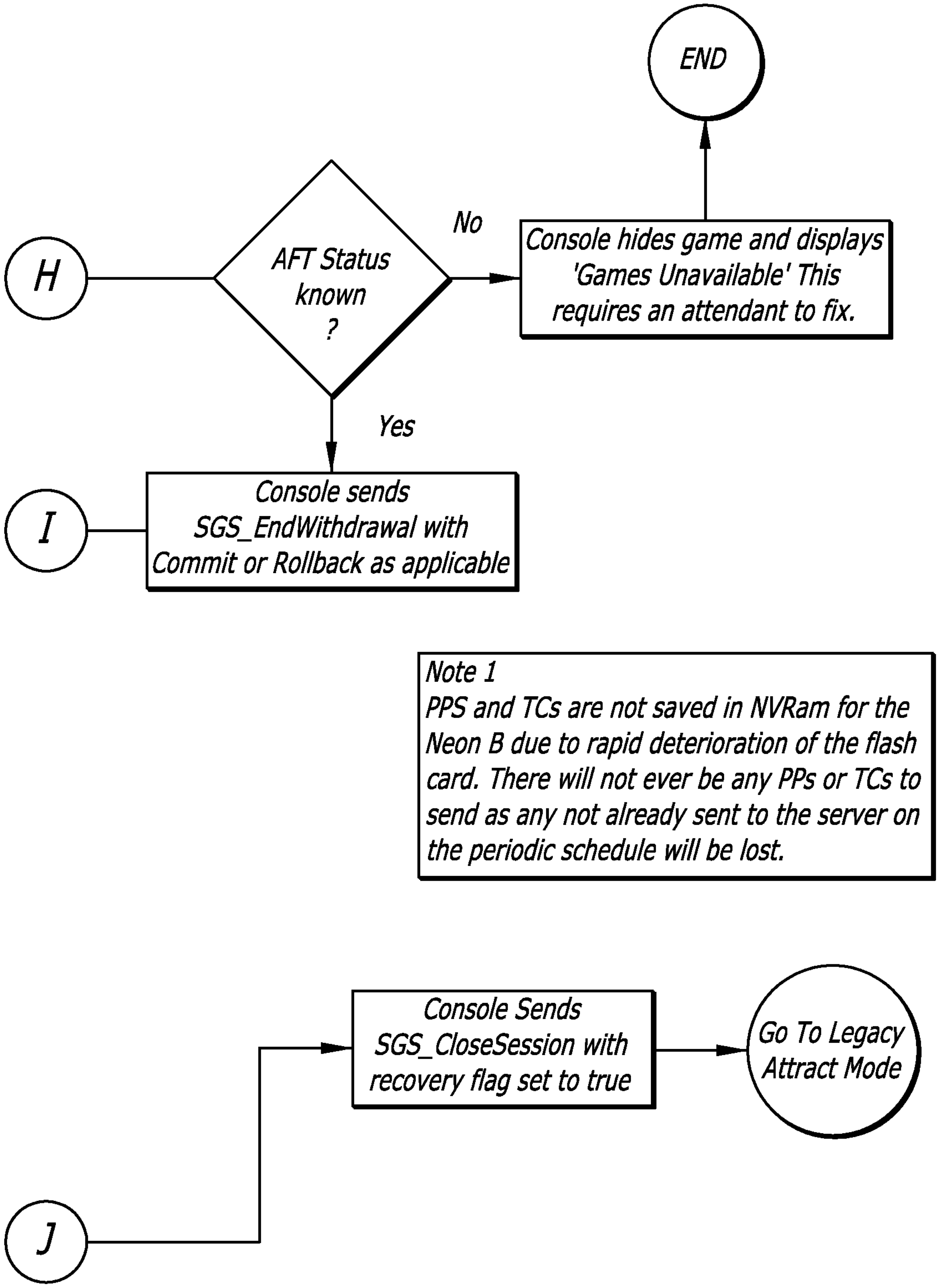

In a further alternative, the player may be required to meet the threshold requirements of FIG. 1 before the player may open the panel shown in FIG. 3 in exchange for the accumulated player points. At this point, the player must continue to play the main game in order to accumulate additional player points to fully initiate the game sequence shown in FIG. 3A-D as described below.

Figure 2A:
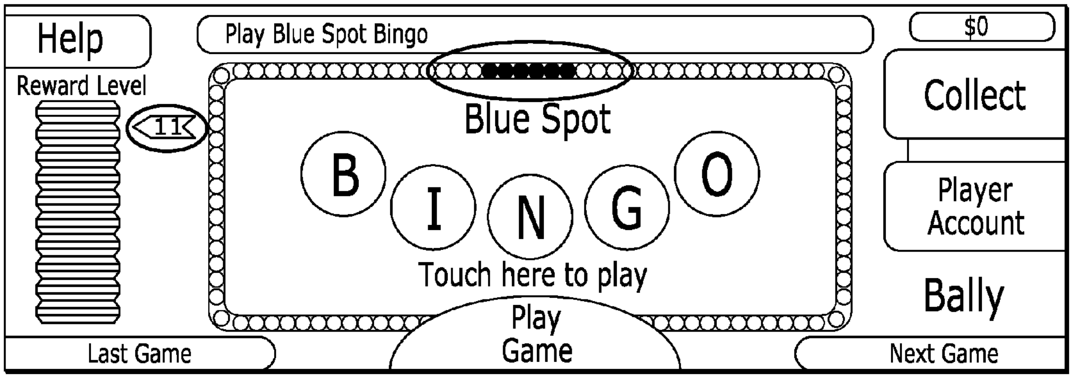
FIGS. 2A, 2B, 2C illustrate a main game panel on a player console at various stages of game play of a game in accordance with one or more embodiments.
Figure 2B:
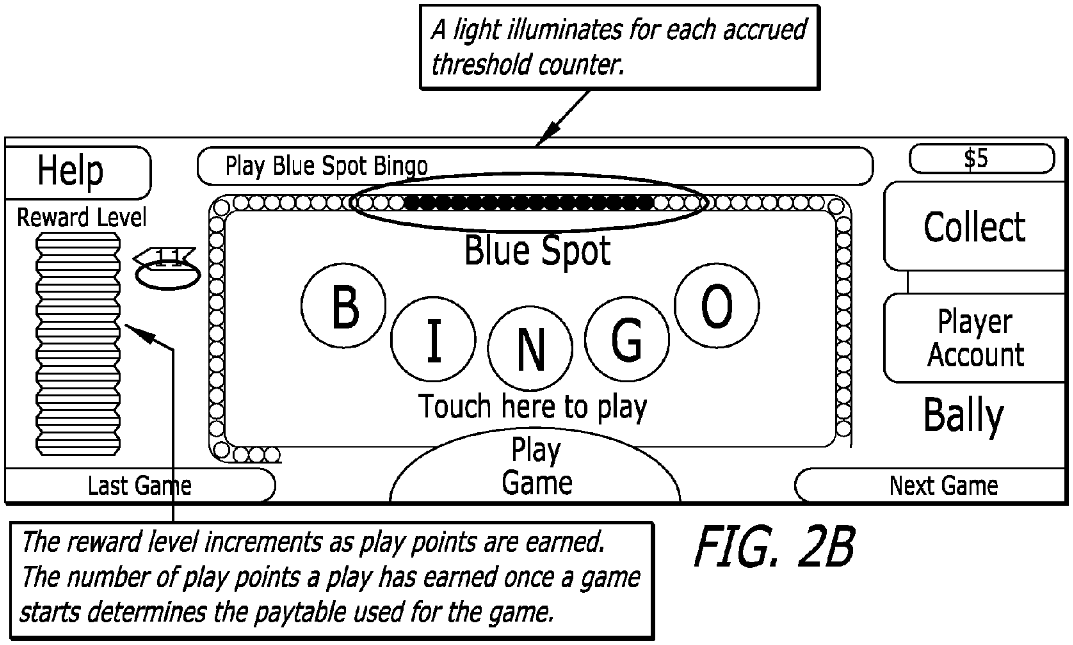
Figure 2C:
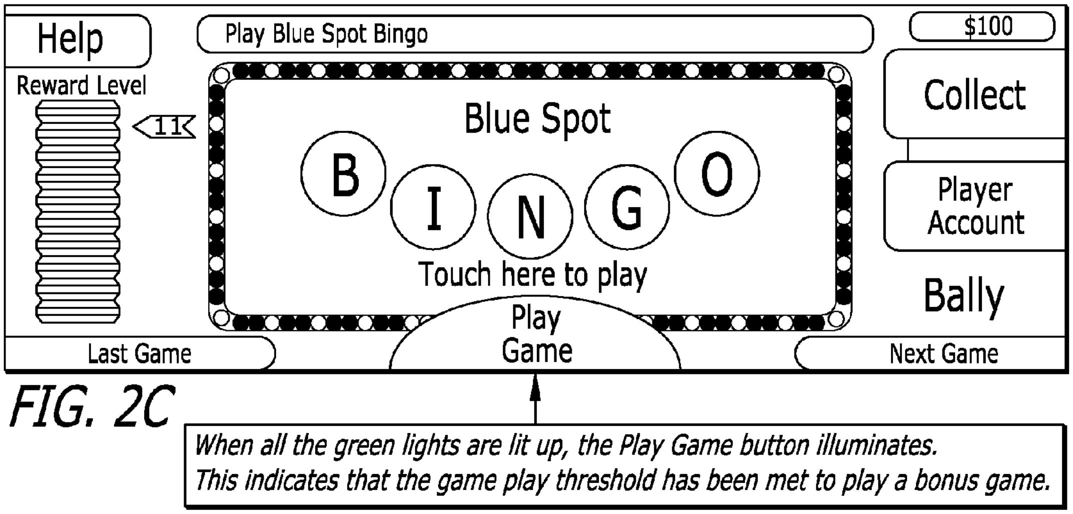

Referring to FIG. 2A, 2B, and 2C, the main panel of the Blue Spot Bingo game is displayed on player console 101 where the perimeter lights are shown with a beginning string of lights illuminated, then a longer string of perimeter lights illuminated, until all the perimeter lights are illuminated. Simultaneously, the reward level indicator (which may be associated with a player point accumulator that may be installed on the console processor board or remotely, such as on a player tracking server) may increase to correspond to threshold levels achieved by a player's play, such as player reward level shown in the figures, and points accumulated. The perimeter lights may illuminate as playing thresholds are met by the player until all the lights are illuminated. FIG. 2B shows light illuminating for each accrued threshold counter. FIG. 2B also shows the reward level increments as play points are earned. The number of play points a play has earned once a game starts determines the pay table used for the game. At this point, as shown in FIG. 2C, the "Play Game" area may illuminate to indicate that the game play threshold has been met to play the bonus game and to indicate that the "Play Game" area is enabled so that the player may initiate the bonus game play.

The reward level achieved by a player may be used to determine a paytable associated with the bonus game. Apart from the number of points accrued, the reward level may be determined by denomination played by a player. For example, a penny slot machine player may only be able to achieve level 3, whereas with a nickel denomination slot machine, a player may be able to achieve level 5, and so forth. In addition, the number of coins per line may determine the reward level that may be achieved, so that a player playing the minimum per line may achieve a reward level lower than the highest level while a player playing maximum bets per line may achieve the highest reward level.

Figure 3A:
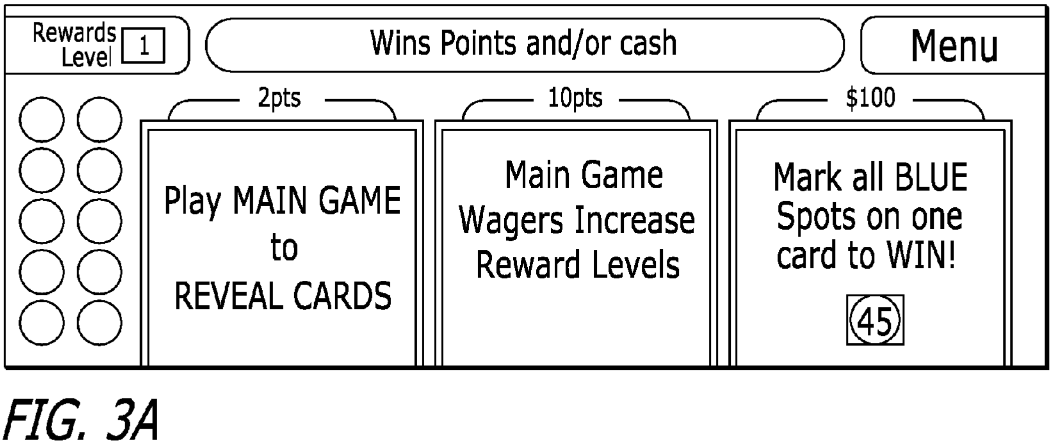
FIGS. 3A, 3B, 3C, 3D illustrate a sequence of example game panels on a player console showing a bingo game from beginning to end in accordance with one or more embodiments.

Referring to FIG. 3A, 3B, 3C, and 3D a sequence of panels show the example Blue Spot Bingo game from beginning to finish of the game. The initial panel sequence of the bingo bonus game displays each of three bingo cards fully covered (FIG. 3A). In order to uncover the cards for play, the player must continue to play a base game to accumulate points and achieve thresholds which cause a portion of one or more cards to be uncovered (FIG. 3B) until as in FIG. 3C the cards are completely uncovered. The numbers that are selected for the player are shaded on each card, such as shaded blue to correspond to the name of the bingo game Blue Spot Bingo. The selected numbers on the cards may be selected randomly such as through a program operating the game. Alternatively, the numbers may be selected by a player where the player may be permitted a maximum number of selections on each card.

In the example shown, cards one and two have only two numbers selected and that need to be matched, and card three has five numbers selected. The bingo numbered balls appear one at a time as they are drawn or simulated to be drawn from a pool of numbers corresponding to a range, such as one through seventy-five. The drawn numbers that match the numbers on the card are marked, such as by circling as shown in FIG. 3C. Additionally, the matched numbers may be illuminated. If all the shaded numbers on a card are circled, then the player wins the award that is associated with the bingo card. In FIG. 3C, the potential awards for each card are listed above the card which as an example are 12 points, 60 points, and $600, respectively. It may be noted in the example that the cards with the lower potential awards have the least amount of numbers that need to be matched and therefore have the greater likelihood of being a winning card.

The amount of the potential award corresponds to the rewards level, which by example is "4" as shown in the rewards level indicator on the panel of FIG. 3C. In the example, no card had all matching numbers, so the game is over and no award is given to the player and a "Game Over" caption is displayed in the upper display area while the player may continue to see the respective cards for a short period on FIG. 3C. After the short period, such as ten seconds, has passed, a panel as shown in FIG. 3D may be displayed which includes a large game ending placard area displayed across the cards indicating the game is over, for example *Game Over*. On the game ending placard, a further informational area may be included that may be touch sensitive to enable a player to access the rewards/help panel, which may provide the player with the rules and potential rewards available for the game.

Figure 3B:
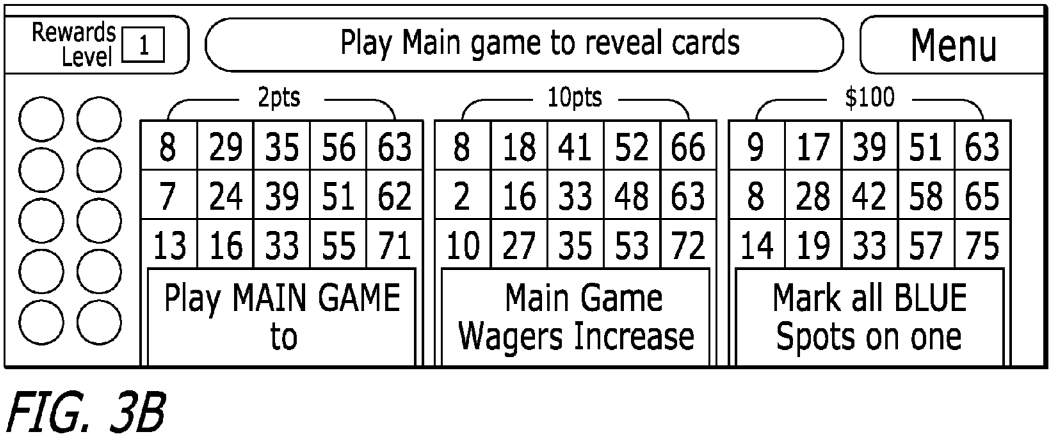
Figure 3C:
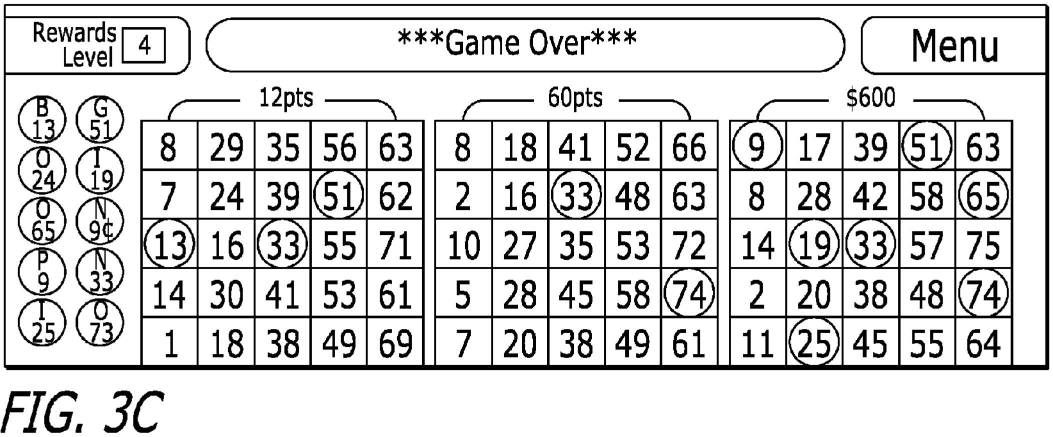
Figure 3D:
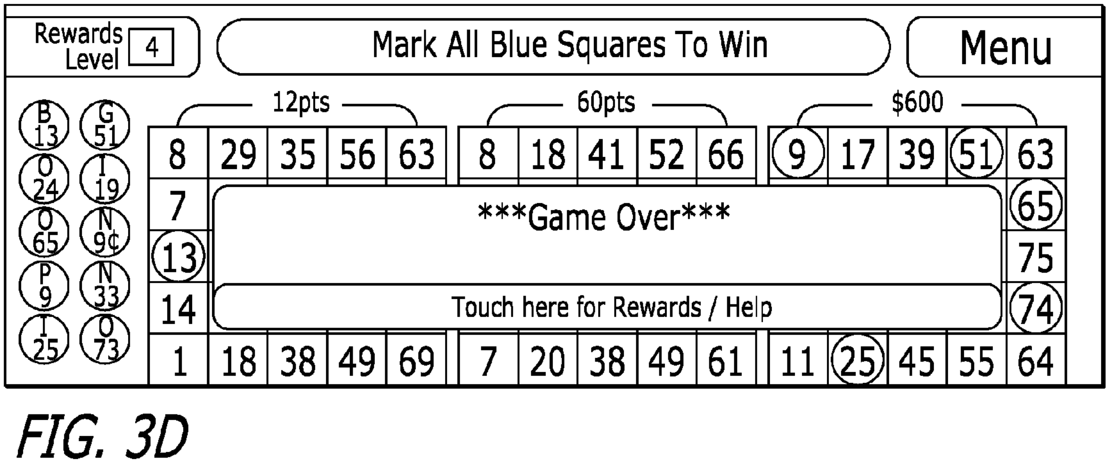

Further referring to FIGS. 3A, 3B and 3C, an informational panel may be located at the top. When the game is initially ready to play with all the cards covered, additional information may be provided on the cover of each card, such as "Play Main Game to Reveal Cards", "Main Game Wagers Increase Reward Levels", and "Mark All Blue Spots on One Card to Win". Additionally, on each panel may be a menu button area which may be touch sensitive and allowing a player to restore the main game panel as shown in FIG. 1.

Figure 4A:
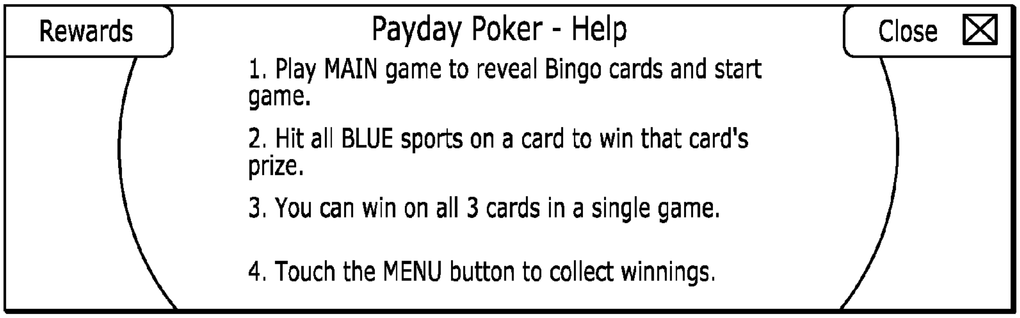
FIGS. 4A, 4B illustrate a rewards and a help panel on a player console providing information about an associated bingo game in accordance with one or more embodiments.
Figure 4B:
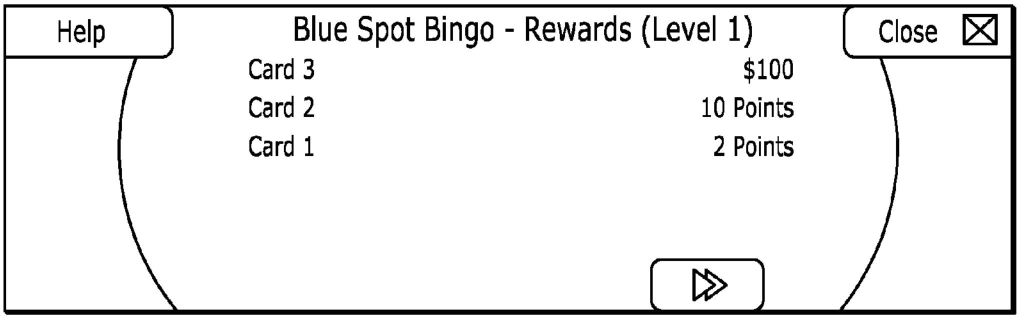

Referring to FIGS. 4A and 4B, panels are shown that may be displayed when a player presses the help or rewards/help buttons shown in FIG. 3C or FIG. 1. In the example, FIG. 4A displays the initial help screen and provides the rules of the game, such as the name of the game, the eligibility requirements to play the game of playing a main game to uncover the bingo cards; the requirement that each of the blue spots on a card must be matched by the drawn bingo ball numbers in order to win and that there can be more than one winning card; and an instruction that the player may touch the menu button to collect any winnings. The help panel also may include a touch sensitive rewards button and a close button. By pressing the rewards button, a reward panel as in FIG. 4B may be displayed to inform a player of the rewards for each of the bingo cards that may be obtained in accordance with the rewards level. For example, FIG. 4B shows the rewards for level one for each of the cards one, two, and three to be two points, ten points, and one hundred dollars, respectively. In addition to touch sensitive help to close buttons, an arrows button is displayed which enables a player to scroll through each of the levels and corresponding rewards. The close button enables a player to request the main game panel to be displayed.

Figure 5A:
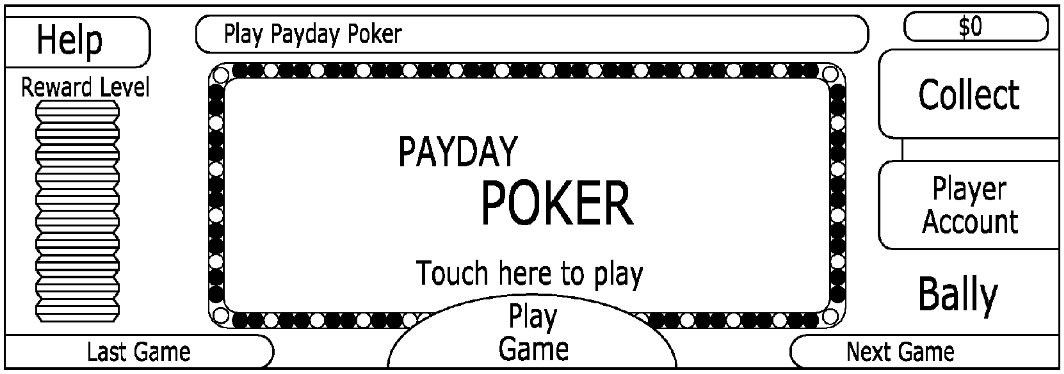
FIGS. 5A, 5B, 5C illustrate a sequence of example game panels on a player console showing a poker game from beginning to end of game play in accordance with one or more embodiments.
Figure 5B:
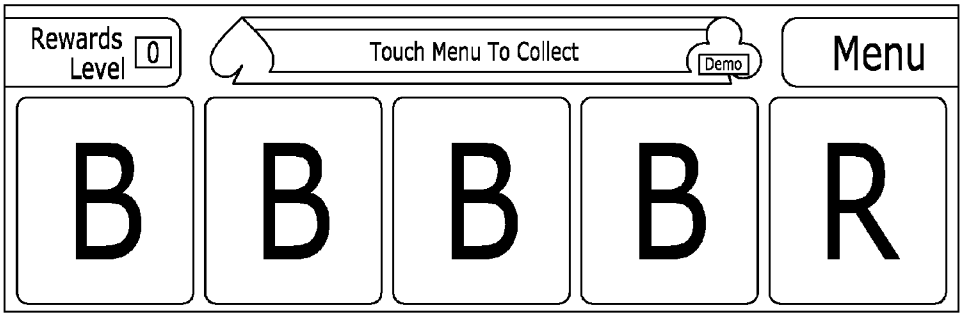
Figure 5C:
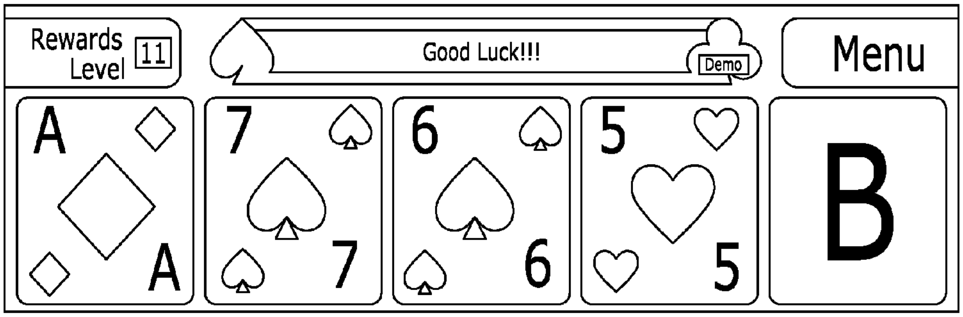

Referring to FIGS. 5A, 5B, and 5C, a second game, Payday Poker, is shown which has similar functional aspects as described above with respect to the Blue Spot Bingo game. As in FIG. 1, FIG. 5A has a perimeter light area about the central game name display area where portions of the lights are illuminated as the player plays a base game, accumulates player points, and achieves thresholds. Once the perimeter lights are fully illuminated the "Play Game" button may be illuminated and activated so that the player may initiate the initial game sequence which is a panel such as shown in FIG. 5B where there are five card places which are initially empty. As the player plays the base game and achieves thresholds, a covered card begins to appear until it is complete, then a next card begins to appear as the player continues to play and achieve thresholds.

In the FIG. 5B example, the player has achieved a number of thresholds and has acquired or drawn three complete covered cards and has partially met the needed thresholds to obtain the fourth card. When the player has obtained five covered cards, the hand is complete and then each card may be sequentially uncovered to show the player what hand of cards has been drawn, the process of uncovering the cards being shown in FIG. 5C. The process of uncovering may be automatic or the player may initiate the uncovering by pressing on each card. The cards may only be uncovered after a complete hand has been drawn. In the event that a winning combination has been obtained, the player may select another panel to collect the winnings, such as by pressing the "Menu" button to return to the main game panel and then pressing the "Collect" button.

Figure 6A:
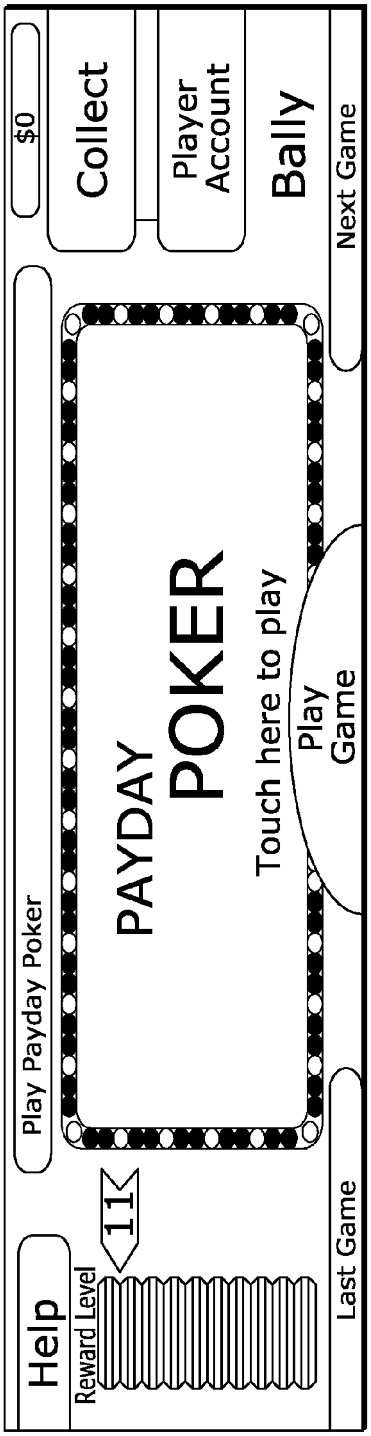
FIGS. 6A, 6B, 6C illustrate a main game, rewards and help panel on a player console providing information about an associated poker game in accordance with one or more embodiments.
Figure 6B:
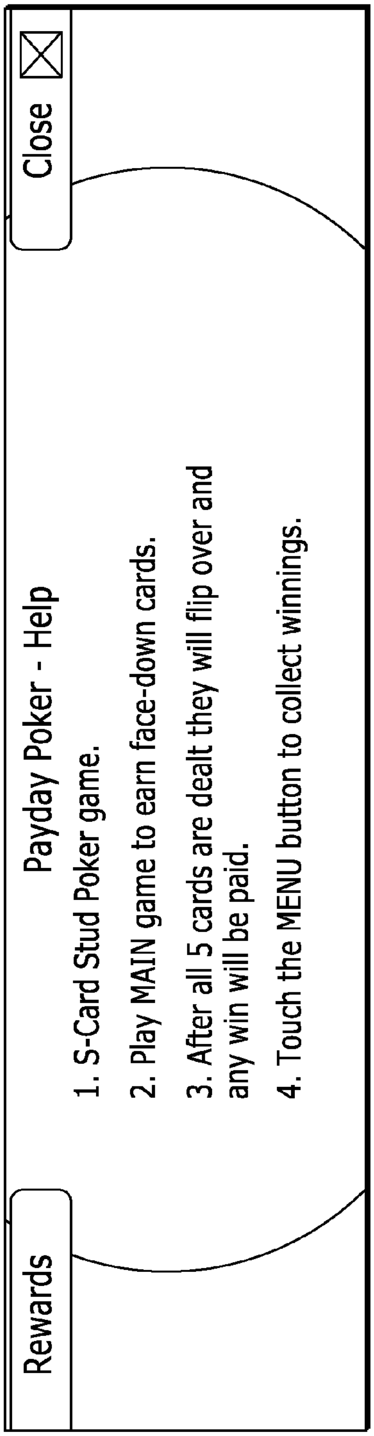
Figure 6C:
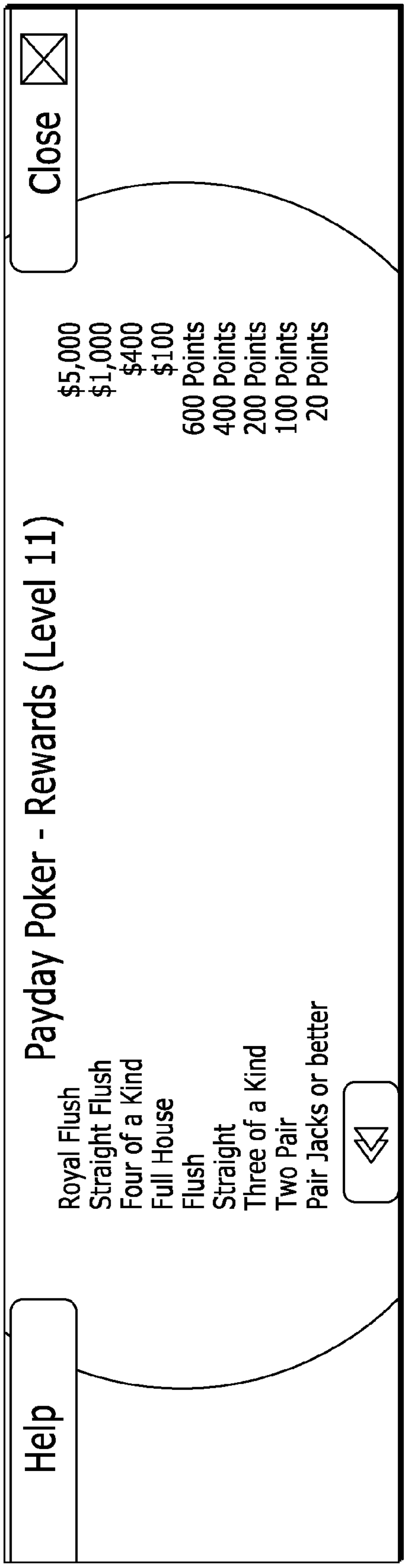

Referring to FIG. 6A, 6B, and 6C, an example main panel, help panel, and rewards panel are shown for the example bonus game Payday Poker. From the main panel, a player may access the help panel by pressing the "Help" button on the main panel. As in the earlier described game, the help panel may provide the name of the game, a description as to how the game is played, the game requirements, and instructions as to how to collect winnings. The help panel may further include touch sensitive "Rewards" and "Close" buttons enabling a player to request the display of the potential rewards for each rewards level or return to the main panel. In the case of the Payday Poker Game, FIG. 6C shows the potential rewards for a player reaching level 32 to include: $5000 for a Royal Flush, $1000 for a Straight Flush, $400 for Four of a Kind, $100 for a Full House, 600 points for a Flush, 400 points for a Straight, 200 points for Three of a Kind, 100 points for Two Pair, and 20 points for Jacks or better. In the example, level eleven is the highest level and the arrow button points left to indicate that the only further selections are at the lower levels.

Figure 7A:
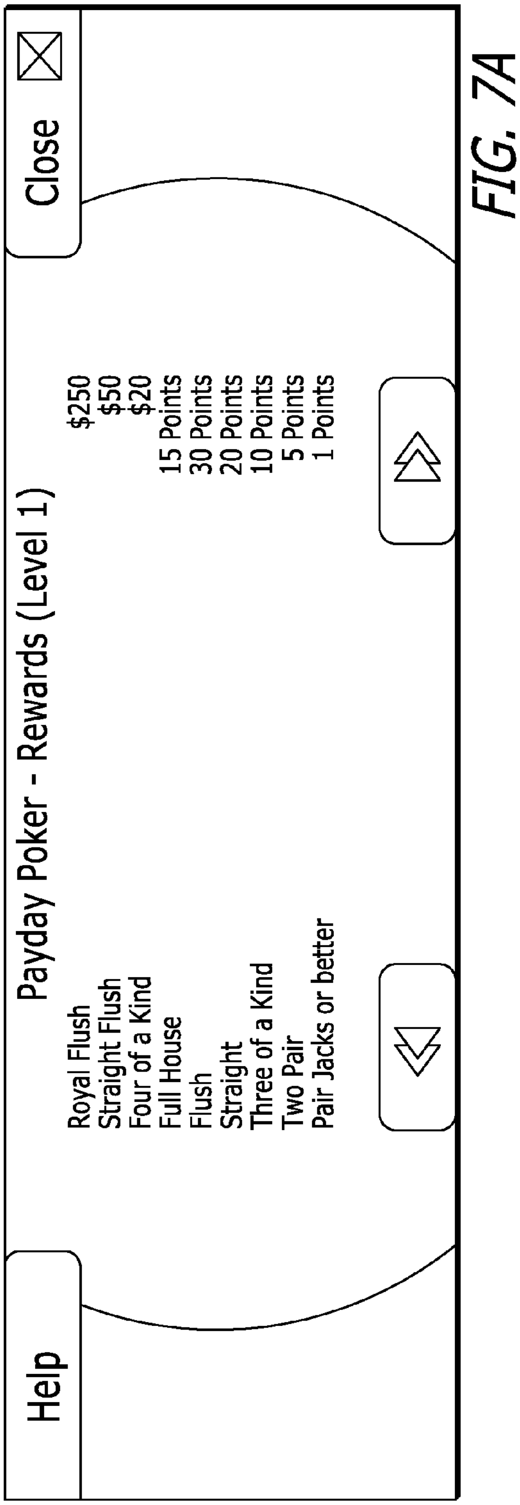
FIGS. 7A and 7B illustrates a contrast between level one reward versus level five rewards as shown on a rewards panel on a player console in accordance with one or more embodiments.
Figure 7B:
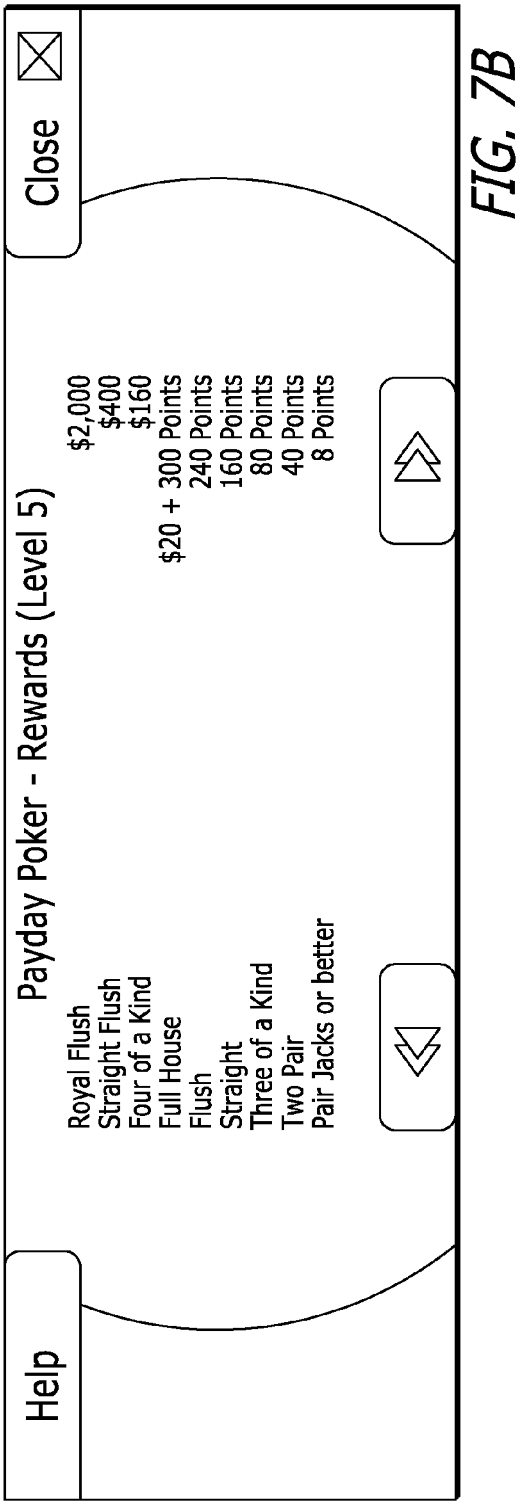

Referring to FIGS. 7A and 7B, an example partially shown rewards panel associated with level one and a rewards panel associated with level five illustrate the different potential rewards for the respective levels, such as $250 for a Royal Flush for a level one player is $250 and $2000 for a level five player. As discussed above, various determinants may be utilized to elevate the rewards level, such as points, denomination wagered, and amounts wagered per line.

Figure 8A:
FIGS. 8A, 8B, and 8C illustrate game ending panels on a player console with various outcomes in accordance with one or more embodiments.
Figure 8B:
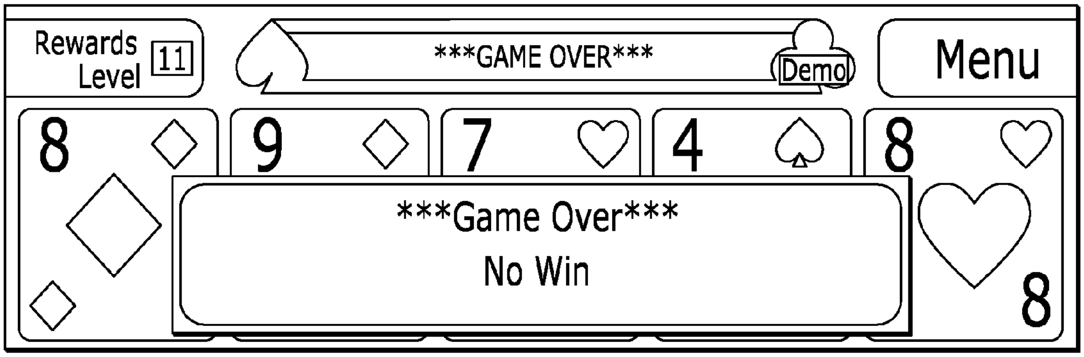
Figure 8C:
Figure 9A:
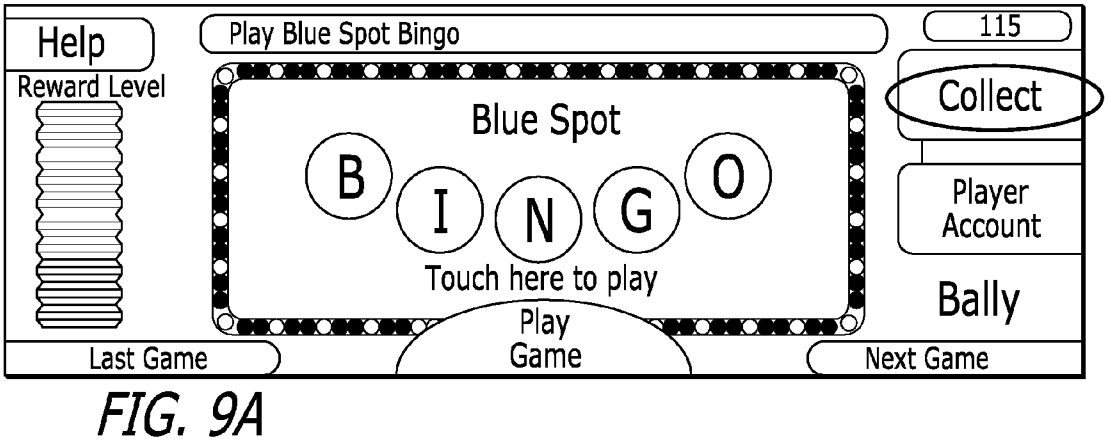
FIGS. 9A, 9B, 9C, 9D, 9E, and 9F illustrates a cashing out sequence beginning from a main game panel on a player console in accordance with one or more embodiments.
Figure 9B:
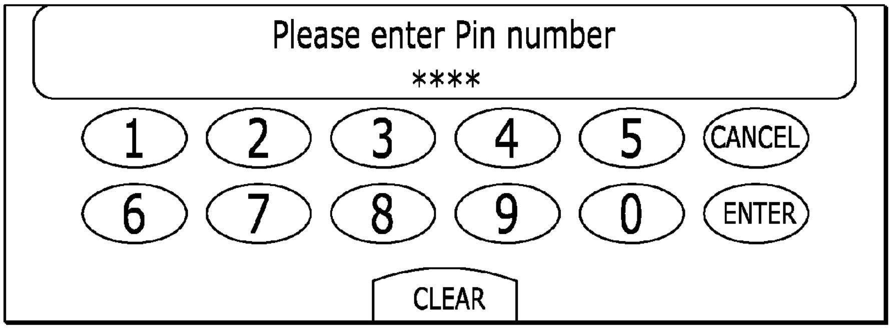
Figure 9C:
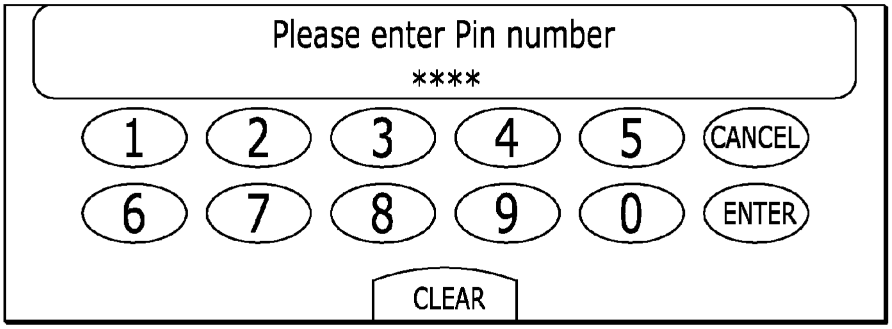
Figure 9D:
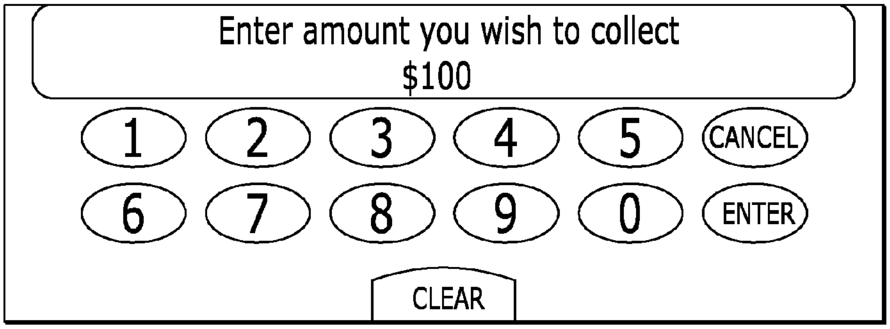
Figure 9E:
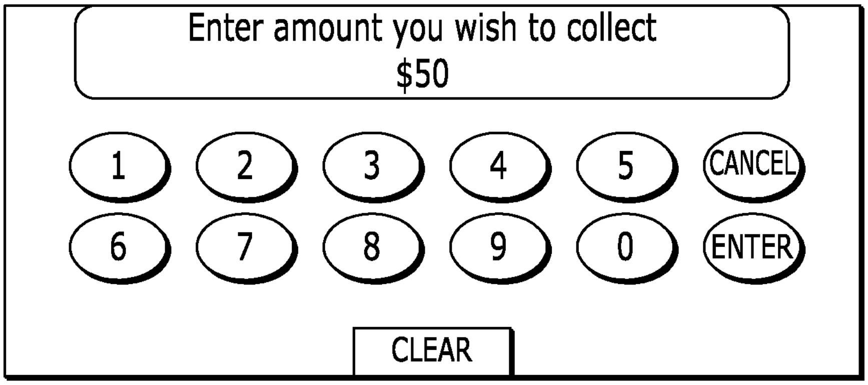
Figure 9F:
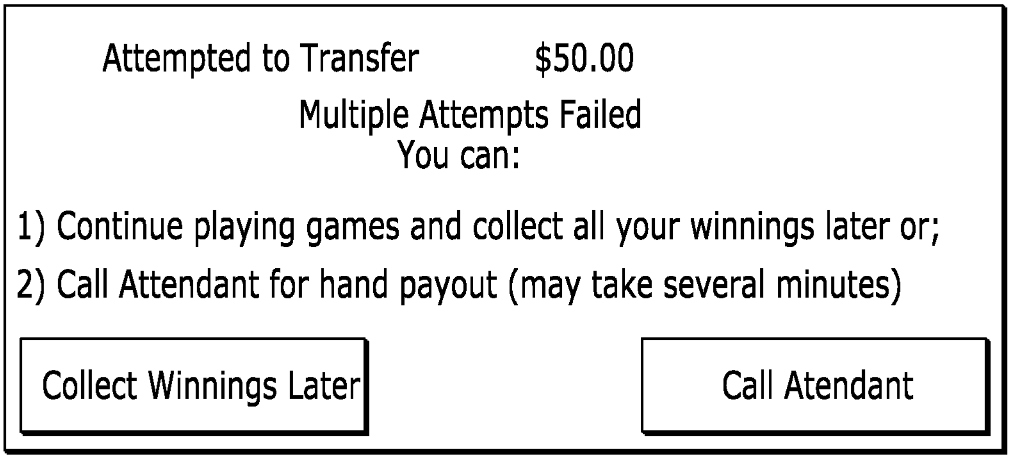

Referring to FIG. 8A, 8B, and 8C, example game concluding panels are shown with a banner section partially covering the uncovered hand of cards. An upper display section indicates the status of the hand and the banner section indicates whether the player has won an award. In the case of FIG. 8A, the player has Four of a Kind and is a level 32 player, so the winnings are $400 and the display indicates "Congratulations you win $400". In the case of FIG. 8B, the player has a losing hand and the display indicates "Game Over" and "No Win". In the case of FIG. 8C, the player has a Flush which is shown in the upper display window and the banner displays "Congratulations You Won $10+240 points". To return to the main screen, the players may simply press the "Menu" button. Alternatively, an additional button may appear such as a "Collect Winnings" touch sensitive panel as part of the banner (FIG. 8A) or the banner may have a "Rewards/Help" touch sensitive panel (FIG. 8E).

Referring to FIGS. 9A, 9B, 9C, 9D, 9E, and 9F, a sequence flow of panels is shown by example for a player to collect cash winnings. In the example shown, Bally Live Rewards may be cashed out from the main game panel by pressing the touch sensitive "Collect" button. By example, cash winnings shown in the main display panel may be transferred to the base game through an electronic funds transfer. Alternatively, a player may leave cash winnings in a player account until another gaming session. As shown, when the player presses the "Collect" button, a panel is displayed for entering the player's personal identification number (PIN). If the PIN is correct, then a panel is displayed requesting the player to enter the amount to be collected. By default, the total amount in the player's account may appear on the display. The player may withdraw any portion thereof. Once the transaction is complete, the player may be returned to a main menu screen. In the event that the transaction fails after multiple attempts, the player may be provided a "Call Attendant" button or a "Continue Playing" button.

Figure 10A:
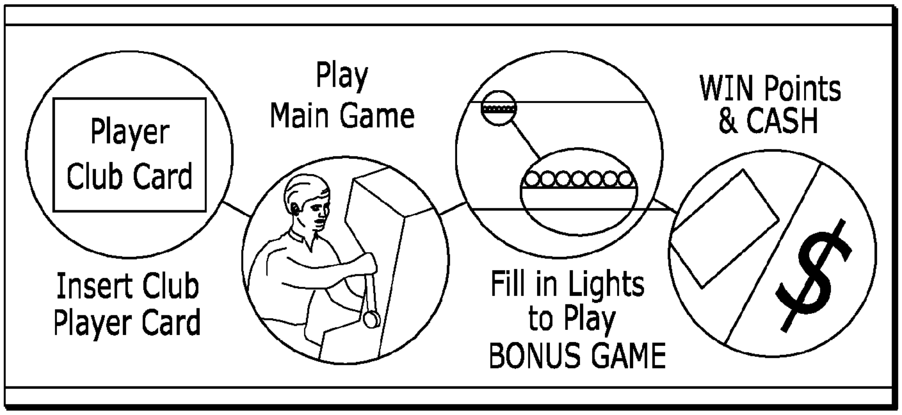
FIGS. 10A, 10B, and 10C illustrates a sequence of advertising panels on a player console in accordance with one or more embodiments.
Figure 10B:
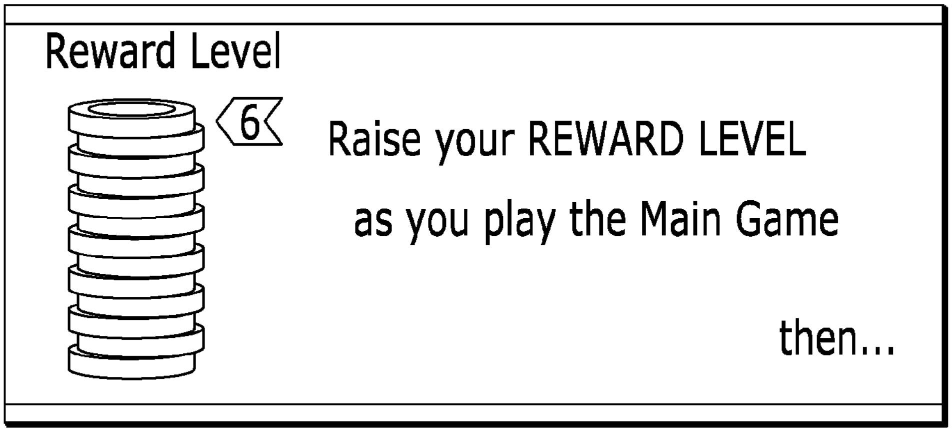
Figure 10C:
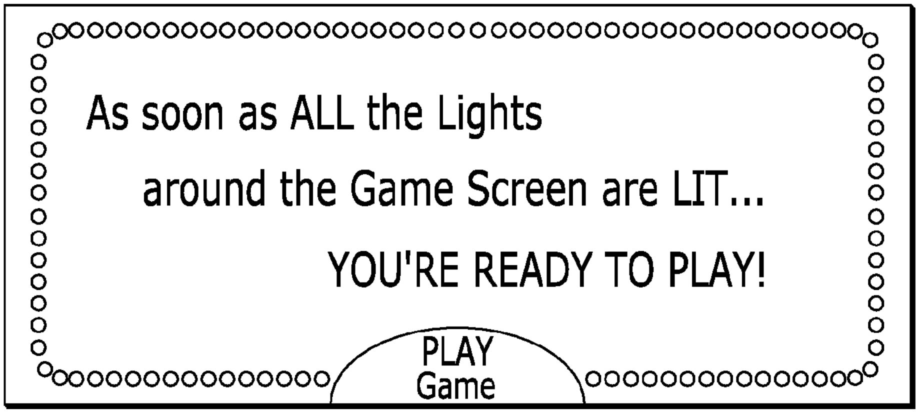

Referring to FIGS. 10A, 10B, and 10C, a sequence of advertising panels is shown that may be displayed when player console 101 has been inactive for a period of time, such as when no game points are being accumulated by a player. Alternatively, the advertising panels may appear when an associated base game has been inactive for a pre-determined period of time, such as five minutes. In another alternative, an associated base game may be active, but a player may not have been identified, such as with a playing card, and the advertising panels may be shown. The advertising panels may provide information apprising a player how to participate in the bonus games, how to achieve reward levels, and how to initiate game play by achieving the thresholds of play through playing points.

Figure 11A:
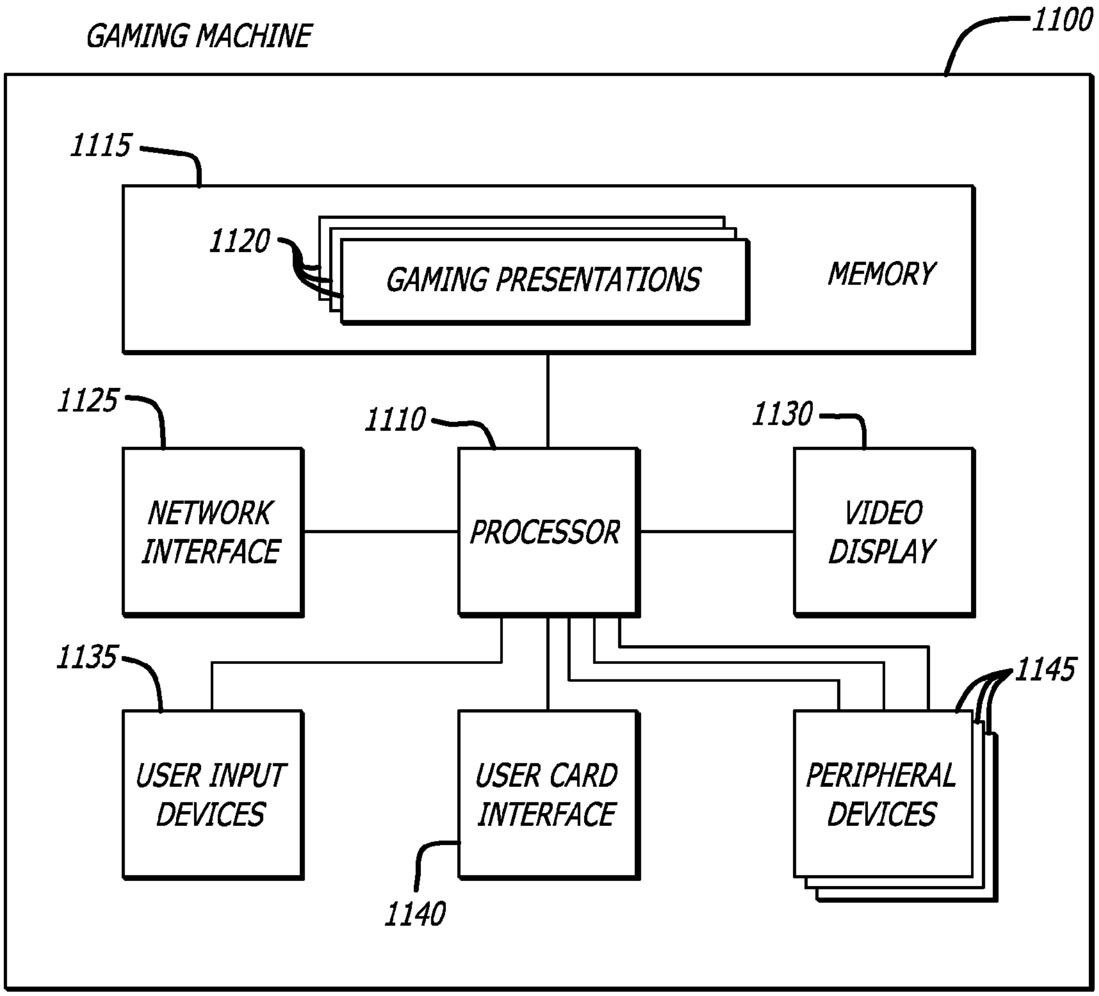
FIG. 11A illustrates an example high-level block diagram of a gaming machine in accordance with various embodiments.
Figure 11B:
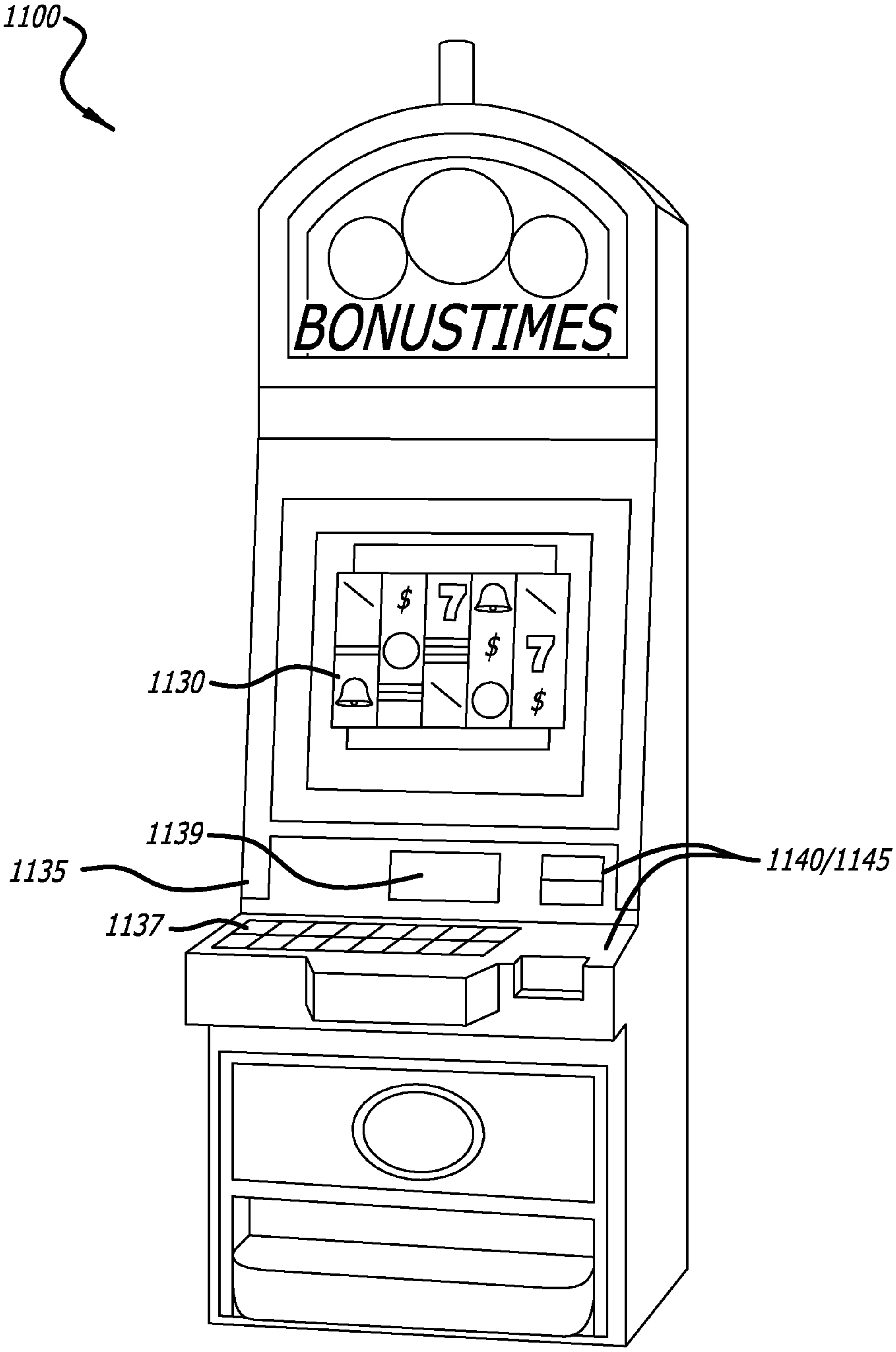
FIG. 11B illustrates an example gaming machine in accordance with various embodiments.

Referring to FIGS. 11A and 11B, a block diagram and front view of example gaming machine 1100 are shown, respectively. Gaming machine 1100 may include apparatus and/or software for implementing one or more player-centric rewards processes as discussed above and in accordance with one or more embodiments. Typically, gaming machine 1100 is implemented as an electronically functional device using conventional personal computer technology with few or no moving parts; however, gaming machine 1100 may also be implemented as an electro-mechanical or mechanical device.

For example, gaming machine 1100 as shown in FIGS. 11A and 11B may include a game printed circuit board including game processor 1110, memory 1115 which may store the game machine operating system and game presentation software 1120, network interface 1125 for connecting to an operator's network, video display 1130 which may display a game driven by processor 1110 and may have fields for example displaying player credits, wager, win amount, and the like, user input devices 1135 which may provide buttons or video fields for a user to communicate with gaming machine 1100 through processor 1110, user card interface 1140 which may provide a device for transmitting player card information to processor 1110, and peripheral devices 1145 such as a bill acceptor or ticket dispenser, and the like.

In the example of a video gaming machine, game processor 1110 communicatively connects to video display 1130 which displays images of reels that function equivalently as mechanical or electro-mechanical reels, user interface unit including user input devices 1135 which provides information to a patron and permits patron communications with the game processor and/or a network connected through network interface 1125, user card interface 1140 which provides a device for receiving and reading player card information, and peripheral devices 1145, such as a bill reader for receiving and reading various bill denominations, coupons, and/or credit vouchers, and a voucher printer which may be combined with the bill reader and may print credit vouchers when a patron wishes to cash out and/or print rewards vouchers when a patron accepts an award.

Video display 1130 may be any of a variety of conventional displays, such as a high resolution LCD flat panel, and may have touch screen display functionality so that a patron can make software-enabled selections which may be associated with the game. Apart from its conventional functionality in presenting a game for a patron, gaming machine 1100 may include award software which may be stored in memory 1115 and hardware which may be part of or connected to the game board to implement one or more player-centric rewards processes as disclosed above by example. Video display 1130 may include a separate user display such as an LCD touch screen display with interactive capability for communication between a user, gaming machine 1100, or a network connectable through network interface 1125.

Memory 1120 may include both memory internal and external to processor 1110. External memory may include a hard drive, flash memory, random access memory (RAM), read only memory (ROM), and any other conventional memory associable with a printed circuit board.

In the event that gaming machine 1100 is connected to a network, then the rewards software and hardware may be implemented wholly or partly externally and may be communicatively connected to the user interface unit for notifying patrons of rewards and receiving patron communications, such as award acceptances. For instance, gaming machine 300 may have a game management unit (GMU) which connects to a slot management (SMS) and/or casino management (CMS) network system. The GMU may in turn connect to the game board and the user interface unit. The player-centric rewards may be driven through the GMU, either directly or indirectly through the SMS and/or CMS which is discussed more fully below.

Referring to FIGS. 11A and 11B, typically, gaming machine 1100, such as Bally's 59000 Video Slot machine, comprises microprocessor 1110, such as an Intel Pentium-class microprocessor, and non-volatile memory 1115 operable to store a gaming operating system, such as Bally's Alpha OS, and one or more gaming presentations 320, such as Bally's Blazing 7's or Bonus Times, for example, operable and connected on a printed circuit motherboard with conventional ports and connections for interfacing with various devices and controlling the operation of gaming machine 1100. Memory 1115 may store one or more software modules operable with the as to implement one or more reward processes, such as are described above in relation to FIGS. 1-10.

Gaming machine 1100 may include network interface 1125 operable to download one or more gaming presentations 1120 from the one or more gaming servers (not shown) and to otherwise communicate with networked devices and servers for various purposes; however, one or more player-centric award processes as described above by example may be implemented with or without network support depending on implementations as is described further below. Gaming machine 1100 may further comprise a video display 1130, through which gaming presentations are presented to the user; however, electro-mechanically driven reels may be implemented in place of or together with video display 1130. Gaming machine 1100 may further comprise user interface devices 1135, such as a keyboard (not shown) which may be used to enter a PIN or for the selection of various options, various player selectable buttons 1137 including bet one, bet all and the like, as well as a touch screen which may be incorporated with video display 1130 or display 1139, such as an iVIEW TFT display. Gaming machine 1100 also includes user card interface 1140, which is operable to accept a user card that identifies a user as a casino patron to the gaming environment. Gaming machine 1100 may further include one or more peripheral devices 1145, such as a bill/ticket acceptor, ticket printer, and various other devices. As shown in FIG. 11B, user card interface 1140 and peripheral devices 1145, such as a bill acceptor, may be implemented adjacent to each other or may be part of the same housing structure while connecting differently to perform their respective functions. In the event a network connection exists, then the user interface unit may provide a communication link for a patron with an SMS and/or CMS network.

In one or more embodiments, gaming machine 1100 includes microprocessor 1110, which may implement the programming logic of the gaming presentations and control the operation of various hardware and software components of the gaming machine, as well as one or more peripheral devices 1145. For example, microprocessor 1110 may be operable to activate various components of the gaming machine 1100 and, in the event of a network connection, to download one or more gaming presentations 1120 from the gaming server. In response to a user input to initiate play and the placement of a wager, the microprocessor 1110 may be configured to retrieve the requested gaming presentation 1120 from memory 1115 and to commence the play of the game. The microprocessor 1110 may be configured to randomly select a game outcome from a plurality of possible outcomes and to cause the video display 1130 to depict indicia representative of the selected game outcome. In the case of slots, for example, mechanical or simulated slot reels may be rotated and stopped to display symbols on the reels in visual association with one or more pay lines. If the selected outcome is one of the winning outcomes defined by a pay table, the microprocessor 1110 may be configured to award the player with a number of credits associated with the winning outcome. Conventionally, in such gaming machines, a player may wager multiple credits on one or more lines depending upon the programming or physical limitations of the gaming machine.

In one or more embodiments, gaming machine 1100 includes user input devices 1135, which may include various gaming controls, such as standard or game-specific push-buttons, a "Bet" button for wagering, a "Play" button for commencing play, a "Collect" button for cashing out, a "Help" button for viewing a help screen, a "Pay Table" button for viewing the pay table(s), a "Call Attendant" button for calling an attendant, and a "Rewards Button" for viewing player reward information and accepting various rewards, such as opportunities to play bonus games and obtain additional player awards. User input devices 1135 may also include various game-specific buttons known to those skilled in the art. User input devices 1135 may also include a keyboard, a pointing device such as a mouse or a trackball, or any other input devices. In one or more embodiments, user input devices 1135 may also comprise an embedded additional user interface (not depicted), such as an iVIEW interface, as described in commonly owned U.S. patent application Ser. No. 10/943,771, entitled USER INTERFACE SYSTEM AND METHOD FOR A GAMING MACHINE, which is hereby incorporated in its entirety by reference herein. The content provided through the embedded additional user interface may include, for example, advertisements, promotion notifications, useful gaming information, user rewards information and any other content that may be of interest to the casino patron.

In one or more embodiments, the gaming machine 1100 also includes user card interface 1140, which is operative to accept user cards containing the patron's identification information, such as the patron's ID number. User interface 1140 may be configured to accept magnetic cards, smart (chip) cards, electronic keys and the like. It will be appreciated, however, that such user information may be stored in other forms or on other media for subsequent retrieval. For example, the user information can be stored on an RFID device, electronic key, or other portable memory device. Likewise, using biometrics or other techniques, user information may be retrieved from the game machine or from a remote storage device via a network. In an example embodiment, the system may recognize three different levels of user cards. For example, level one cards may identify frequent casino patrons, i.e., those who have a well-established history of playing at the given casino and/or whose wagering at the casino exceeds a specified threshold amount. Level one patrons will be entitled to the greatest degree of service and various promotions and rewards from the casino since they have met or exceeded a game threshold. The level two cards may identify patrons who frequent the casino, but whose spending at the casino is not as extensive as those of the level one card holders. Lastly, the level three cards may identify new casino patrons, i.e., those who do not yet have a consistent history of playing at the given casino. The degree of service, promotions and rewards offered to the level two and level three card holders likely will differ from that offered to the level one card holders, as will be described in a greater detail hereinbelow. The gaming system may be configured to recognize fewer or greater numbers of card levels, and that promotions and/or credits associated with each card level may differ.

In one or more embodiments, gaming machine 1100 includes one or more peripheral devices 1145. For example, peripheral devices 1145 may include a player identification device, such as a magnetic card reader that accepts a player-identification card issued by the casino. Peripheral devices may also include a credit receiving device, such as a coin acceptor, a bill acceptor, a ticket reader, and a card reader, which may be used for placing wagers. The bill acceptor and the ticket reader may be combined into a single unit. The card reader may, for example, accept magnetic cards, such as credit cards, debit cards, and smart (chip) cards coded, i.e., cards loaded with credits or that designate an account for use via the gaming machine 300.

According to the methodology of various example embodiments, a patron may insert a player card to provide identification information to gaming machine 1100. A player-centric rewards process, such as disclosed above, may be implemented through a player-centric rewards program stored on permanent storage accessible by the game processor or other local processor, such as a processor connected to a Bally iVIEW or similar unit, and activated by a signal from the card reader. The player-centric rewards program may be a program or programs that may implement the process described by FIGS. 1-10 through execution by processor 1110 on the motherboard or by a processor on the user interface board of gaming machine 1100.

The information from the card reader may be processed through a subroutine to determine player eligibility for player-centric rewards. If the player is determined to be eligible, then the program may provide a display of a main bonus game panel on player console 101 which may be integrated as part of the display 330. The program may accumulate player points based on play of the base game, such as may be displayed on display 330, or receive the player point information from another processor, such as game processor 1110, a GTM processor, or an external processor such as a server processor. As the player reaches pre-determined thresholds, the bonus game may be selected by the player and the game process may proceed as described above with regards to FIGS. 1-10. In accordance with the program processing, the patron player level may be determined based on the current and/or previous gaming sessions, a set of potential prizes or prize levels may be determined for which the patron's player level is eligible, and the potential awards for the bonus game may be determined based on the achieved player level. In an alternative embodiment, the patron's player level may be identified at the beginning of play and the potential bonus game awards may be determined for which the patron's player level is eligible, gaming machine 1100 may display a message viewable by patron showing the reward level for which the patron is eligible. Gaming machine 1100 may also provide encouragement to the patron to win an award and achieve higher award levels by displaying entertaining video images and/or providing audible messages, such as cheerleaders making a "GO" cheer and/or displaying a fireworks display when pre-programmed threshold levels of play are met by a player.

Upon determining a reward level that is to be offered to the patron, an instruction from the player-centric award program may direct the processor to transmit a notification to the patron, such as by displaying an informational message on display 101 or 1139 advising the patron that he has qualified for an award level and providing the patron with one or more options for responding to the notification, such as that the player may have accumulated sufficient points to play a bonus game or encouraging the player to continue to play in order to achieve the needed player point level or to increase the player's reward level. Thereafter, the player may view display 339 and make selections as to a bonus game as previously described with respect to FIGS. 1-10. When the patron completes play, as by removing the player card from the card reader, then the player points may be stored so that the player may add to the player points during a future session.

In example alternative embodiments, a player's player points, wager amounts per line, and denomination wagered may be stored in temporary storage, such as by example one or more registers of a game microprocessor, a player interface microprocessor, digital signal processor, or controller associated with a player interface such as a Bally iVIEW, or a processor associated with a Bally GMU or GTM which may be communicatively connected to the game motherboard and the player interface. Alternatively, the temporary storage may comprise an onboard (motherboard or daughter board) conventional memory, such as RAM, or, an off-board connected conventional memory, such as a conventional hard-drive, or, a connected printed circuit board with a conventional processor, controller, and/or memory. The temporary storage values may be utilized to determine thresholds achieved and/or rewards level of an eligible patron during a gaming session. The respective processor controlling the temporary storage location may accumulate player points based on the number of credits wagered in accordance with a player reward program, such as one which may include an instruction set to implement a type of player-centric award process as described above with respect to FIGS. 1-10.

After each play, the player points and other player-centric data may be used to evaluate whether a threshold has been met or whether a reward level has changed in accordance with the programmed player-centric award procedure executed by game processor. When the player points either equal or exceed the required threshold to play a selected bonus game, then the patron may then play the bonus game and via for one or more of the potential player awards. The programmed player-centric award procedure may then initiate a subroutine to play the game and determine an award to be offered to the player. The player points will be deducted from the player's account and the player may again begin accumulating player points for the next bonus game opportunity.

Once the processor determines the award to be offered, then the procedure instruction set may include an instruction for the game processor to send an award notification to the patron through, by example, display 101 or display 1139, or by printing a voucher redeemable at one of the operator facilities providing patron services. In the event of a display notification, the patron may by example be provided the option of having a redeemable voucher printed or, in the case of a cash award, of having credits uploaded onto the credit meter for further play on gaming machine 1100. Alternatively, the game processor may cause an electronic award record to be created and transmitted to a data location associable with and accessible on behalf of the patron. Such a data location may be a permanent storage medium connected to the gaming machine or may be a memory stick or magnetic strip connected to the patron's player card. In the case of records being stored on a patron's player card, a patron may access the award by utilizing a machine readable device for dispensing rewards or by presenting the patron's player card to an operator's representative, such as at a cashier's cage.

In one or more alternative embodiments, a player's accumulated player points may be obtained from information stored or machine readably inscribed on or about patron's player card through the use of user card interface 1140, which may have a receptacle to receive player cards or may have a scanner enabling a proximity scan of the information on the patron's player card. The patron's player card may contain the information such as through the use of a memory strip. In such cases, user card interface may have a readwrite capability to enable writing the ending state for the player points and/or reward levels at the time the patron concludes play on a given gaming session. Thus, a patron may play different gaming machines and play at different times while retaining the state of the patron's player points and rewards level and being able to continue to accumulate player points during each gaming session without losing the totals and levels reached from the prior session.

Alternatively, when the patron completes play at a given gaming machine, as by removing the player card from the gaming machine card reader, then the player points and/or rewards level may be reset to their zero or initial value. In other words, there is no retained state that is saved at the end of a gaming session for the purpose of bonus game eligibility. Also, the player points will be re-initialized after each instance where the patron reaches the threshold to playa bonus game and the player determines to play the bonus.

Figure 12A:
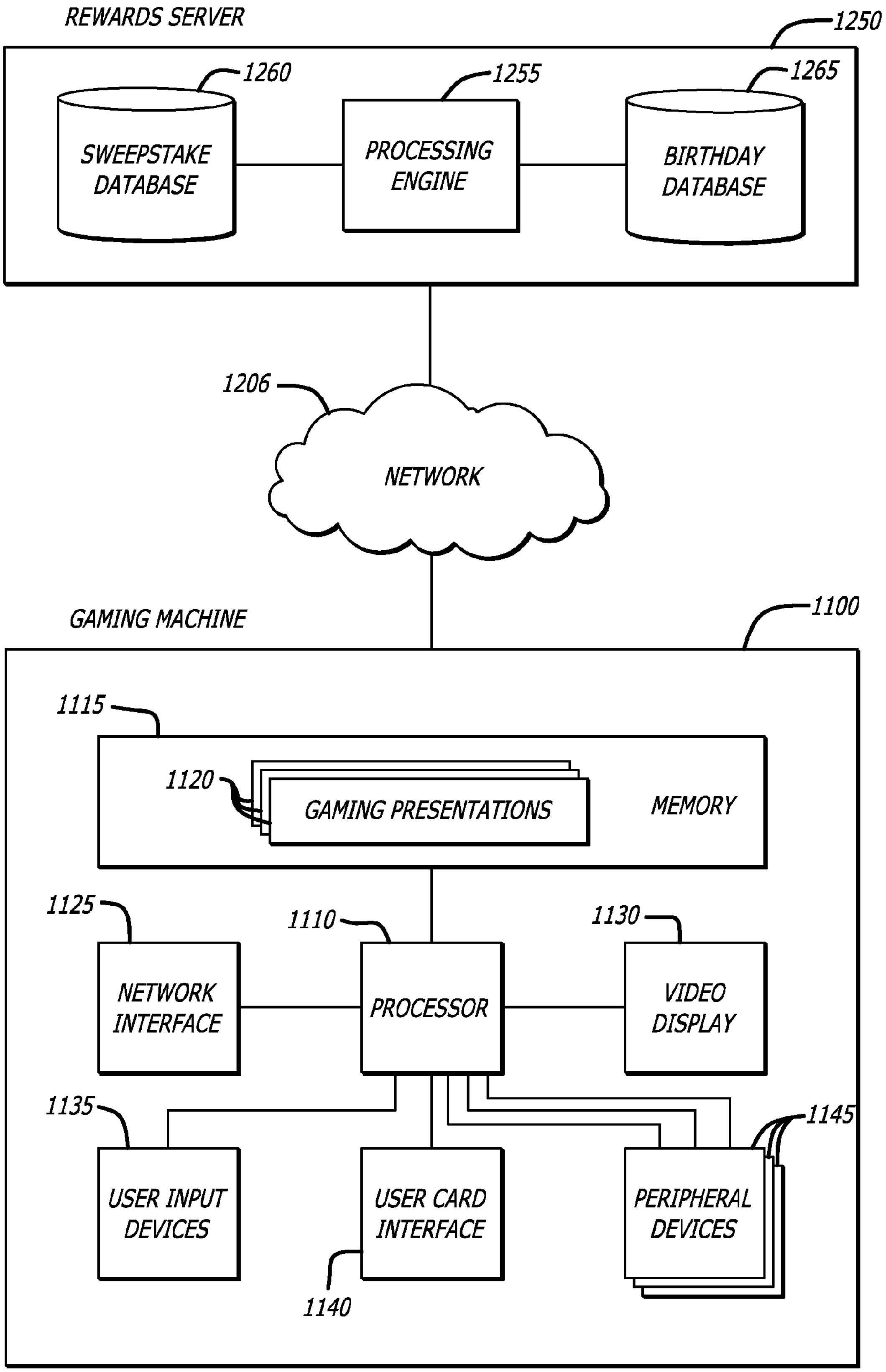
FIGS. 12A and 12B illustrates a simple block diagram of a rewards server connecting over a network to a representative example gaming machine in accordance with various embodiments.

Referring to FIG. 12A, a simple block diagram of rewards server 1250 connecting over network 1206 to representative example gaming machine 1100 is shown. Processing engine 1255 may comprise a conventional personal computer, such as an Intel or AMD microprocessor-based computer, or, any other conventionally available computers capable of performing general purpose computing and gaming specific applications, such as Dell, Sun Microsystems or IBM computers. Databases such as databases 1260 and 1265, may comprise one or more conventional hard drives or other storage media for storing patron records which may be written, updated, and accessed through processing engine 1255, and, for storing programs executable by processing engine 1255. The stored programs may include one or more procedures, subroutines, or sets of coding for performing or enabling player-centric rewards processing such as are outlined in the description of FIGS. 1-10. For connecting the various devices, such as servers at the back-end and gaming machines 1100 at the front end, network fabric 1206 may include, but is not limited to, an IP-based local area network backbone, such as Ethernet. As may be appreciated, other functionally comparable network backbones may be utilized.

For instance, in an example system such as is shown in FIG. 12A, gaming machine 1100 may utilize network interface 1125 to connect with rewards server 1250 through network 1206. A player card connectable through user card interface 1140 to gaming machine 1100 may contain sufficient information which when read such as by user card interface 1140 may be used to identify a player at gaming machine 1100 either directly from the information stored on the card and/or by transmitting player card identification information to query a network-connected server and database containing player records such as rewards server 1250 or a separate player tracking server (not shown) and accessing a patron's player records remotely. Once the patron's records have been accessed, a query may be sent to rewards server 1250 either from gaming machine 1100, a player tracking server, a host computer connected to various servers connected to the network, or other conventional network communicating device inquiring whether the patron is eligible to receive a player-centric reward, such as a bonus game. Responsive to the query, rewards server 1250 may transmit a patron reward message to gaming machine 1100 which may cause a message and/or video to be displayed for viewing by the patron on either an iVIEW-type display, a main display, or other information medium, a speaker for example, apprising the patron of an available reward, possibility of a reward based on continued play, and/or providing an entertaining audio and/or video transmission.

In one example embodiment, the patron's player records including current player points and reward level may be downloaded to gaming machine 1100 from rewards server 1250, a player tracking server (not shown), or some other networked computer and/or database. As the patron proceeds to play, the player points and/or rewards level may be increased or decreased as discussed more fully above until the player points matches or exceeds the threshold required to play the selected bonus game, at which point the patron may become eligible for a player-centric award as discussed more fully above. As also discussed above, the patron's information may be utilized to compare against possible player-centric rewards, such as a bonus game, to determine the patron's eligibility. In another embodiment, the player points and/or rewards level may be maintained and updated on a server, such that as a patron plays, information is sent to the server concerning each play and the player points and rewards level are increased or decreased in accordance with a procedure such as is shown and discussed more fully above with reference to FIGS. 1-10.

In the case of a network-connected player database and/or server accessible by one or more gaming machines 1100 as through network interface 1125 over network 1206, an operator may identify and rate players, either through direct data input or conventional software designed to perform the identification and rating functions on a host computer or player tracking server based upon play over a period of time. Based upon the player rating, a procedure may be implemented as with a computer module executed by rewards server processing engine 1255 that associates ratings of players with operator determined tiered player levels and according to the tiered player levels establishes eligibility for player-centric rewards as discussed above. The eligibility information may by example be stored according to player tier levels or on an individual player basis, in a player tracking database which may be updated either in real-time or on a periodic basis through the player tracking server. When a player inserts a player card or otherwise identifies themselves, a gaming machine may access and utilize the information stored on the networked system to determine the eligibility of a player for player-centric rewards. In the case where the player-centric rewards bonus program resides on the gaming machine, then it may begin execution upon determining that the player at the gaming machine is eligible and requests to play the game.

Alternatively, the player-centric rewards bonus program may reside on a server such as rewards server 1250 or remote from gaming machine 1100. In this case, gaming machine 1100 may simply provide the incrementing and comparison functions, and transmit a message to the server when the threshold is met for an award to be offered to a patron. For instance, when a player is identified at a gaming machine as eligible for player-centric rewards, then the player-centric rewards bonus program may begin executing such as through processing engine 1255. The instruction set may include sending a message to gaming machine 300 to set and increment a player point counter in accordance with play by the eligible player and to send a message to the server, for example, when the player points reach or exceed one or more thresholds associated with the bonus game.

In another alternative, the gaming machine may provide game play information on a real-time basis to the server which may perform the incrementing and comparison functions, as well as the rewards processing. Upon the server executing a bonus game and determining an award to be offered, the server may create and store a record which may be associated with the patron's player information and may also send a message to gaming machine 300 to notify a patron of the award offer. In the case of an award, a patron may be required to make a collect request as by pressing a "Collect" button or key and/or by entering a PIN. Alternatively, in each case discussed above, an award may simply be automatically credited to gaming machine 300 without any further action required by the patron. Conditions may or may not be included with an award or award offer, such as that the patron utilize or redeem the award within a period of time which may be determined by an operator.

Continuing to refer to FIG. 12A, in one or more embodiments, user input devices 1235 may include a processor, memory, and associated components as may be implemented on a printed circuit board and the player points and reward level of a player may be received by this circuitry and related software for decrementing or incrementing as the case may be upon each play by the patron. In these example implementations, the wager information may be passed from microprocessor 1110 or another processor with access to wagering information, in accordance with an instruction from the processor in order that the player points and/or rewards level be correctly adjusted.

In one or more example embodiments, a game monitoring processor unit, such as a Bally GMU, may be implemented separate from microprocessor 1110 and the processor that may be included with user input devices 1135, such as Bally's iVIEW, but may be connected to both for receipt of gaming information and player information, respectively. In these example implementations, the player points and/or rewards level may be maintained with the game monitoring processor unit and the wager information will be passed to it from or in accordance with an instruction from microprocessor 1110.

In each of the examples described above, the player points and/or rewards level may be increased or decreased by a gaming and/or one or more related processors incorporating programming to effect steps, such as in accordance with the processes described by example with respect to FIGS. 1-10. When the pre-determined number of plays is reached by the patron then a signal may be sent to display 1139 (FIG. 11B) (incorporated with user input devices 1135) and a celebratory show may be presented to the patron from a memory (which may be part of user input devices 1135 or otherwise stored on gaming machine 1100) to apprise the patron that the patron is eligible for an award. In the case, where gaming machine 1100 is not network connected, then the bonus game program may be initiated to determine whether the player wins and what award the patron may receive, such as player points and/or cash awards.

Continuing to refer to FIG. 12A, rewards server 1250 includes processing engine 1255 which may communicatively connect to sweepstake database 1260 and birthday database 1265. As shown, gaming machine 1100 may include network interface 1125, such as one or more conventional network PCMCIA cards or a Bally ACSC NT-board, GMU, or GTM, to facilitate IP-based or address-based communication of some form with other networked devices, such as the rewards server 1250 and the like. Through the network, microprocessor 1110 may communicate with rewards server 1250 to facilitate execution of various rewards transactions. In one or more embodiments, the network interface 1125 may be used to download one or more gaming presentations or other software and/or data from the gaming server. To facilitate placement of wagers using a credit or debit card through a credit card reader (not shown) that may be connected to gaming machine 1100 as by example through user input devices 335, user card interface 1140, and/or peripheral devices 1145, network interface 1125 may be used to communicate with a banking server (not depicted), which connects to a financial institution that has issued the financial card, conduct a credit card authentication process, and then credit the requested amount to gaming machine 1100. The accounting server issues credit confirmation to gaming machine 1100, which in turn allows the casino patron to place the desired wager on the machine and to proceed with the game. In a progressive gaming network environment where several gaming machines 1100 compete for a single jackpot prize, the network interface 1125 may be used to communicate with other gaming machines 1100, as well as with a game monitoring server (not depicted) to synchronize a jackpot value and other parameters.

Figure 12B:
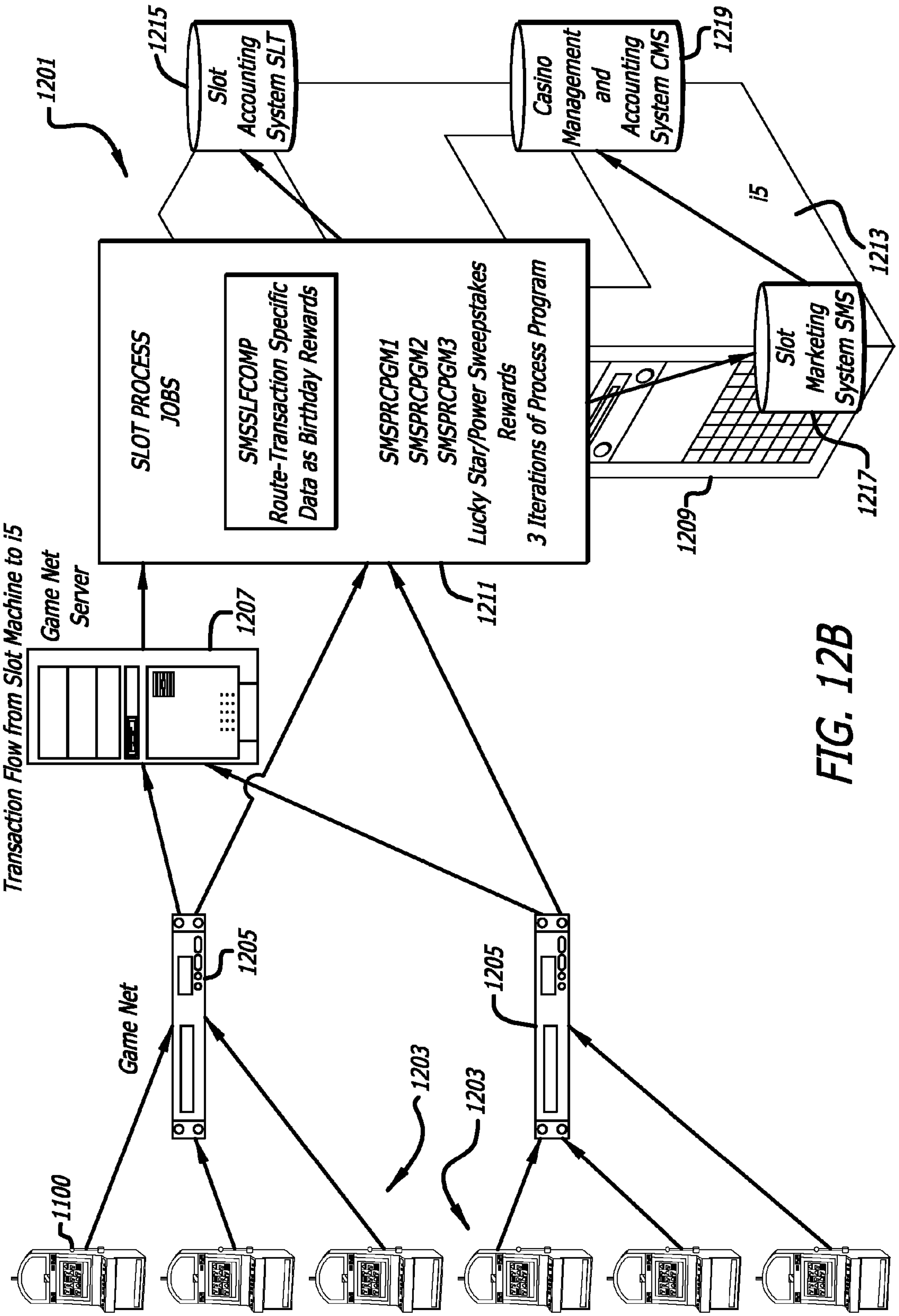

Referring to FIG. 12B, networked gaming system 1201 is shown in accordance with one or more aspects of the invention wherein banks 1203 of gaming machines 1100 are connected to router 1205, router 1205 connects to router server 1207 and multiple backend subsystems 1209 including player-centric rewards programming enabling the executing of slot process jobs 1211. By example, networked gaming system 1201 may be conventionally architected such as with conventional Bally gaming machines and a conventionally available ACSC SMS and CMS products implemented with the IBM iSeries products with modifications to selected portions of the player tracking software to incorporate the player-centric rewards such as those described above with respect to FIGS. 1-10.

Routers 1205, such as a conventionally available Bally ACSC Game Net device, may be programmed to consolidate gaming data and other communications from respective bank 1203 of gaming machines 1100 into packets and to transmit the packets according to the routers programming to game net server 1207 and/or pre-determined portions of multiple backend systems 1209. Routers 1205 may receive a notification of each transaction at their respective banks 1203, modify the information prior to transmission to router server 1207, such as a conventionally available Bally ACSC Game Net server, and selected portions of multiple backend subsystems 1209 according to router 1205 programming. For example, when a patron inserts the patron's card in a card reader of gaming machine 1100, the information is read from the player card and transmitted to router 1205 which in turn sends the player information to selected portions of multiple backend subsystems 1209 and a query may be made whether the patron is eligible for a player-centric reward, such as a bonus game. Additionally, upon a patron playing sufficiently to match the bonus game's requisite player points, router 1205 connected to the respective player's gaming machine 1100 may be programmed to transmit a message to a rewards server, such as shown in FIG. 12A, which may be implemented as part of multiple backend systems 1209.

Multiple backend systems 1209, such as may be conventionally architected using Bally's ACSC SMS and CMS iSeries-based products, may be programmed to process player-centric slot process jobs 1211. The iSeries-based products implemented in the Bally architecture may include i5 server 1213, which are originally manufactured by IBM and programmed by Bally to perform networked gaming systems functions. Amongst the programming that may be implemented may be player-centric rewards programming to perform the steps described in the figures and description herein. To accomplish various networked gaming systems functions including player-centric rewards processing, multiple backend systems 1209 may include slot accounting system (SLT) 1215, slot marketing system (SMS) 1217, and casino management and accounting system (CMS) 1219. Each of the respective systems may be under the centralized control of a host computer the function of which may be performed by is server 1213. Additionally the respective functions of systems 1215, 1217 and 1219 may be implemented through programming of separate servers or a single server such is server 1213. A workstation (not shown) may connect to is server 1213 and may include a conventional display, keyboard, and mouse enabling an operator (user) to run respective programs associated with systems 1215, 1217 and 1219 and modify the operation of the respective systems through the selection of various options such as player-centric rewards criteria. For example, upon a patron inserting a player card into a gaming machine 1100 connected to networked gaming system 1201, a message may be sent to is server 1213 that contains patron information and initiates one or more slot process jobs 1211 according to the programming of is server 1213 to determine whether the patron is eligible to playa bonus game.

Programming of is series 1213 may be triggered upon receipt of the patron information that includes sending selected patron information and a query to slot marketing system 1217. In parallel, is series 1213 may send patron and gaming machine 1100 identifying information and a transaction report to slot accounting system 1215. On determination of a patron's eligibility for a birthday reward, SMS 1217 may send a message to EMS 1219 to make a record of the transaction and a message may also be sent from multiple backend systems 1209 to gaming machine 1100 notifying the patron of the birthday reward. Similarly, slot process jobs 1211 may be initiated on is series 1213 upon a patron meeting the playing criteria for eligibility for one or more player-centric rewards, such as Bally Live Rewards. One or more aspects are described in the following example discussion as may relate to the system and rewards shown in the figures:

Live Rewards

Live Rewards offers carded players bonus games through an existing iVIEW-equipped slot machine. This feature creates a gaming experience designed specifically to increase wagering activity. Once a player's club card is inserted into the slot machine, each bet on the base game brings the player closer to earning bonus game play. Once the minimum game play requirements have been met, the bonus game either starts automatically or the player can press a button to start the game. Bonus game winnings can be awarded in cash (to be transferred to the base game through an electronic funds transfer) or in bonus points. Live Rewards bonus games require base game play; they cannot be played directly. Live Rewards uses high-resolution, animated graphics, sound, and a touch-screen display to provide players with bonus game content. This content is managed by the Live Rewards Server through the Windows-based Live Rewards management application. There are currently two bonus games available through Live Rewards: Blue Spot Bingo and Payday Poker.

Live Rewards Player Interface

The Live Rewards user interface runs on the iVIEW display, allowing players to play bonus games and transfer their cash winnings to the base game. Players can choose from two Live Rewards bonus games: Blue Spot Bingo and Payday Poker.

Play Point and Game Play Indicators

Live Rewards has two distinct counters that determine the player's bonus game experience: Play Points and game start threshold.

Play Points are used to determine the pay table used for the bonus game—the more Play Points a player accrues, the higher the payout amount (equal to one cent for determining prizes on bonus game pay tables) of the corresponding pay table. A Play Point is defined as one cent of every dollar bet at the base game. This is a pre-set, non-configurable value that has no actual monetary value and cannot be redeemed. The rate at which a player accrues Play Points is determined by the player's club membership level and is configured through the Live Rewards Server. Players track Play Point accrual through the reward level indicator on the left-hand side of the screen. As Play Points are accrued and the reward level increases, the player sees poker chips stack up. When game play begins, the number of Play Points used for the game is determined by the number of Play Points accrued minus the number of Play Points in the highest qualifying Pay table. The game start threshold determines when a player has played enough base games to start a bonus game. For each base game played, the player earns a Threshold Counter, which is depicted on the user interface as a light surrounding the selected game logo. A player earns a Threshold Counter based on the number of games played the time spent playing, and the maximum bet for each game.

Play Points

Play Points are the unit currency used by the player to play a Live Rewards game. Play Points are earned based on Base Game Wager times and the accrual rate set for each player's club level. Play Points have no redeemable value, but are considered to be worth $0.01 for the purpose of deriving the Live Rewards game pay tables. This value cannot be adjusted by the user. Play Points are restricted to the play of Live Rewards games and are not cashable. Play Points earned on the iVIEW are transferred to the player's session account on the Live Rewards Server before any Live Rewards game begins and at player card removal. Play Points are deducted from the player's server account when a Live Rewards game is played.

The amount of Play Points deducted is determined by the amount of Play Point accumulated when the player has played a number of games equal to the Live Rewards Game Start Threshold. The number of Play Points determine which pay table the player receives with the pay table that takes the maximum number of earned Play Points being automatically selected. Play Points are awarded only by play of base game and are not awarded by any other means.

The number of Play Points awarded is equal to the product of the following equation:

=[Base Game Wager (in dollars)×Accrual Rate (set by BLRS)]/[Value of Play Points (in dollars)]

Client Side Processing of Play Points and Threshold Counters:

1—On card-in the client may register the player's card number to the iVIEW and receive the values of the reserve account for display purposes.

2—As the player plays the base game Play Points and Threshold Counters may accrue on the client.

3—At Card-out, Recovery start-up, and before a Begin Game is sent to the Live Rewards Server all Play Points and Threshold Counters accrued on the iVIEW are transferred to the Live Rewards Server.

4—When the iVIEW has determined the player has accrued enough Threshold Counters and Play Points for a game (combined total of reserve account and remaining Play Points and Threshold Counters on iVIEW) the iVIEW allows the player the option to start a game. If the player elects to start a game:

a—All Play Points and Threshold Counters are transferred via 3-stage commit to the Live Rewards Server.

b—Current totals in reserve account are returned to iVIEW.

c—If total is still acceptable to starting a game iVIEW sends a Begin Game message to the Live Rewards Server that includes the number of Play Points and Threshold Counters to be used.

d—Based on server setting send a −1 for Threshold Counters to be used may use them all.

e—The Live Rewards Server sends a response back to the iVIEW that includes a History ID number (HID) and a Success or Fail.

f—If Success is returned iVIEW proceeds to play the system game.

g—At game conclusion an End Game message is sent to Live Rewards Server via 2 stage commit (stage 1 of the 3 stages was Begin Game). The End Game message contains the value of any player winnings.

h—Winnings in the End Game are stored in the player's reserve account.

5—Bonus Points (BP's) are immediately transferred to CMS from the Live Rewards Server.

6—Cash winnings in the reserve account are shown to the player and accessible after pin-in for AFT transfer from the Live Rewards Server to the base game.

7—On recovery any Play Points, Threshold Counters, Bonus Points and cash are transferred to the Live Rewards Server.

8—On recovery, if a Begin Game was sent and an End Game was not completed the End Game is sent with a recovery status and the Live Rewards Server rolls back the Play Points and Threshold Counters used for the incomplete game are rolled back into the player's account and any reserve account for this card number/iVIEW ID is also rolled back into the player's account.

9—If the player is playing slowly and a Begin Game, End Game, or card out has not occurred in (heartbeat time length—1 minute) the iVIEW sends a heartbeat to the Live Rewards Server to keep the player's reserve account reserved.

In one embodiment the Player Page is shown to the player after a valid player card insertion at the Player Tracking panel. The player can select ePromo (funds transfers to the gaming device), Service Request, or Play Games and enter the Live Rewards gaming portal on the iVIEW. If the player selects the Play Games button then the player will be taken to the Live Rewards Game Console where they can select from multiple games. If the player earns enough Play Points and threshold counter points then they will automatically be taken from this screen and the default game will be autoplayed. This is to ensure that a player gets their bonus game even if they don't touch the user interface at all. When a player exits the Live Rewards page by pressing Player Account this is the page they return to. This is the default page that a carded in player would see during their session.

In one or more alternatives, player console 101 may display various games that are available for play, where any of the games may be selected by a player, such as by pressing the surface area in the case of a touch-sensitive display or an adjacent button. The game software may reside on a supporting game processor board which may be connected directly to the display portion of player console 101 or the game software or portions thereof may reside on the console processor board. In one or more alternatives, when a player selects a game, the game software may be transmitted from a server or gaming machine onto the console processor board.

Figure 13:
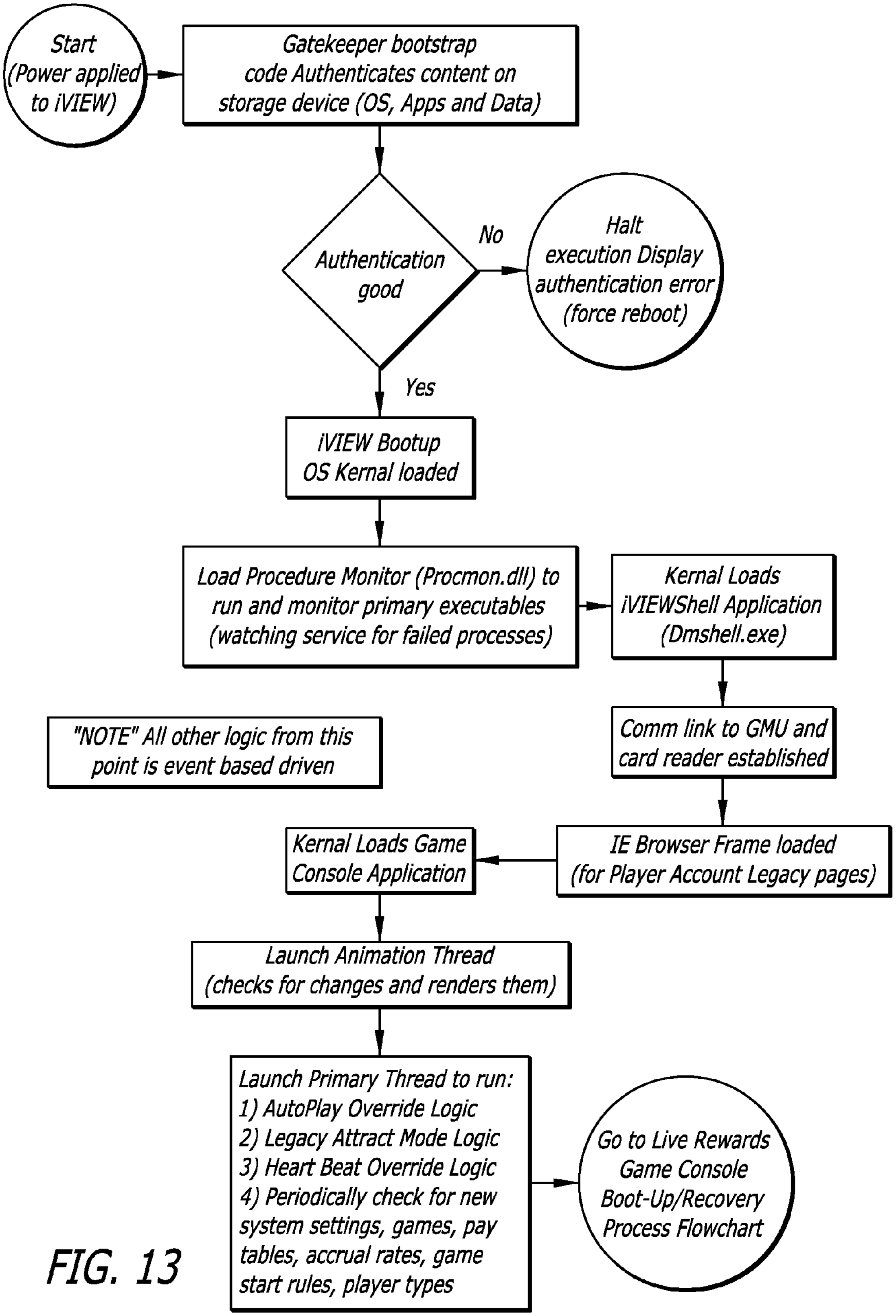
FIG. 13 is a flowchart of the boot-up process of the iVIEW and its applications.
Figure 15:
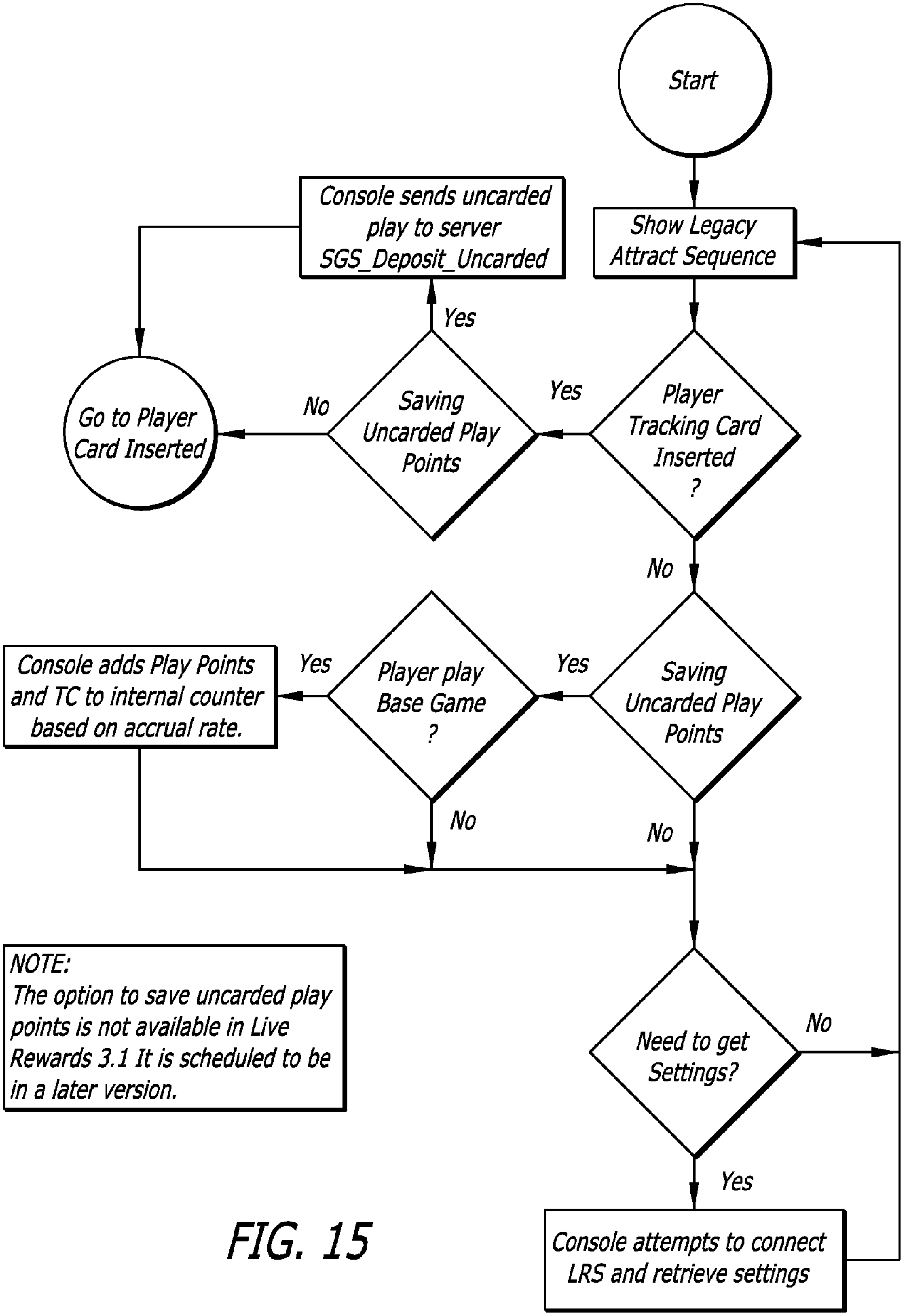
FIG. 15 is a flowchart of the Attract mode logic.
Figure 16:
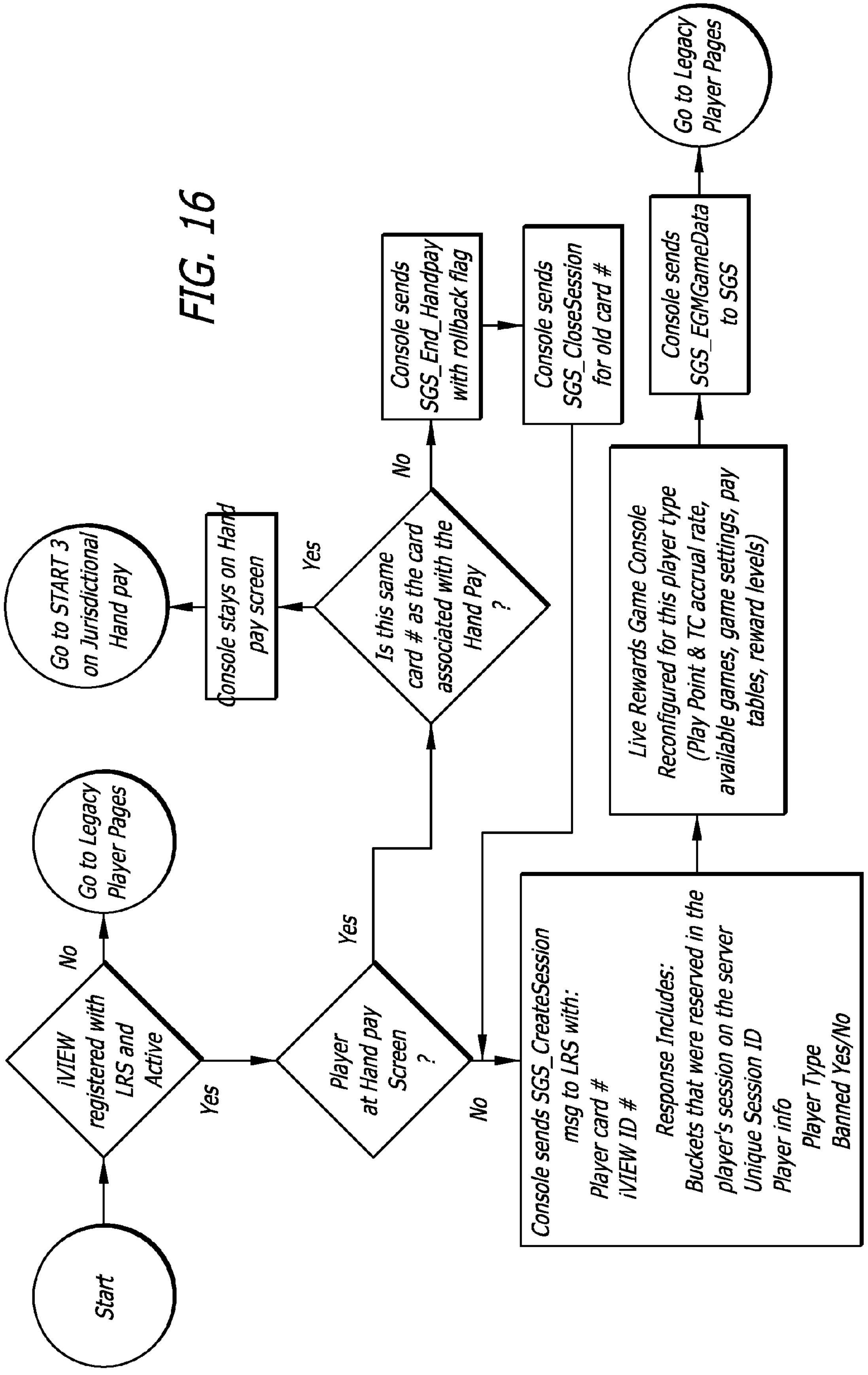
FIG. 16 is a flowchart displaying events at Player Card insertion time.
Figures 1, 17:
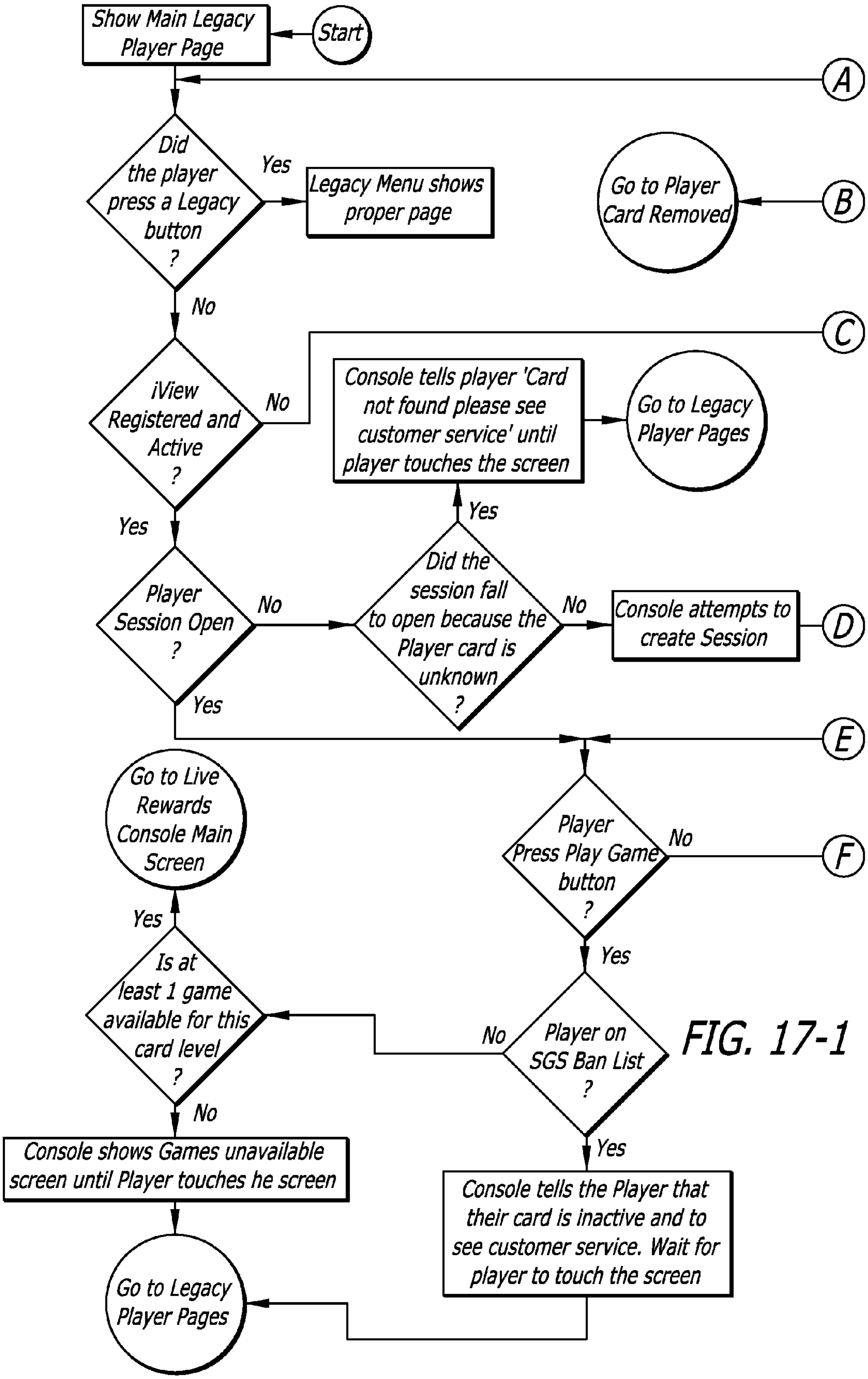
FIG. 17 is a flowchart displaying events when the player interacts with the Legacy Player Pages.
Figures 2, 17:
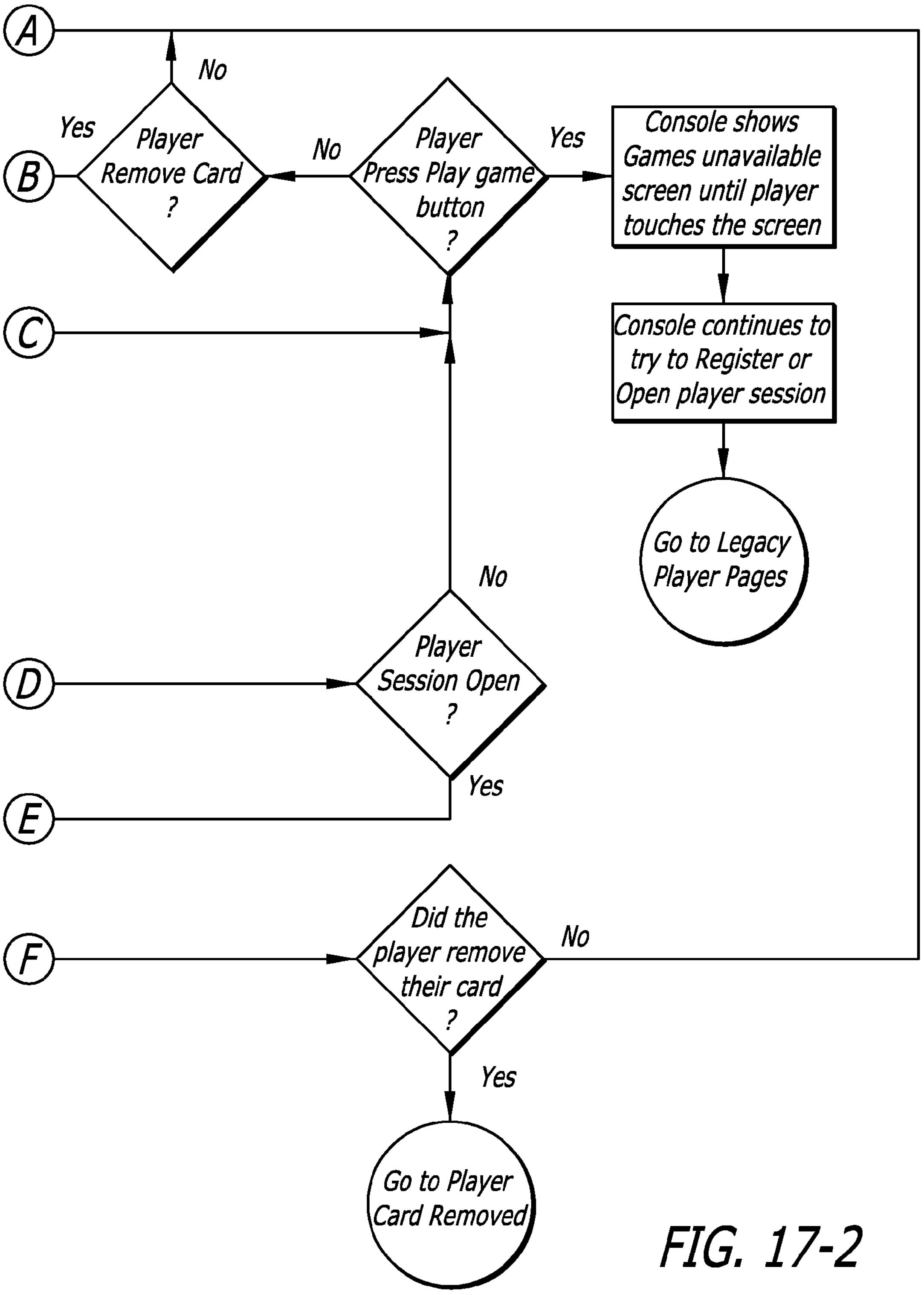
Figures 1, 18:
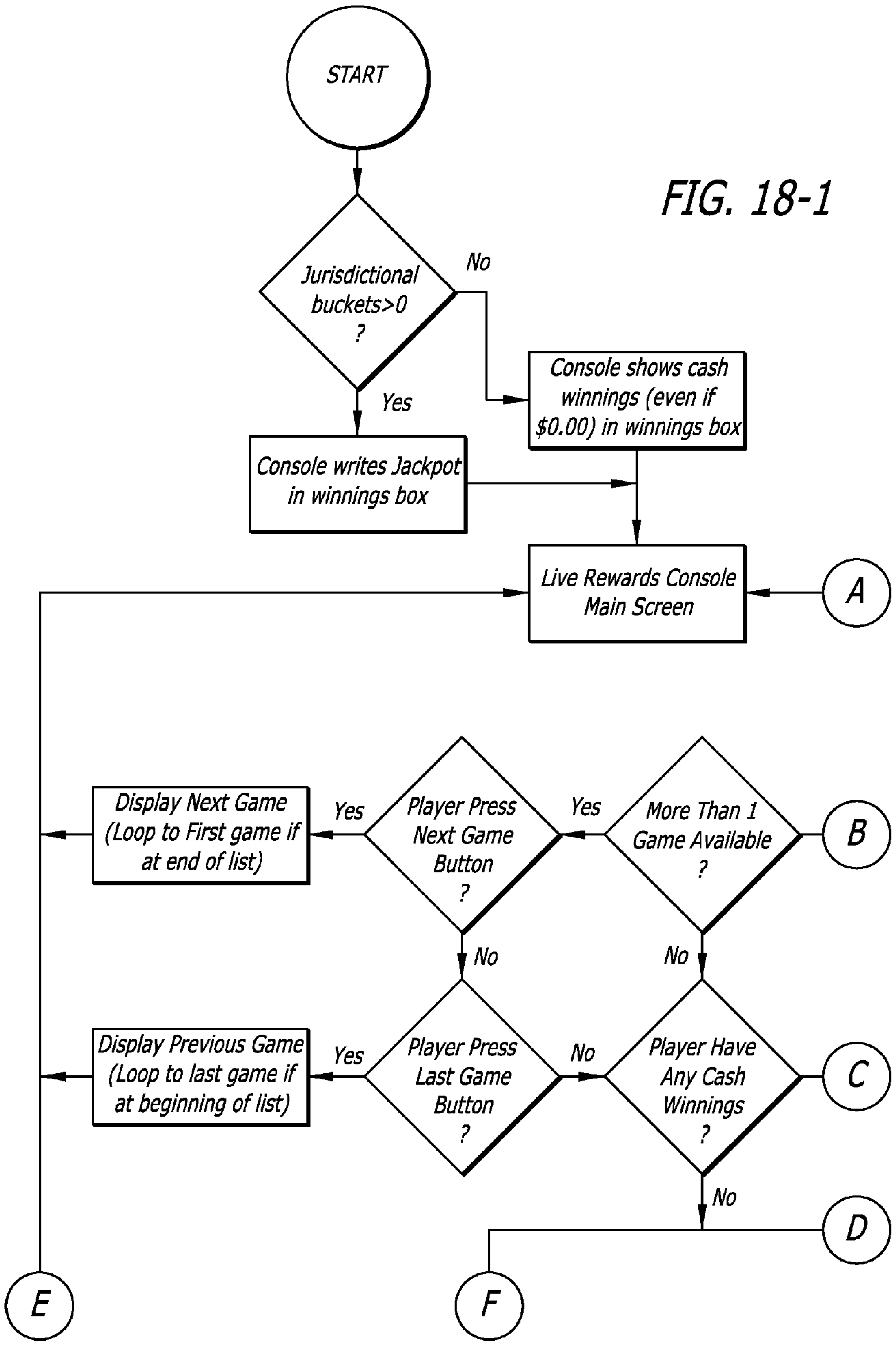
FIG. 18 is a flowchart of the System Game Console Main game screen.
Figures 2, 18:
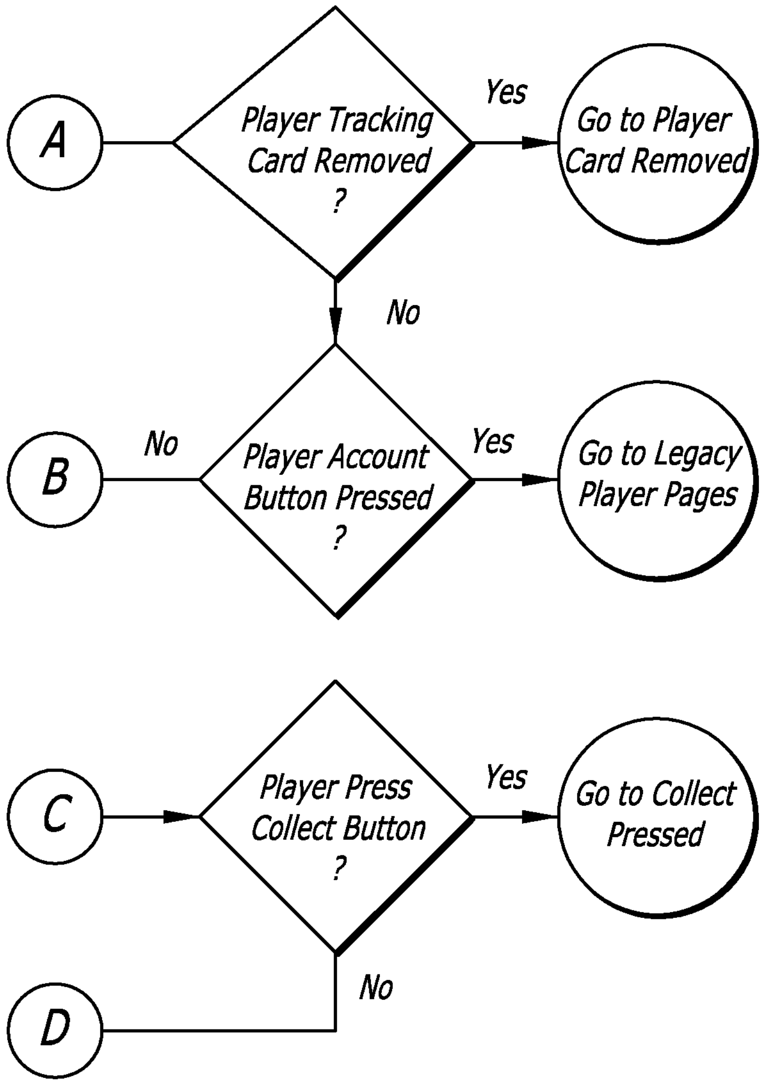
Figures 3, 18:
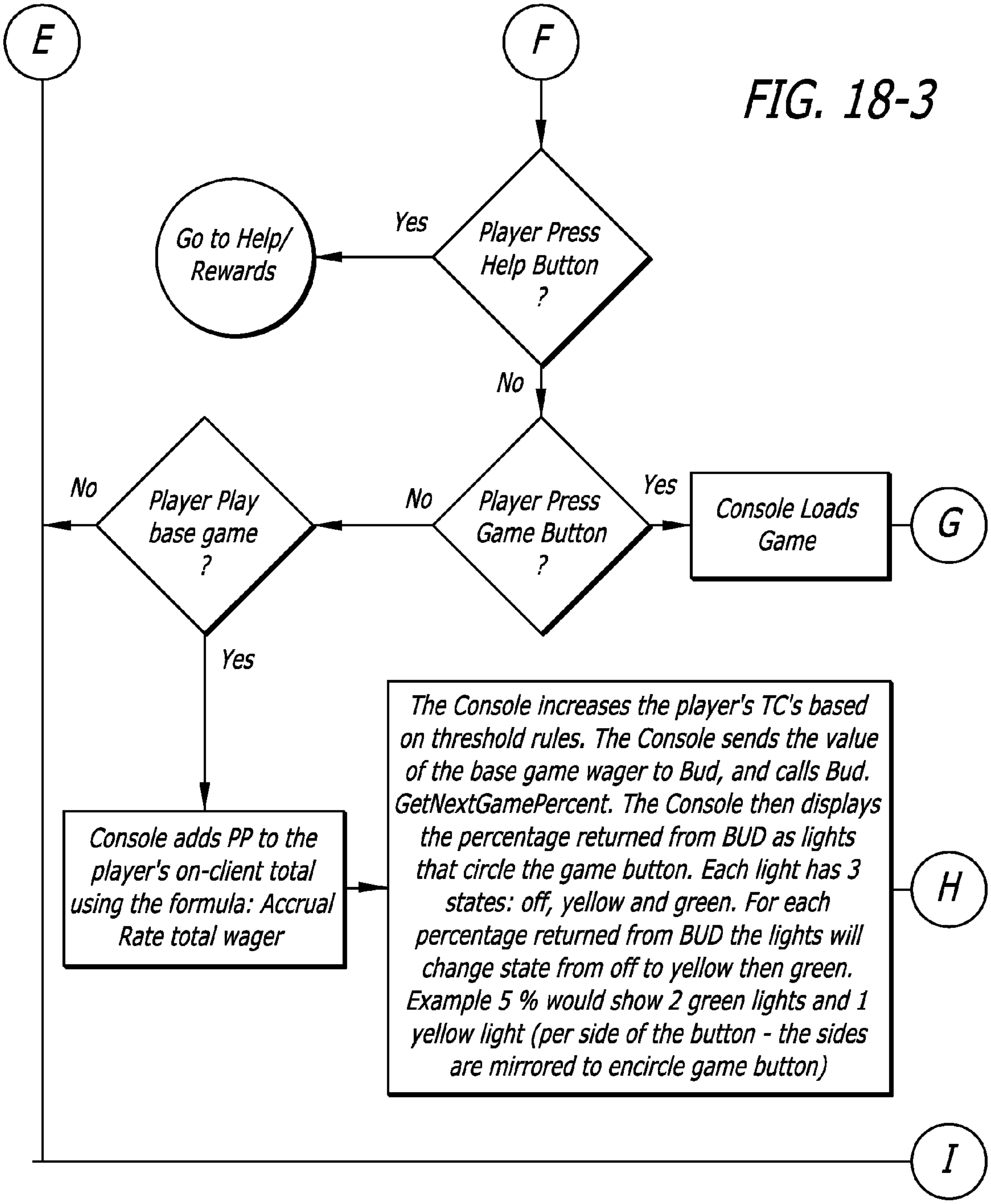
Figures 4, 18:
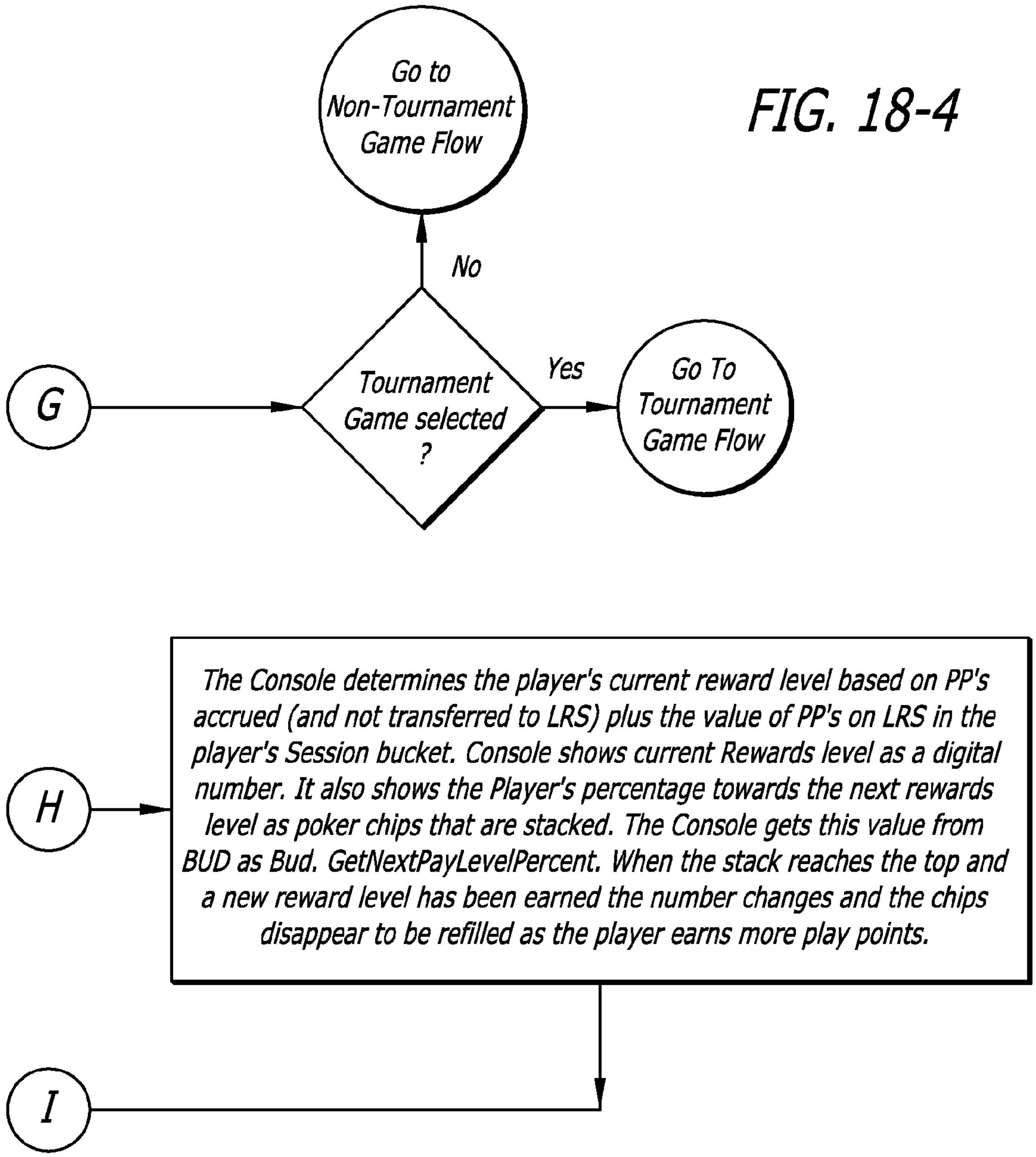
Figures 1, 19:
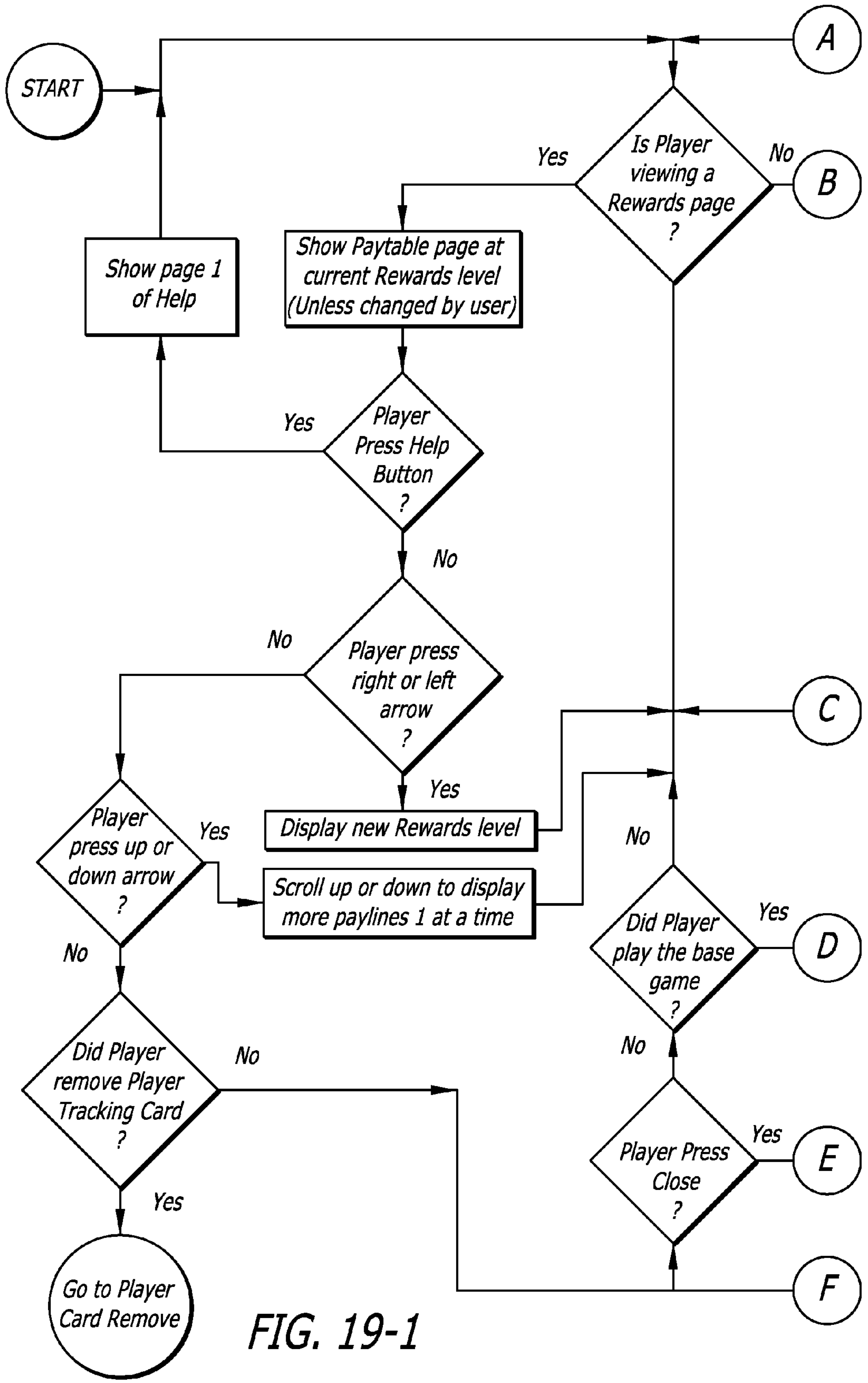
FIG. 19 is a flowchart displaying events when the player enters the Help/Rewards pages on the iVIEW.
Figures 2, 19:
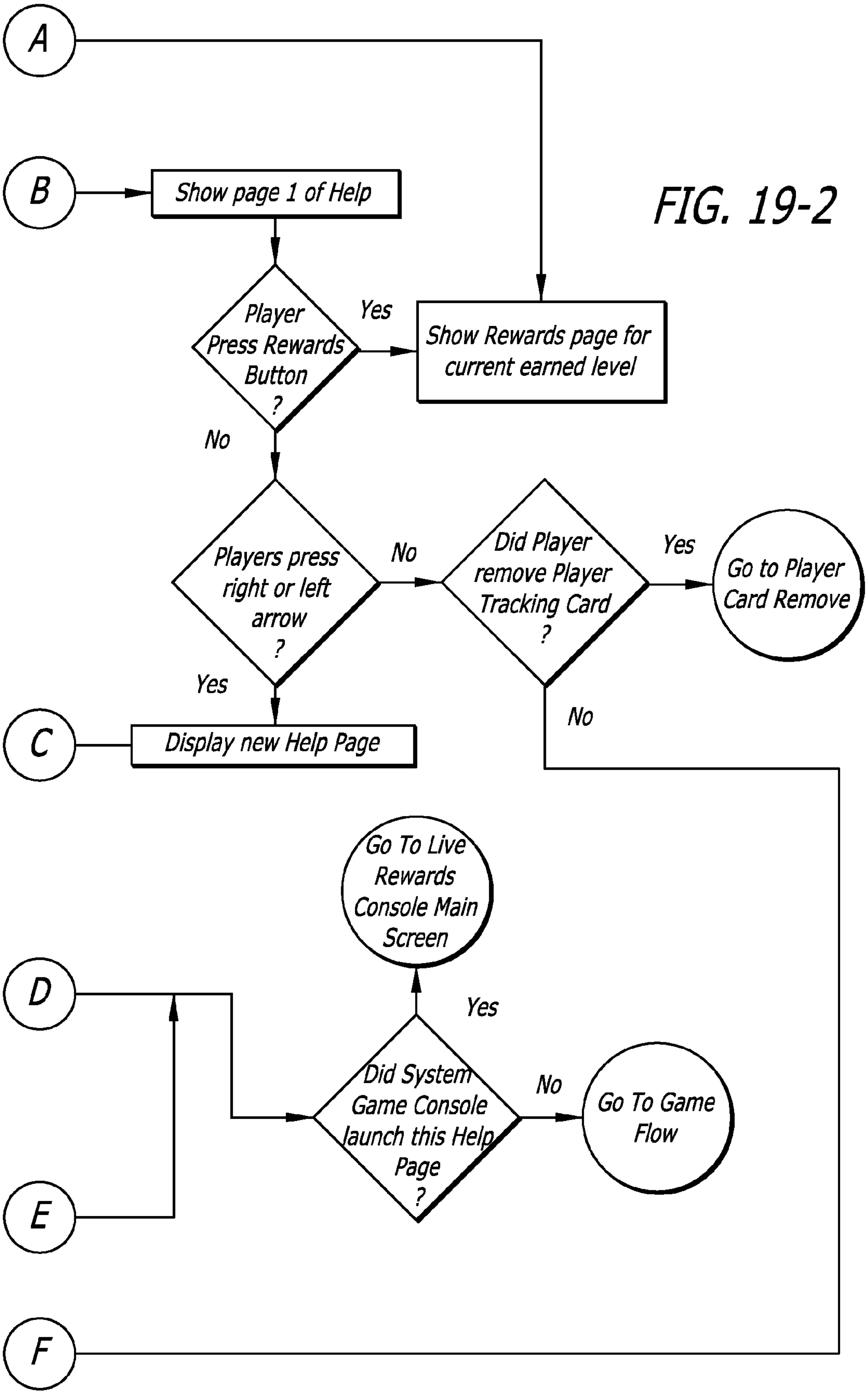
Figures 1, 20:
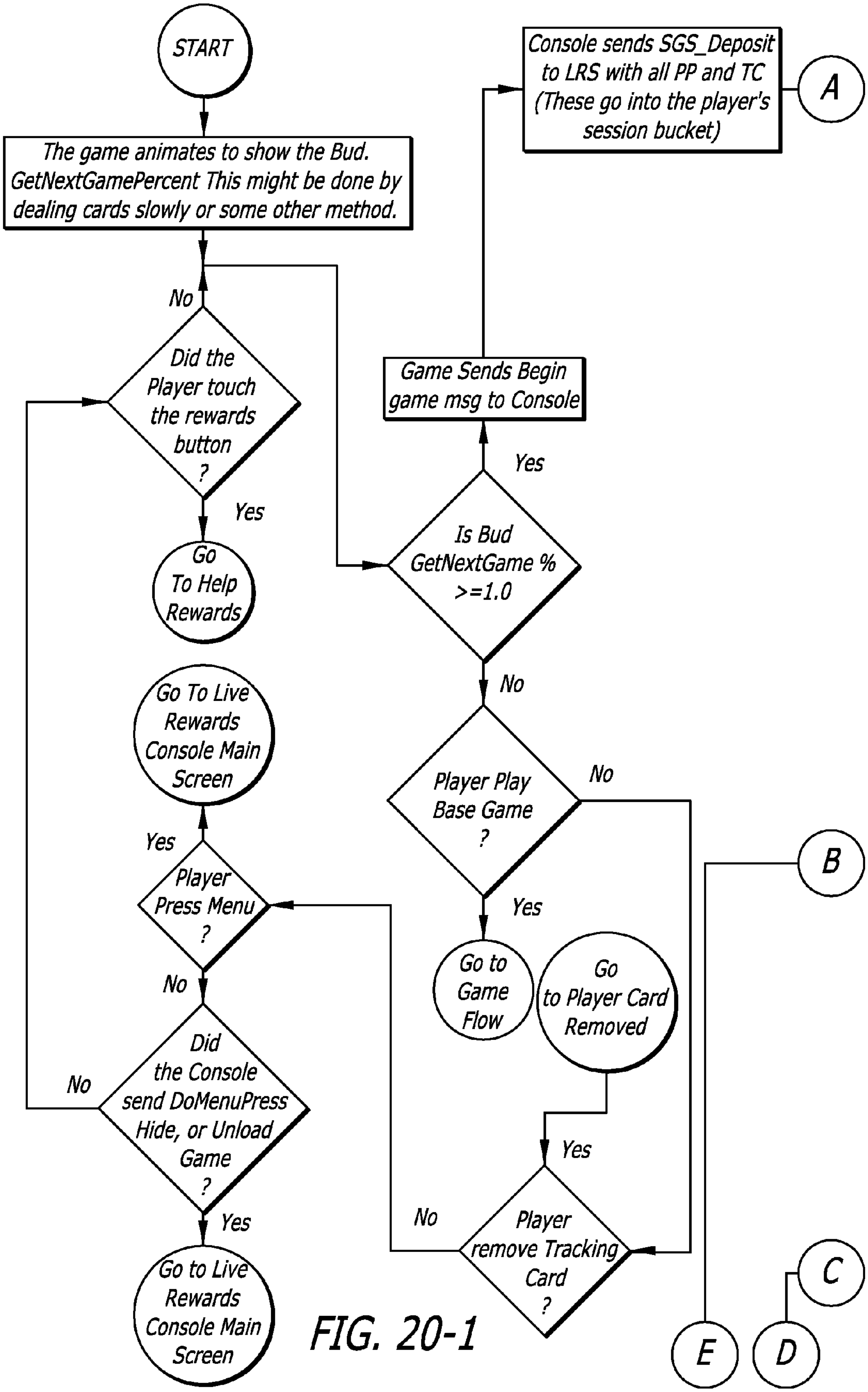
FIG. 20 is a software flowchart displaying events during a non-tournament game play process.
Figures 2, 20:
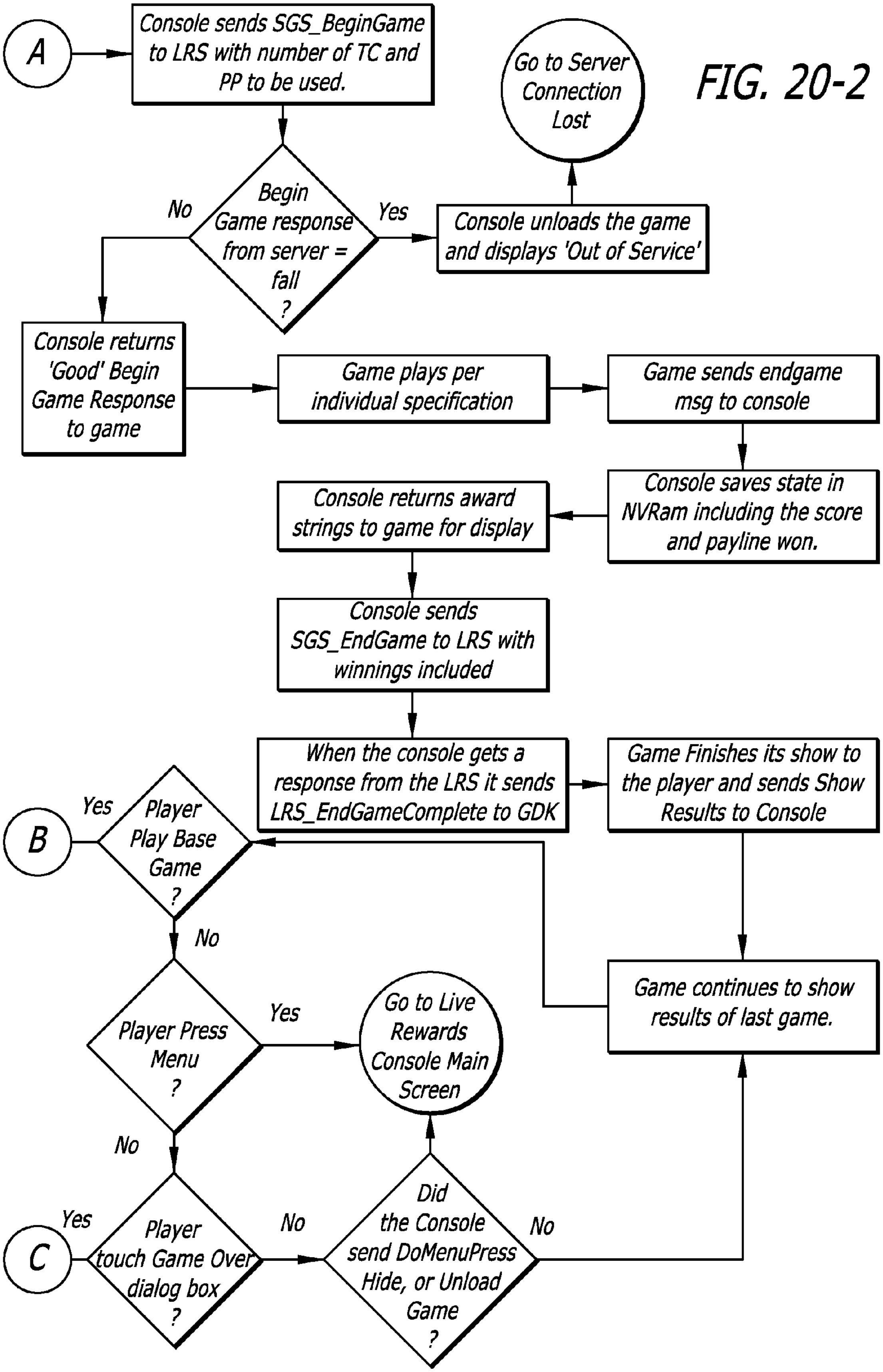
Figures 3, 20:
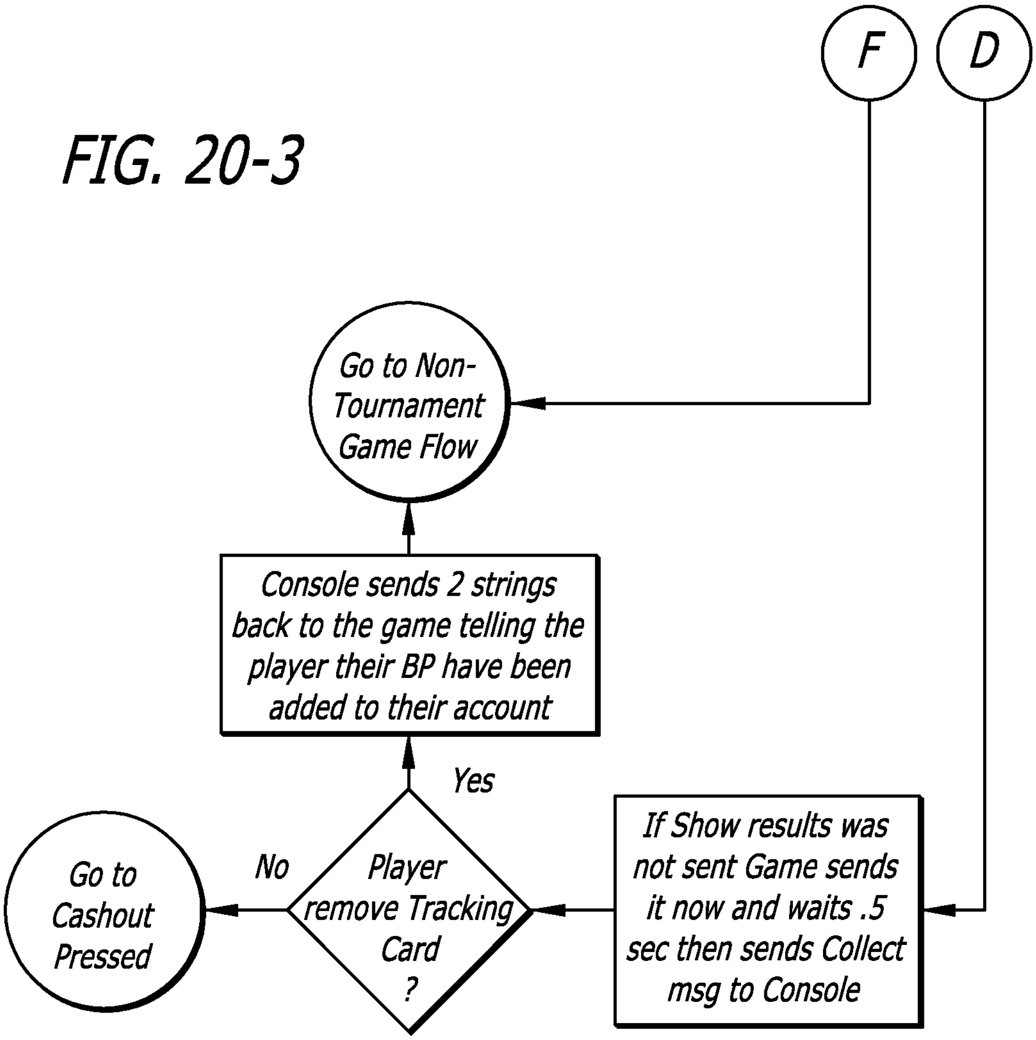
Figures 1, 21:
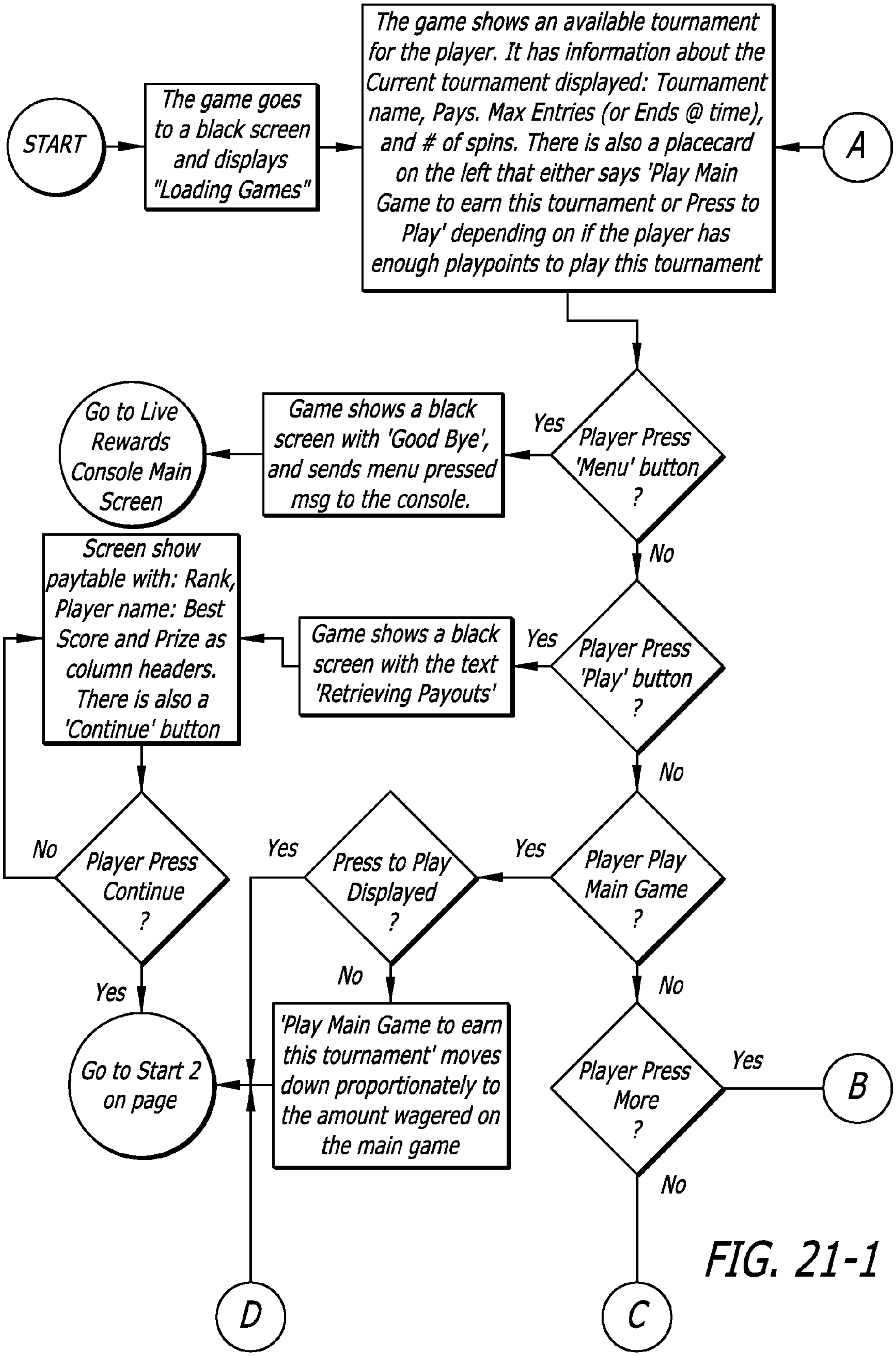
FIG. 21 is a software flowchart displaying events during tournament mode game play process.
Figures 2, 21:
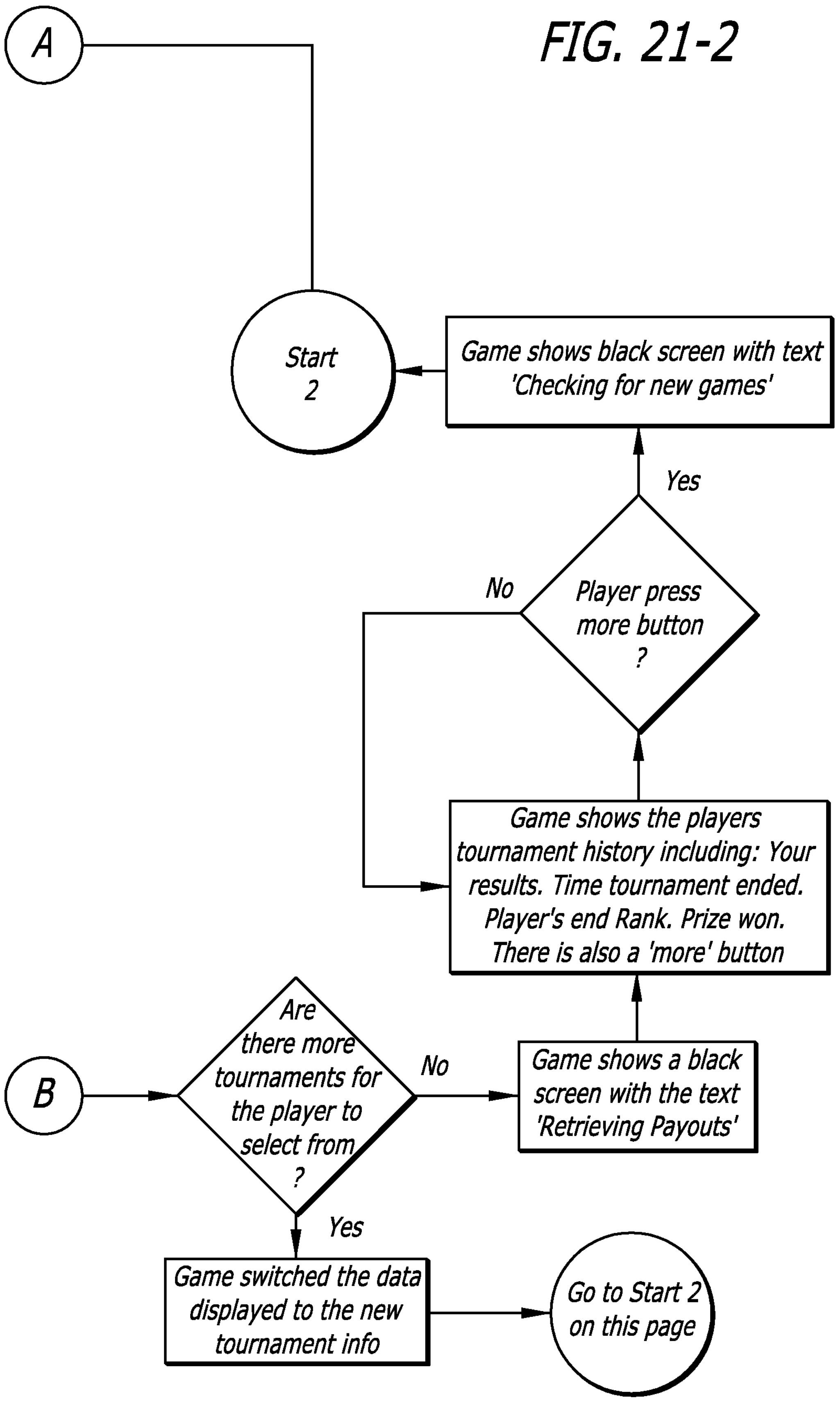
Figures 3, 21:
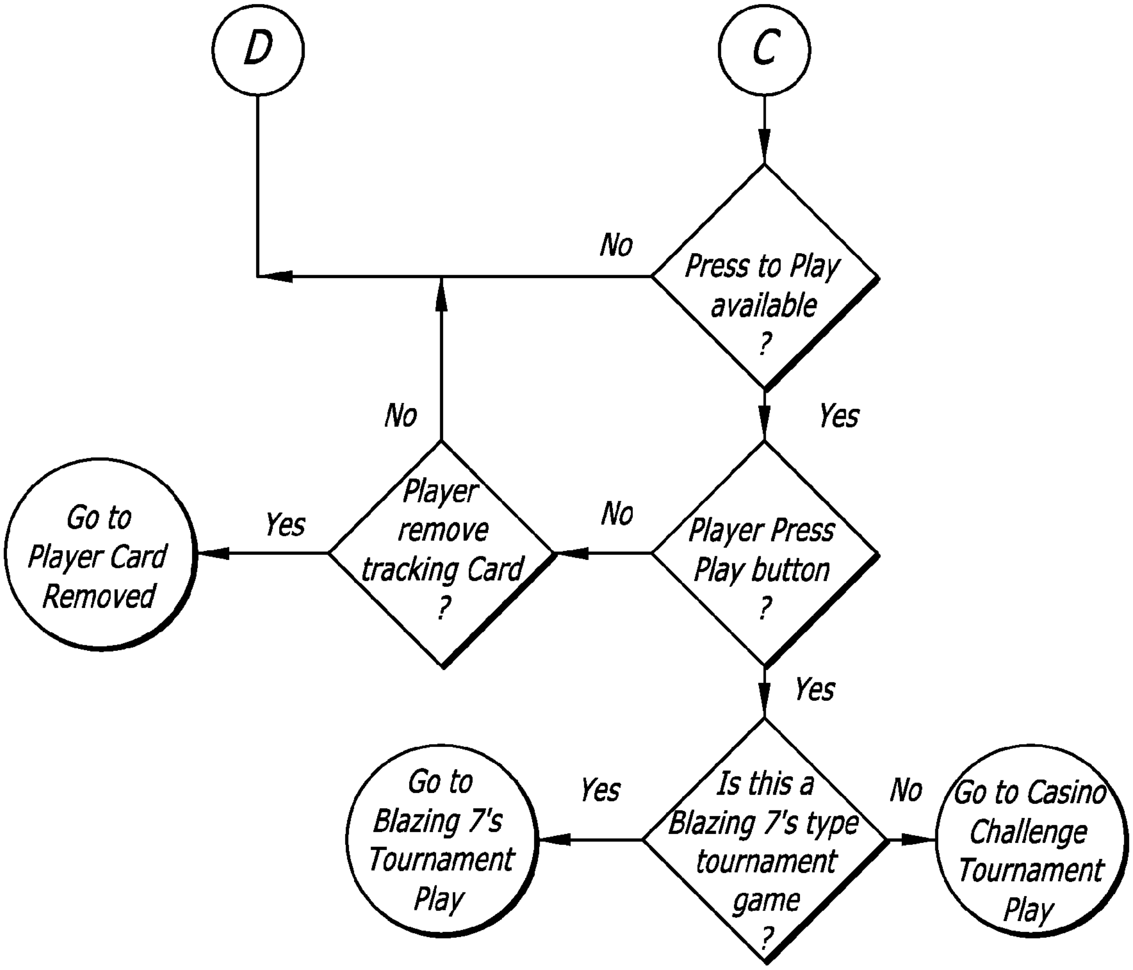

FIG. 13 is a flowchart of the boot-up process of the iVIEW and its applications. FIG. 14 is a flowchart of the Boot-up recovery process of the Live Rewards games on iVIEW. FIG. 15 is a flowchart of the Attract mode logic. FIG. 16 is a flowchart of what happens at Player Card insertion time. FIG. 17 is a flowchart of what happens when the player interacts with the Legacy Player Pages. FIG. 18 is a flowchart of what happens when the on the System Game Console Main game screen. FIG. 19 is a flowchart of what happens when the player enters the Help/Rewards pages on the iVIEW. FIG. 20 is a software flowchart of what happens during a non-tournament game play process. FIG. 21 is a software flowchart of what happens during tournament mode game play process.

Figures 1, 22:
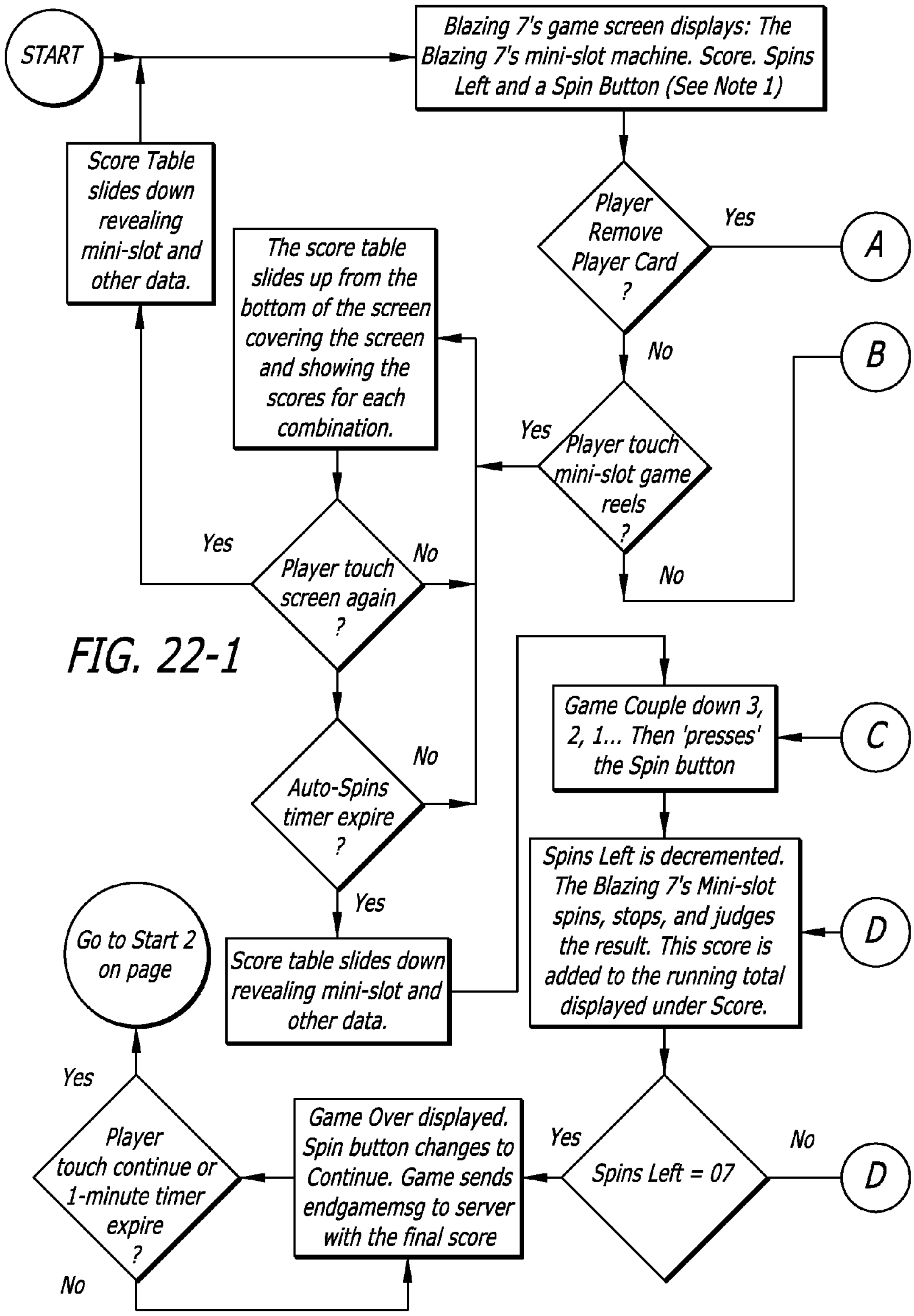
FIG. 22 illustrates an example Blazing 7's tournament game play process.
Figures 2, 22:
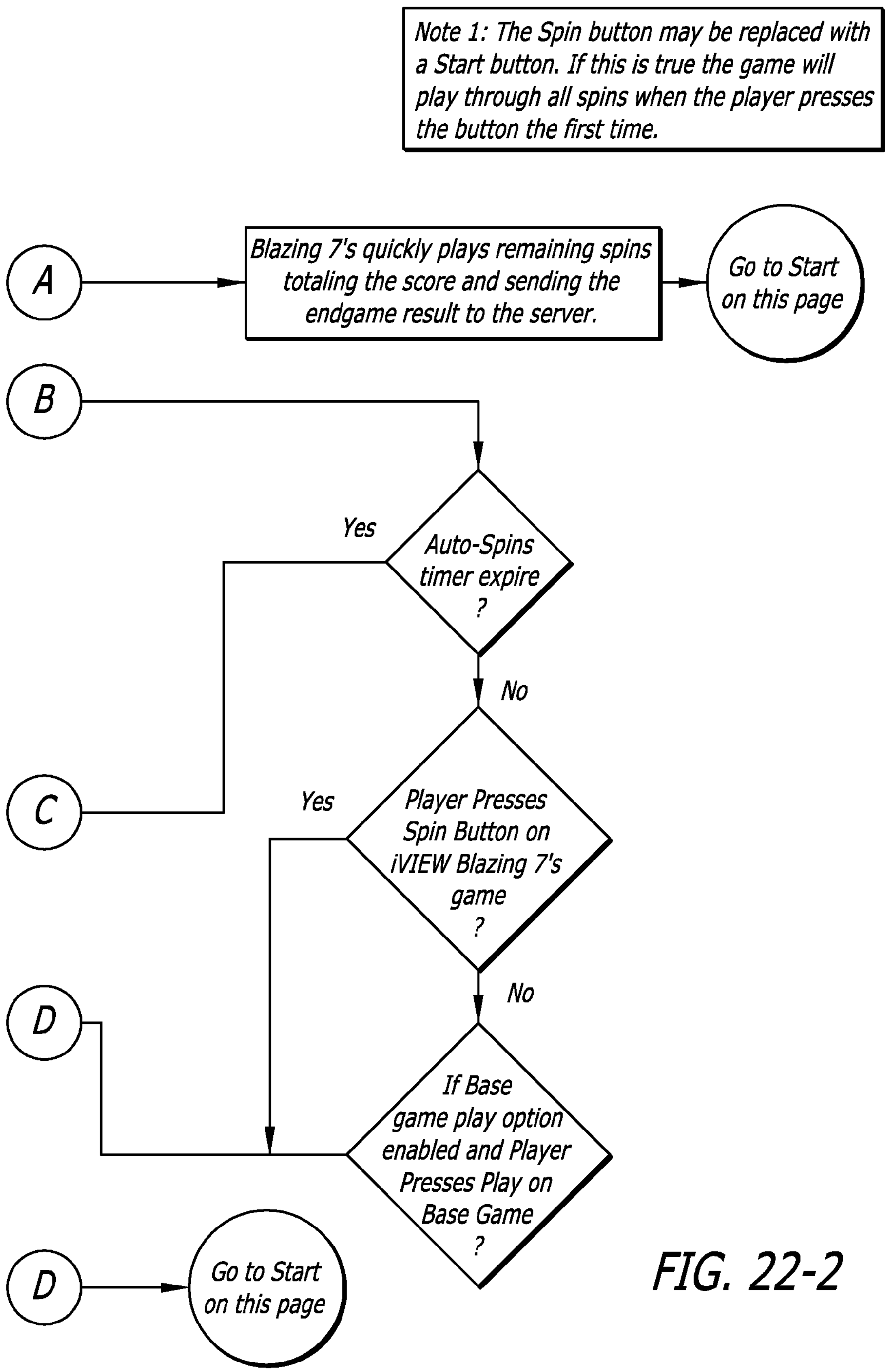

FIG. 22 is the Blazing 7's tournament game play process. Blazing 7's tournament game is played on the iVIEW itself. It is a multi-spin reel spinning game that creates a tournament score that grows with each spin of the game. The spin button can be pressed on the Blazing 7's game being played on the iVIEW to play of the game. Once the outcome is determined from this spin it is added to the cumulative tournament score. Once all spins for this configured tournament are complete the tournament score is frozen and sent to the server for later judgment against the other tournament scores for this tournament. An alternative to pressing the spin button on the iVIEW Blazing 7's game screen is that the player can press the spin or play button on the base game or any commit wager. This wager is processed by the GMU and is sent to the iVIEW. The Blazing 7's game will then get this information and will press its own spin for the Blazing 7's game on the iVIEW. This effectively creates a concurrent gaming effect where the players wager on his/her primary game earns a spin on the secondary bonus game on the iVIEW device. In an alternate embodiment, the system game can allow the single wager on the base game to play the primary game and a bonus game all occurring on the same gaming device processor with data displayed on a single display screen or on different screens. The spin/play/wager button on the primary game can alternately fire a spin/play game event on a bonus game that executes on the server. Server generated data would be returned to the client for presentation. In this mode the outcome is determined by the server based game.

Figure 23:
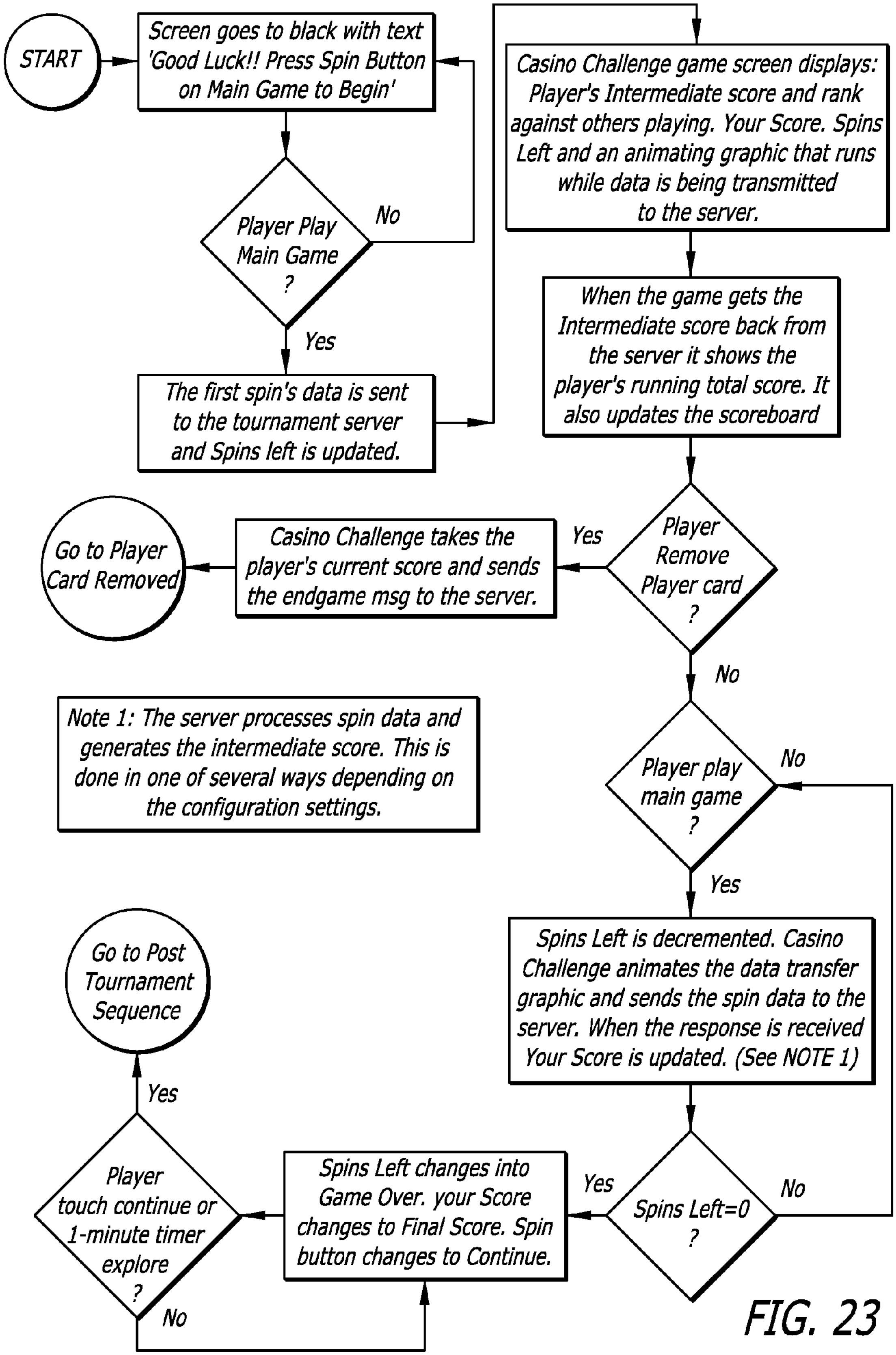
FIG. 23 illustrates an example flowchart of a Casino Challenge Tournament game play process.

FIG. 23 is a flowchart of the Casino Challenge Tournament game play process. In this tournament the base game combines wagers, wins, historical volatility, theoretical percentage and actual percentages to calculate a normalized tournament score across differently configured base gaming devices. This base game play data is used to calculate a normalized tournament score in the server. This normalized tournament score is sent back to the Casino Challenge game being displayed on the iVIEW display device. In the Casino Challenge tournament the score does not come from the game being played on the iVIEW device like the Blazing 7's tournament. It rather comes from collecting and analyzing data from another gaming device in association with the iView device.

Figure 24:
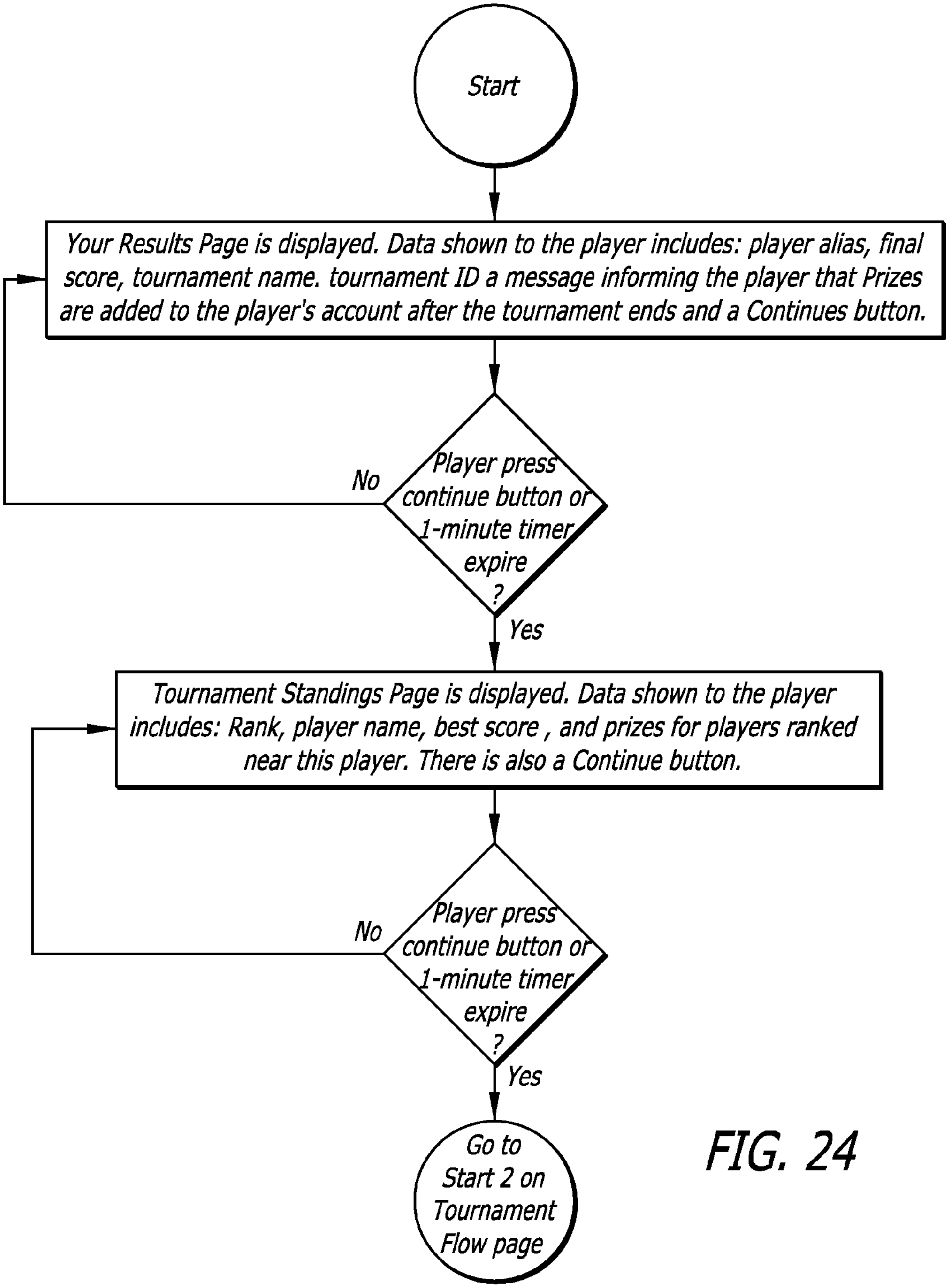
FIG. 24 is a flowchart of the post tournament process for tournaments of either type. (Casino Challenge or Blazing 7's).
Figures 1, 25:
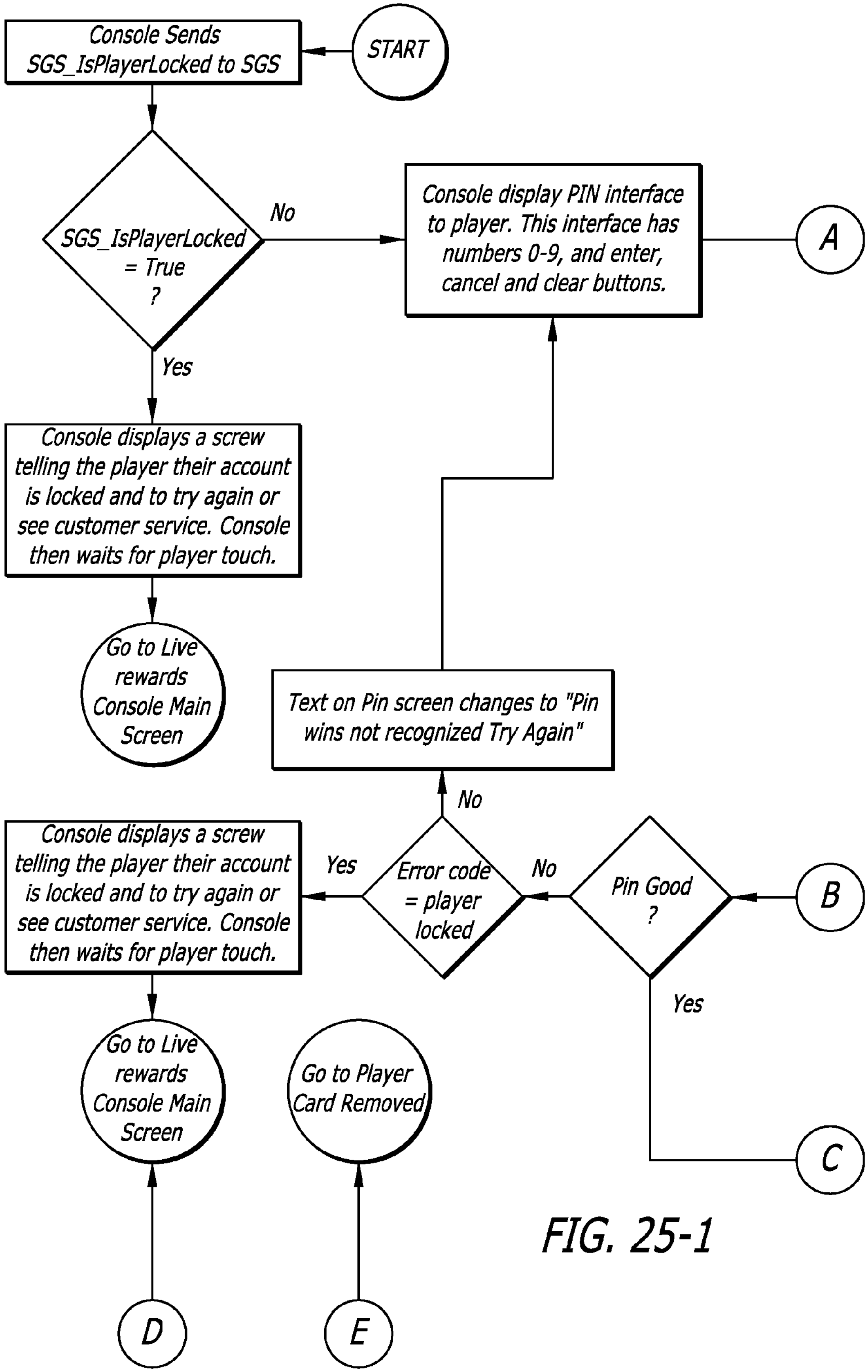
FIG. 25 is a flowchart displaying events during the cash out process after being initiated after a win is achieved in a game or from the main game console collect button.
Figures 2, 25:
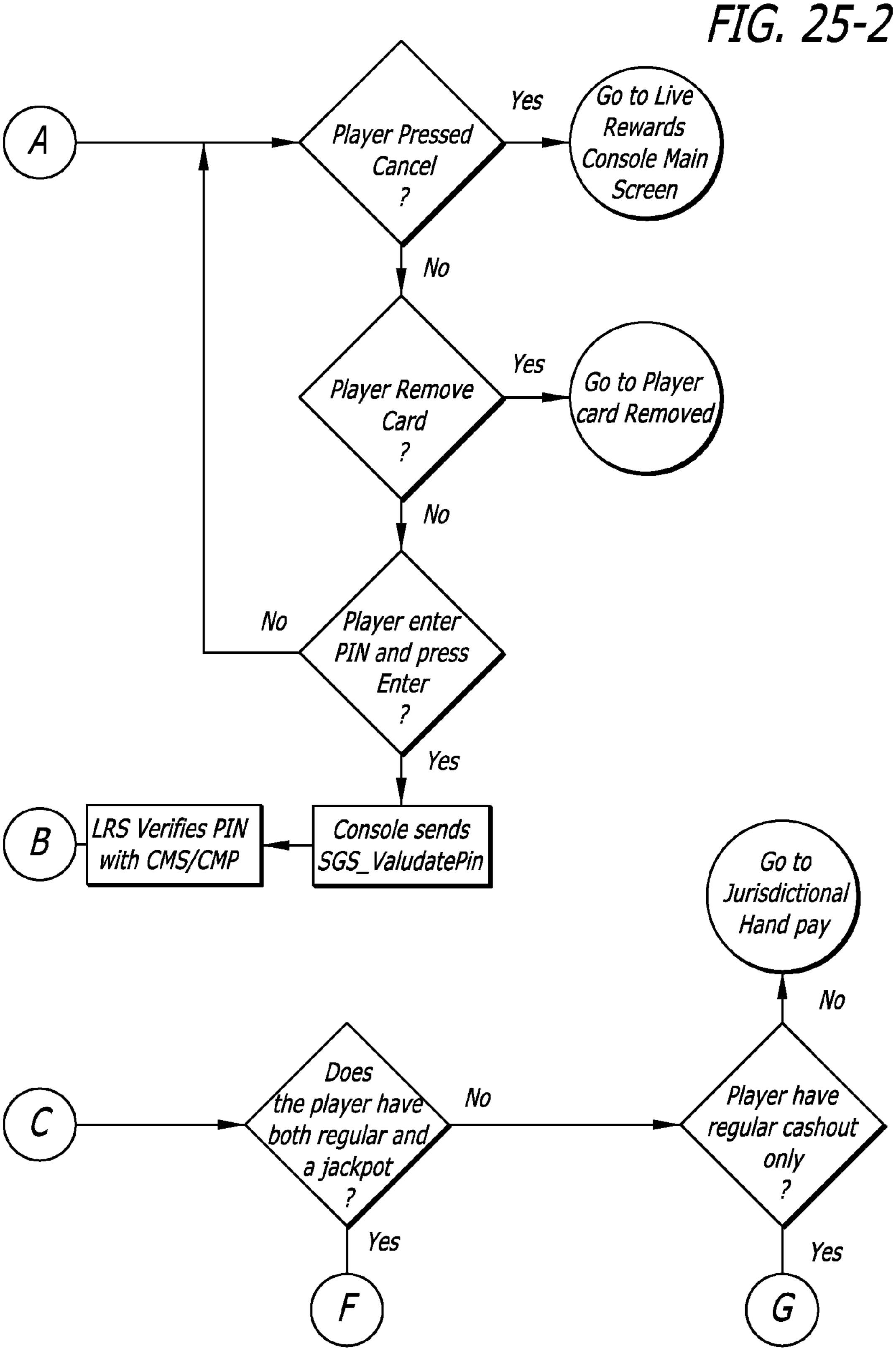
Figures 3, 25:
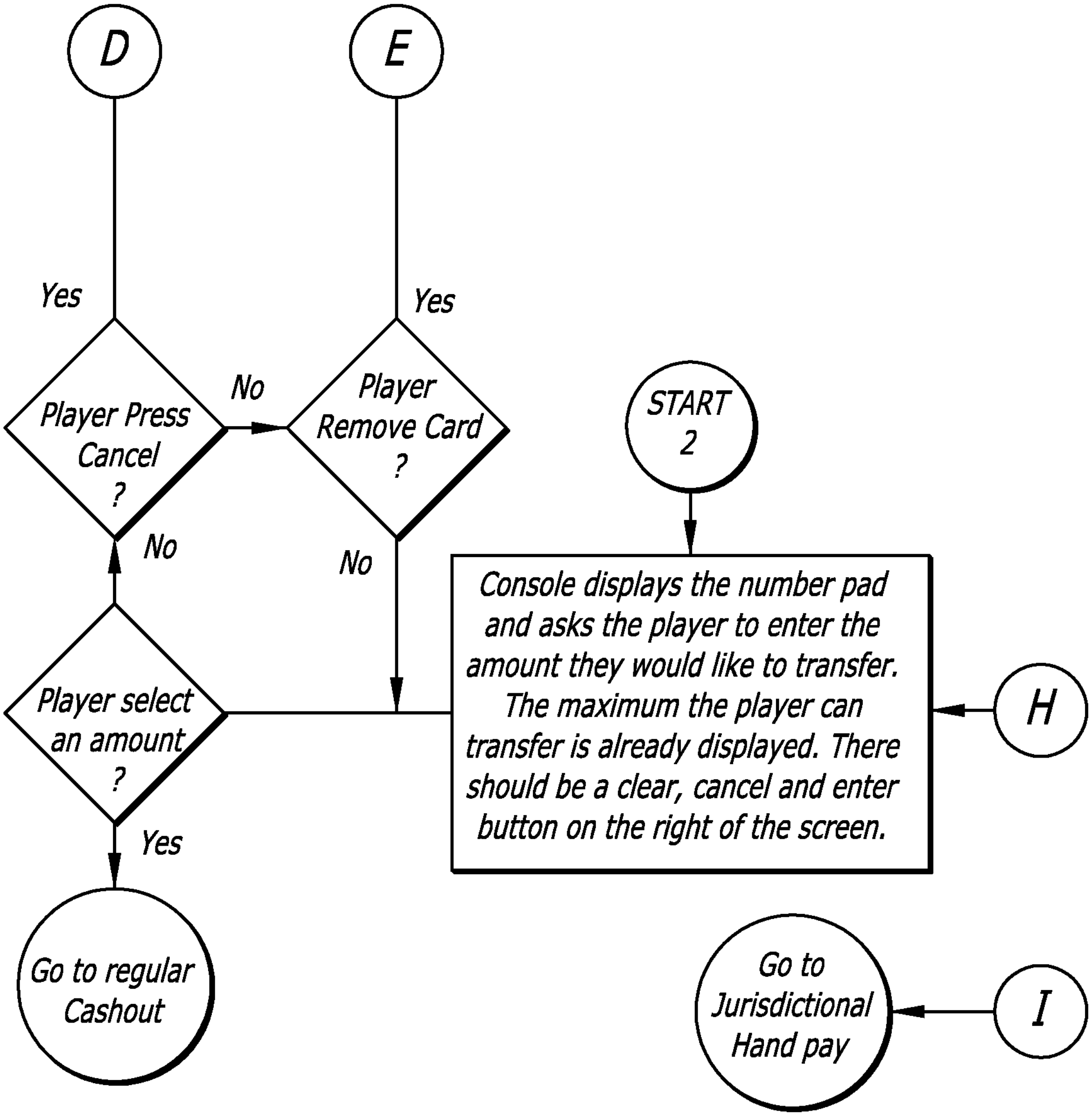
Figures 4, 25:
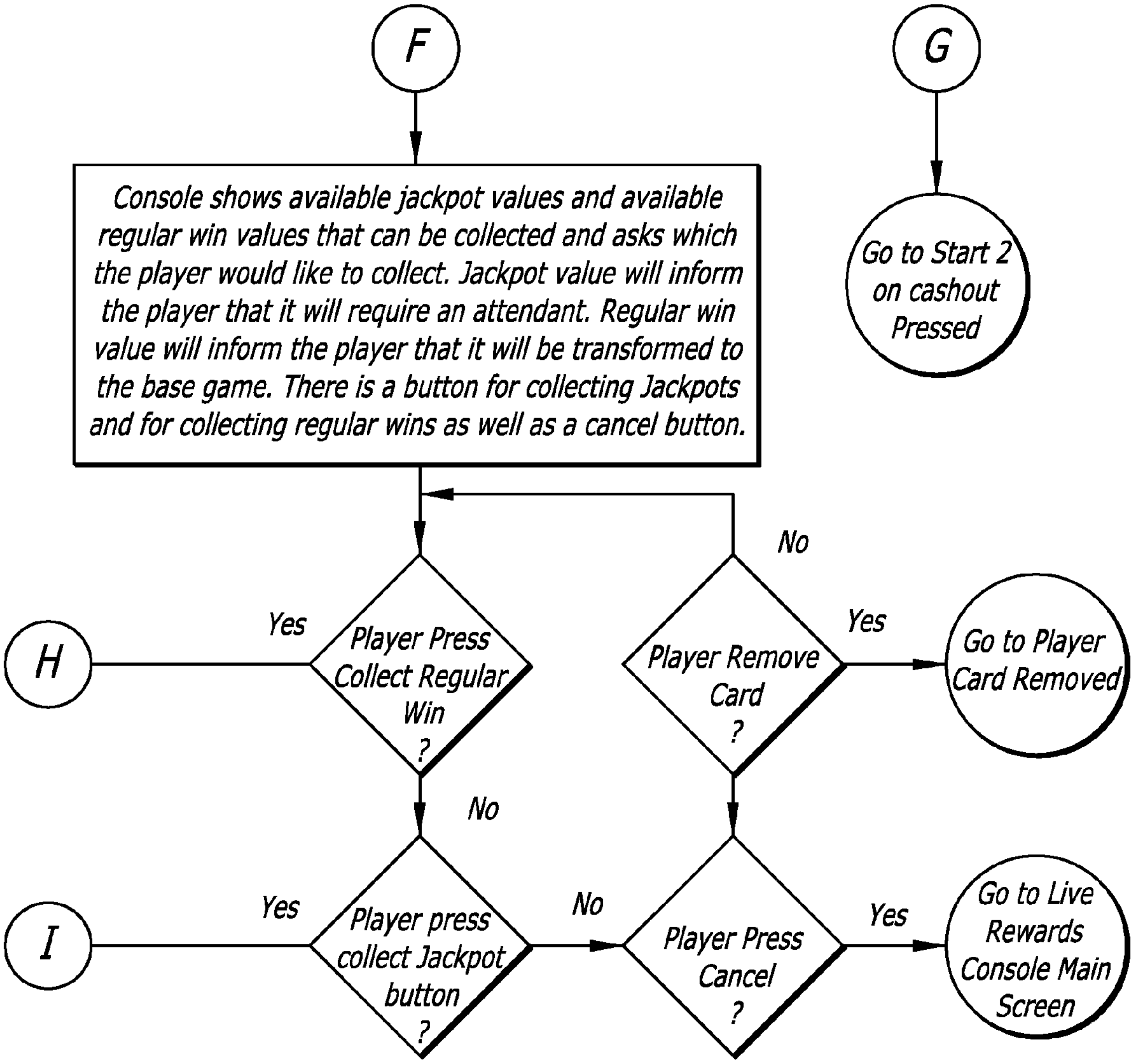
Figures 1, 26:
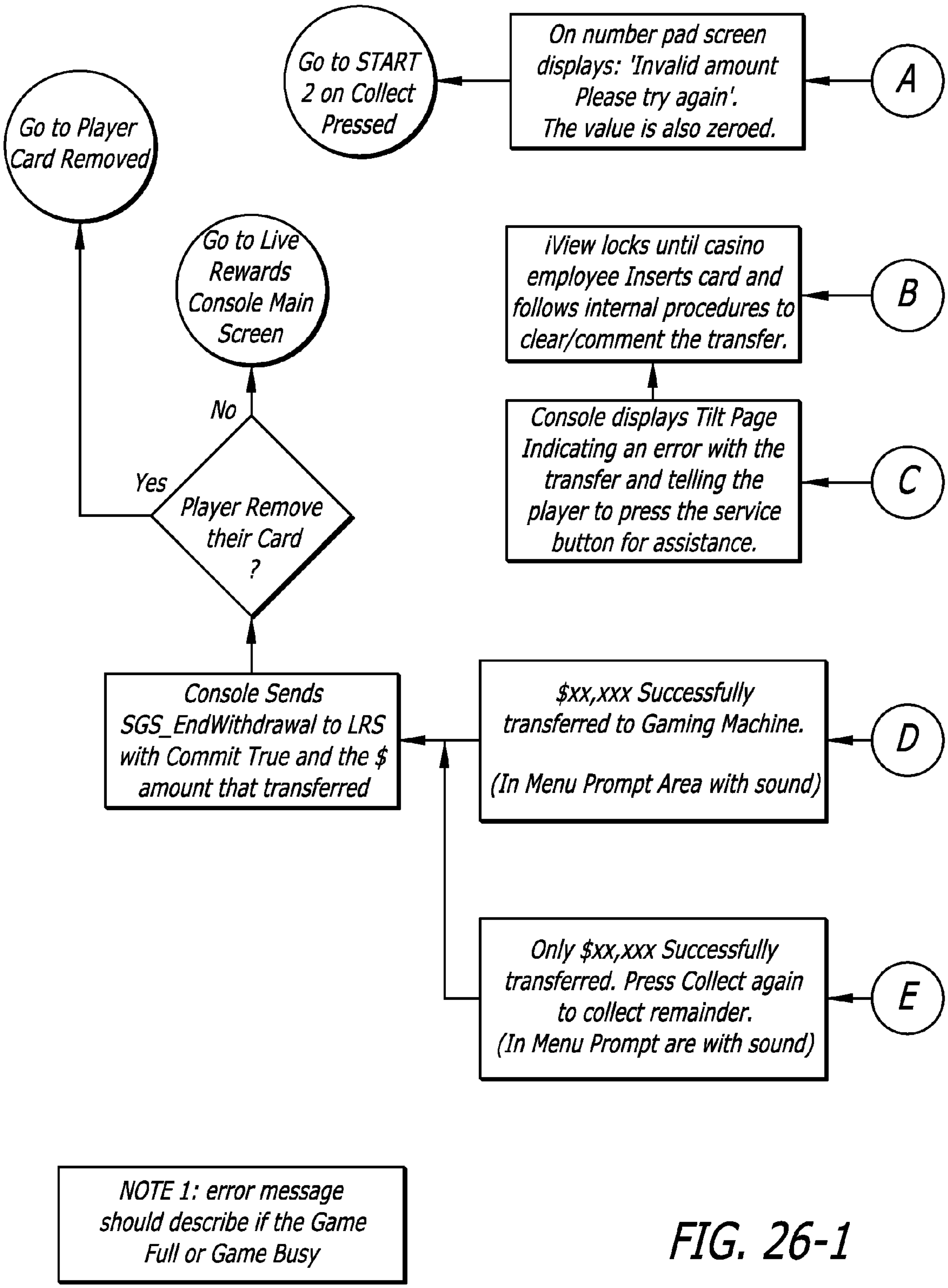
FIG. 26 is a software flowchart displaying events during a regular cash out procedure.
Figures 2, 26:
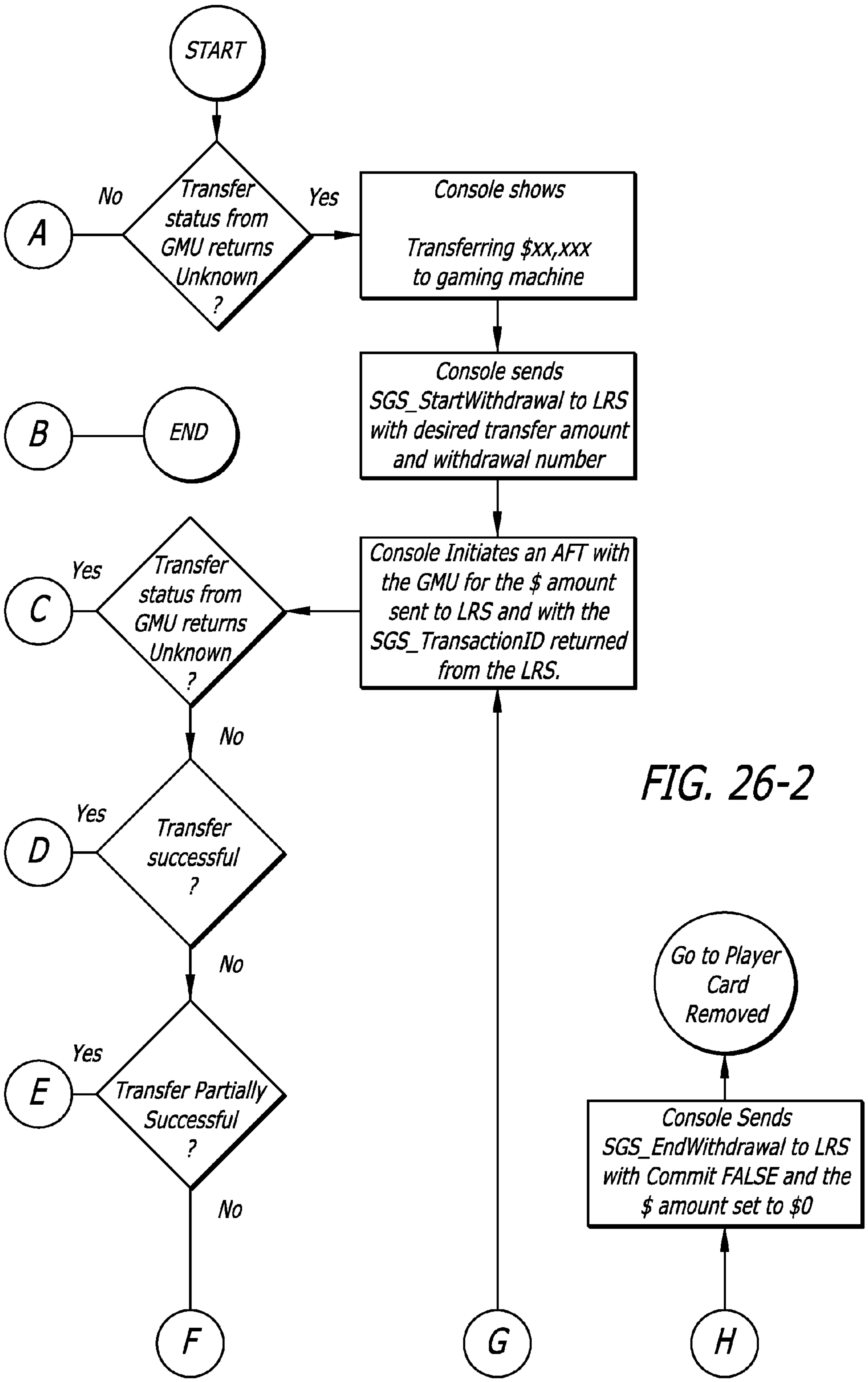
Figures 3, 26:
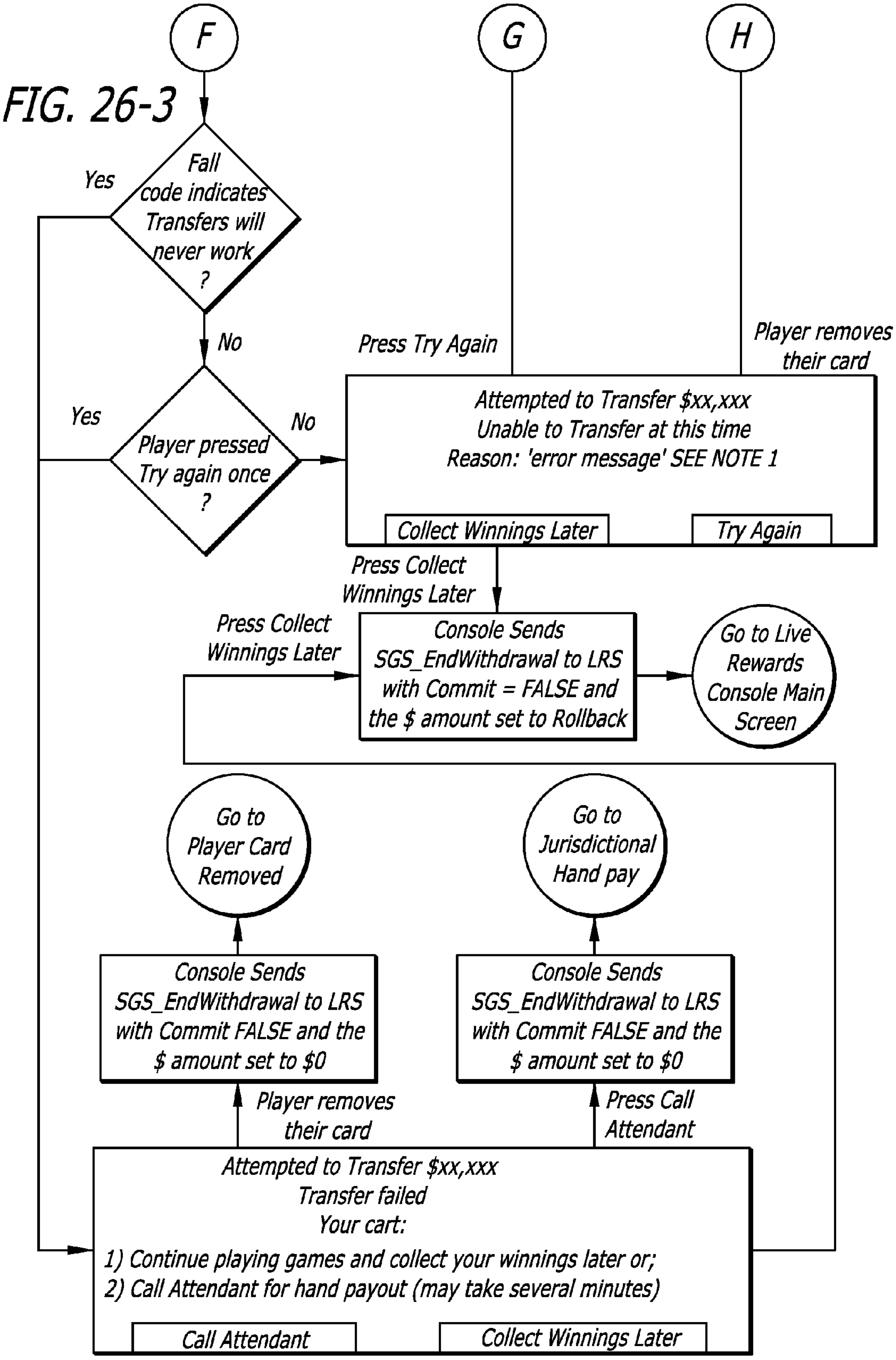

FIG. 24 is a flowchart of the post tournament process for tournaments of either type (Casino Challenge or Blazing 7's). FIG. 25 is a flowchart of what happens during the cash out process after being initiated after a win is achieved in a game or from the main game console collect button. FIG. 26 is a software flowchart of what happens during a regular cash out procedure (non-jurisdictional winnings buckets in Live Rewards server being collected).

Figures 1, 27:
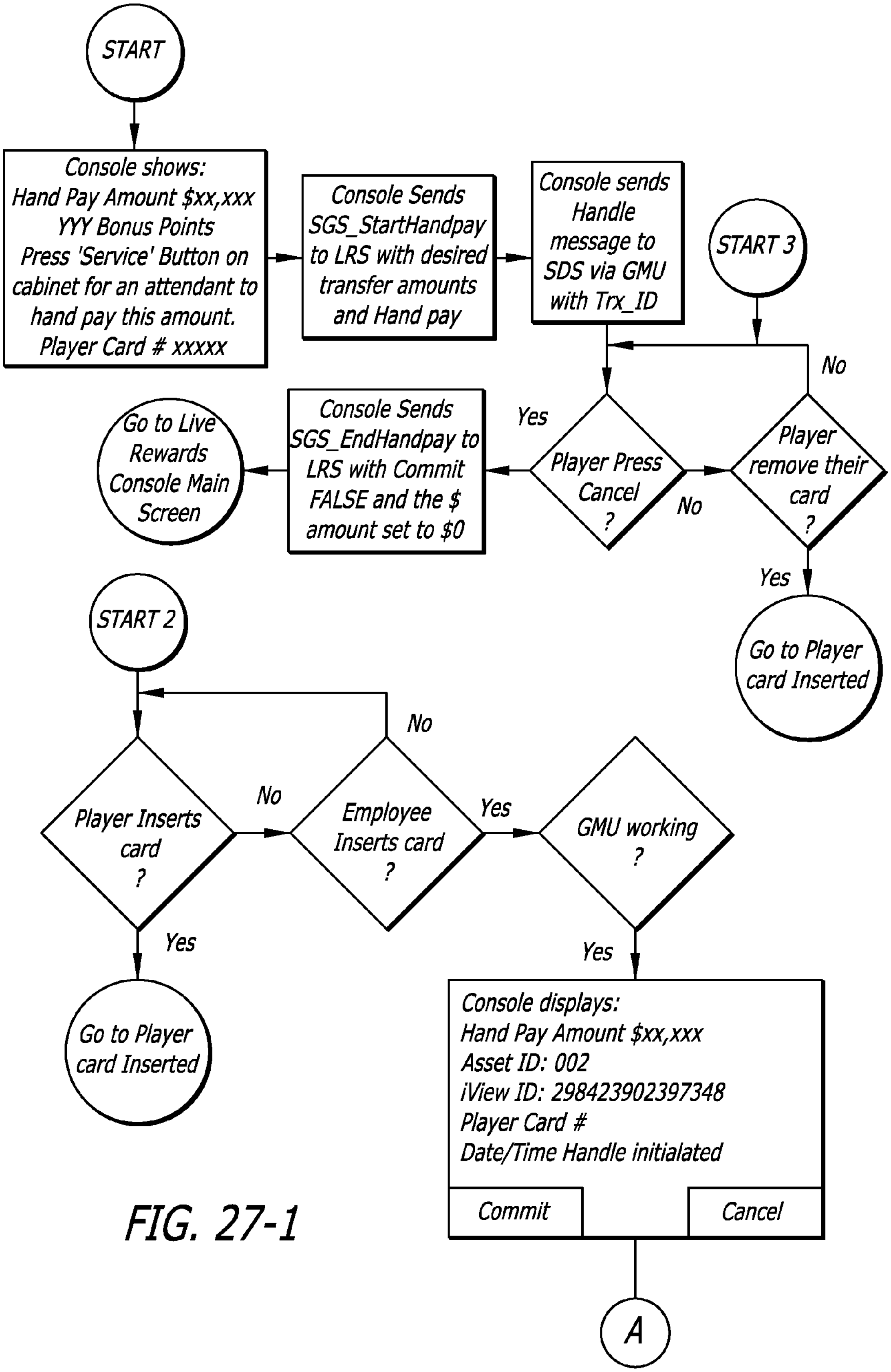
FIG. 27 is a software flowchart displaying events during a Jurisdictional Hand pay.
Figures 2, 27:
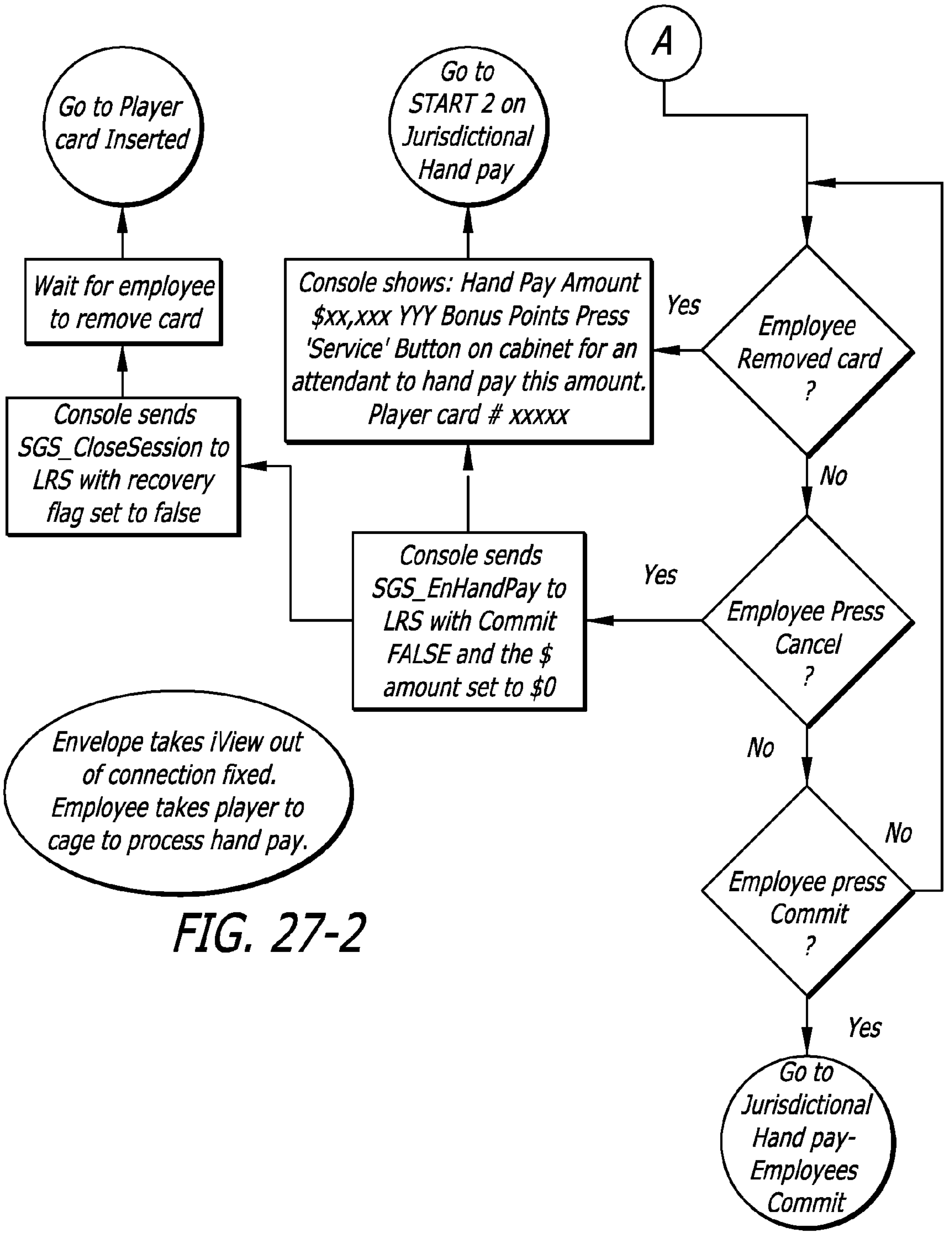

FIG. 27 is a software flowchart of what happens during a Jurisdictional Hand pay. This cash out type is when cash, club points, or other jurisdictionally enabled prize currency types won from a Live Rewards game when combined winnings are over the Jurisdictional payout limits as configured at the Live Rewards Server. This means that a human attendant must manually pay these prize types or approve them to be given to the player account. The casino attendant will typically collect player tax info to comply with government taxation laws prior to paying this hand pay. Any winnings from a single game over these limits will be added to the player jurisdictional buckets on the Live Rewards server. This if a player leaves this gaming machine prior to a casino attendant being able to come and collect the player's tax data, it will not matter.

The next time the player tries to collect these jurisdictional winnings buckets then the attendant will be called again. This hand pay stays with the player account jurisdictional buckets, so as the player moves around from game machine to game machine the jurisdictionally won winnings can be collected on those new gaming devices. Even if the jurisdictional winnings are club points or other non-currency types a casino attendant will have to collect the tax information from the player prior to these club points from being inserted into the players CMP/CMP player account. Then these club points can be redeemed for merchandise or converted game credits for use on a gaming device. In some circumstances the employee can cancel the hand pay by pressing a button on the iVIEW display. The hand pay will be done at another time on possibly another gaming device.

Figures 1, 28:
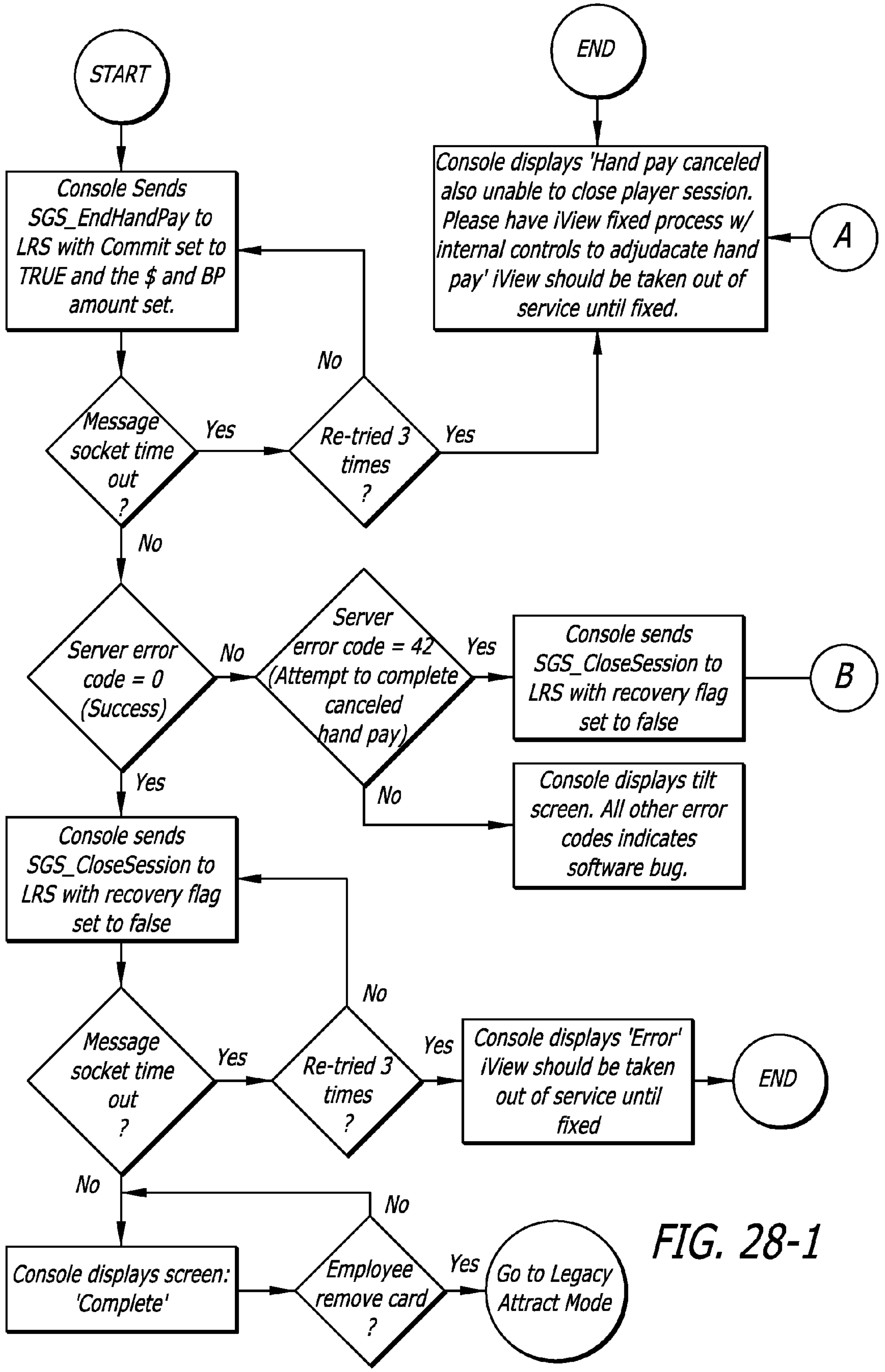
FIG. 28 is a software flowchart displaying events when the Employee Commits or closes the Jurisdictional Hand pay.
Figures 2, 28:
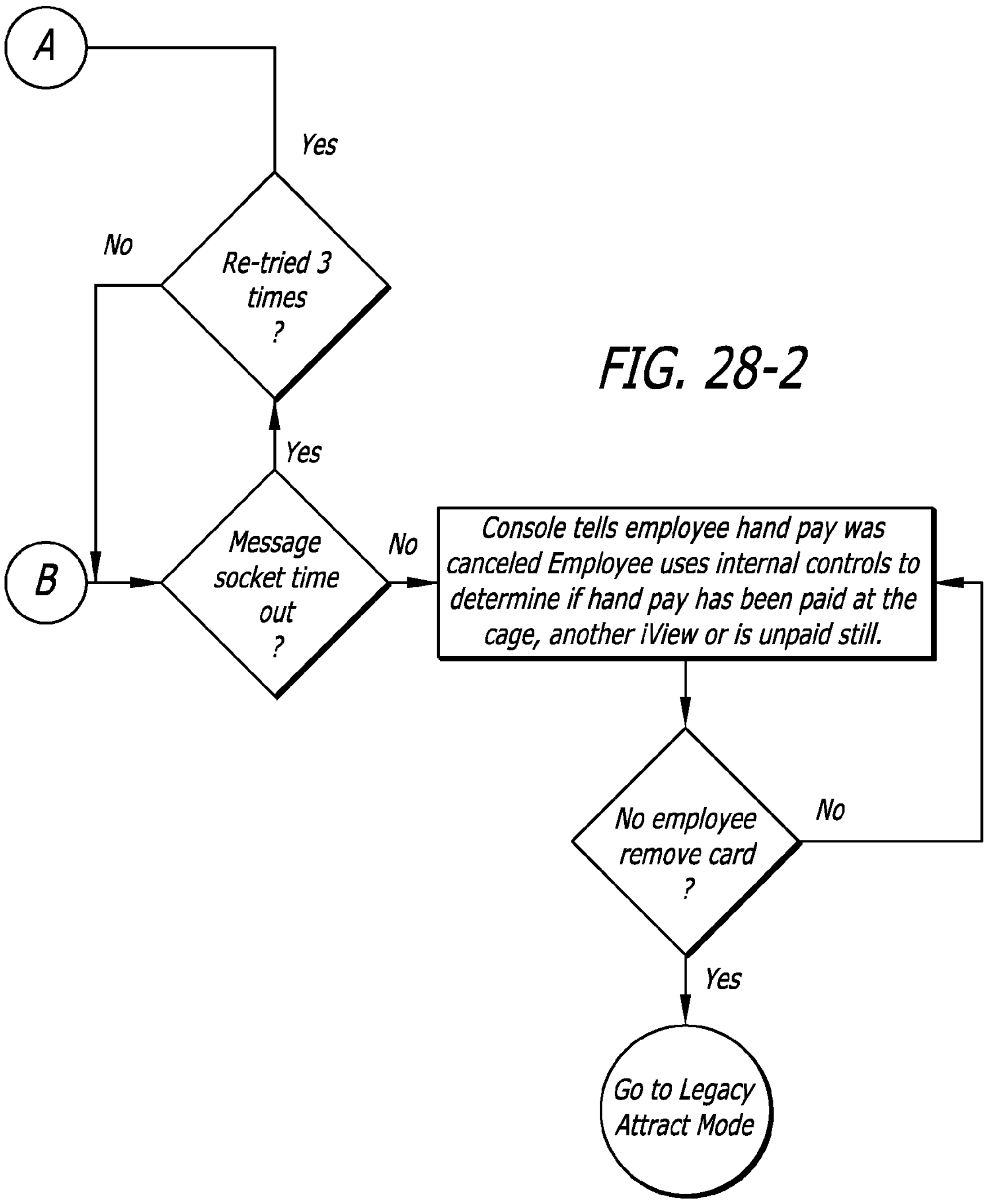
Figure 29:
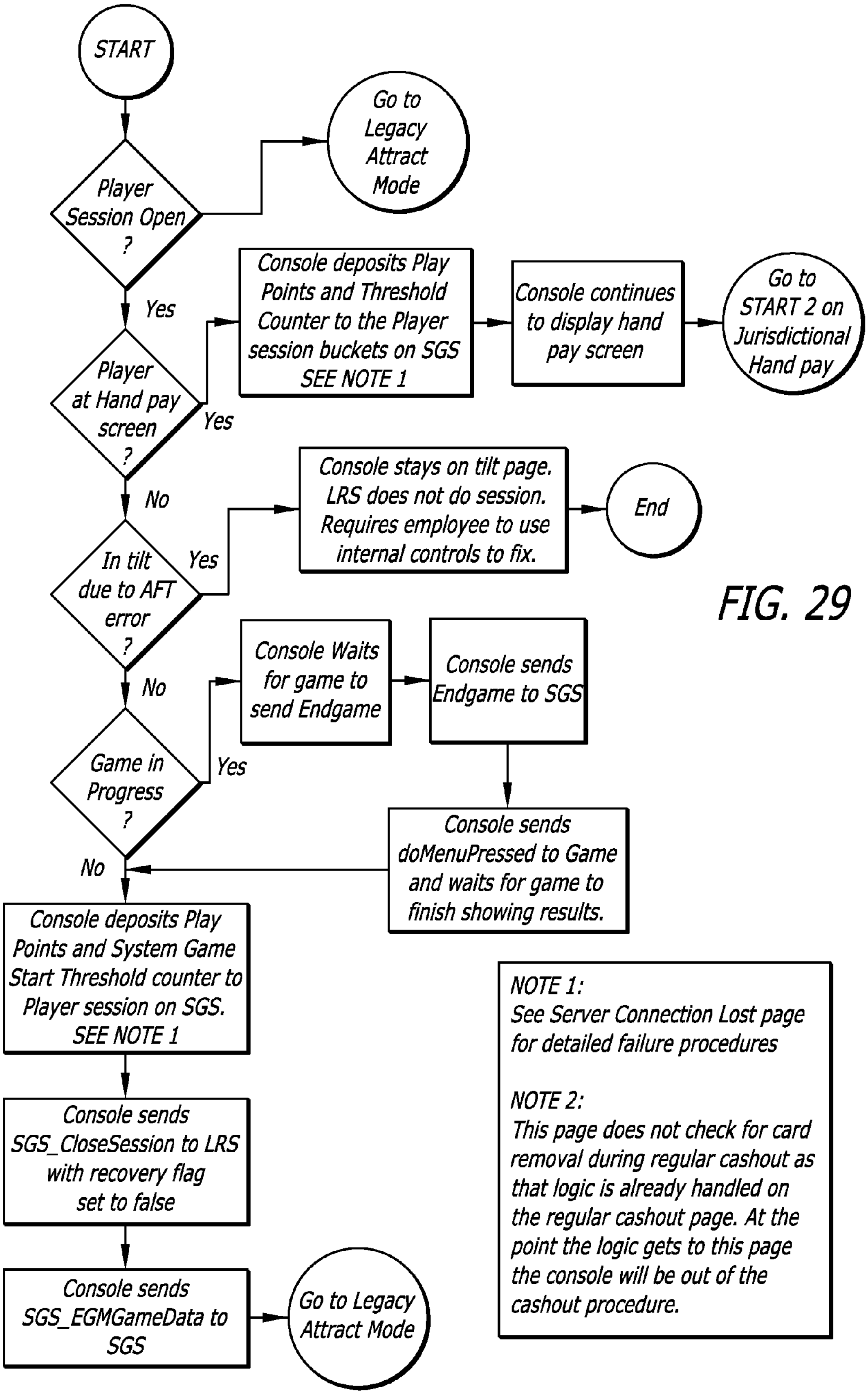
FIG. 29 is a software flowchart displaying events when the player removes the player card.
Figure 30:
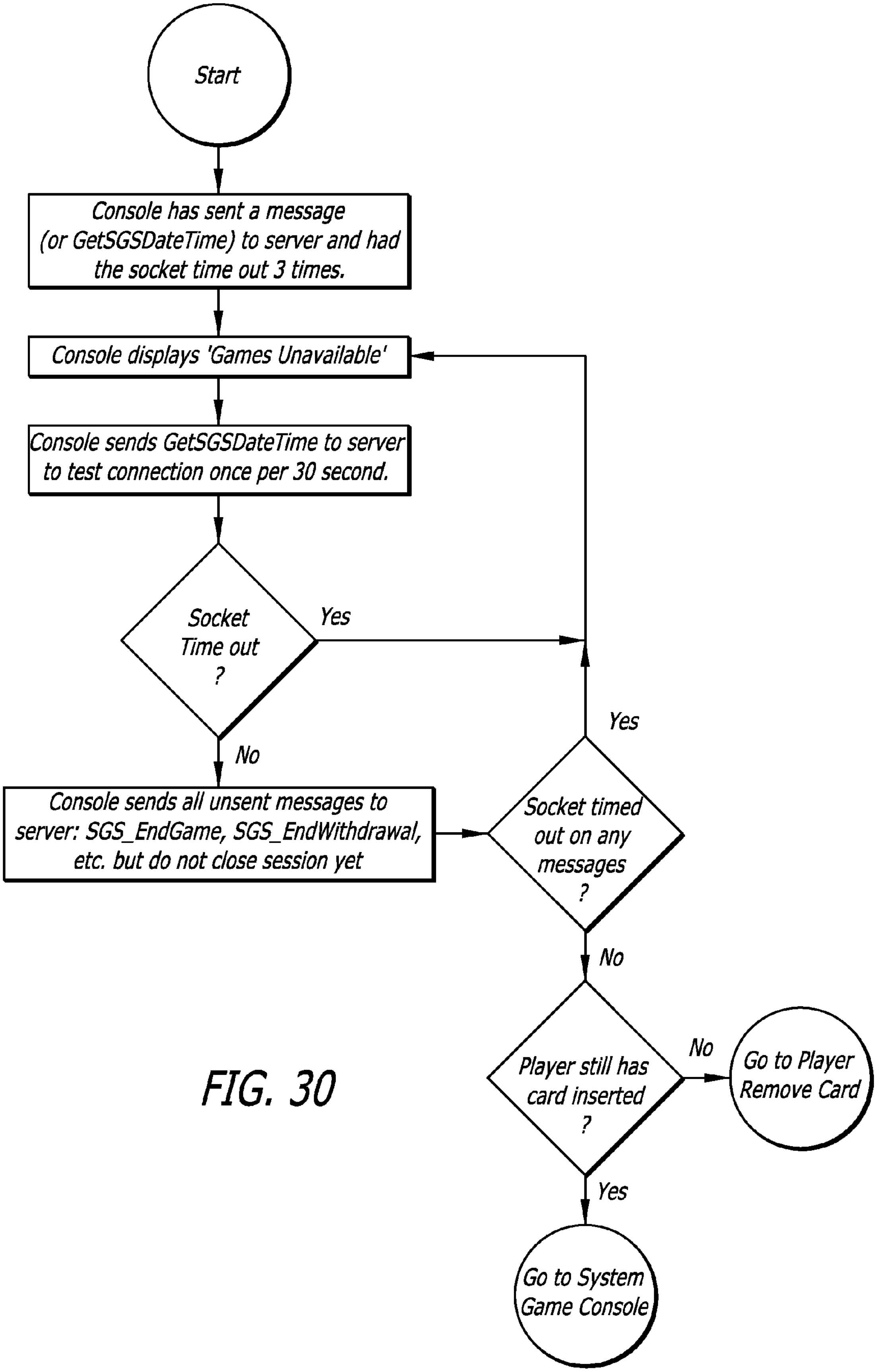
FIG. 30 is a software flowchart displaying events when the server connection is lost from the iVIEW.
Figure 31:
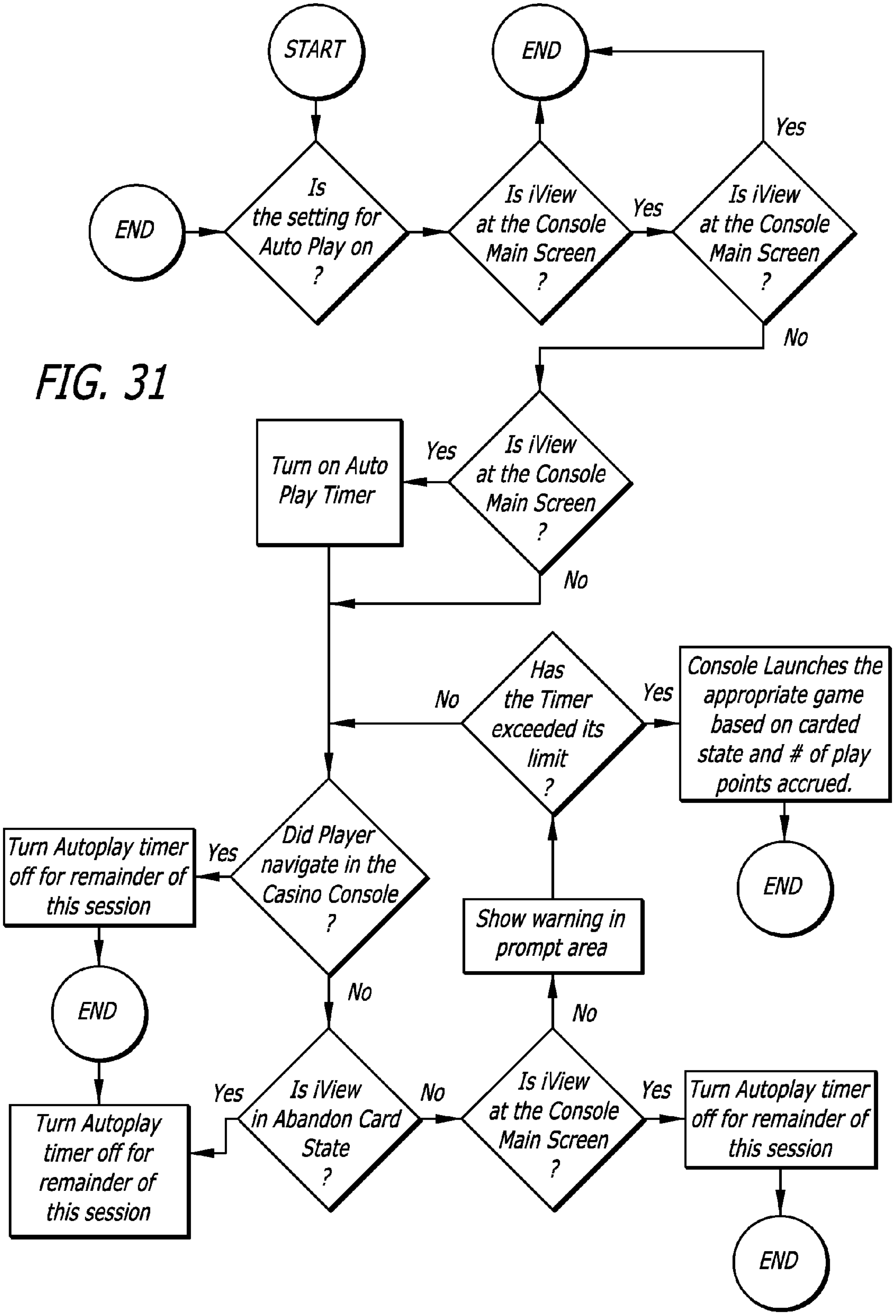
FIG. 31 is a software flowchart of how the Auto Play logic works.
Figure 32:
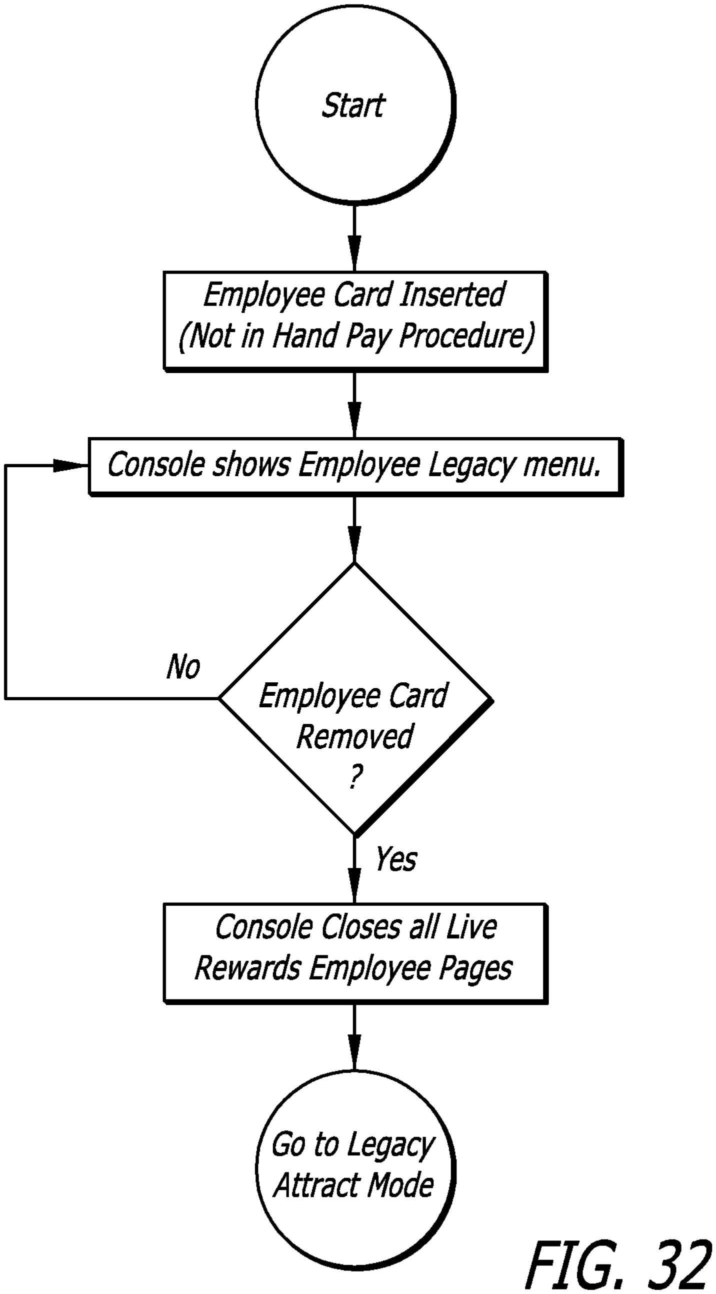
FIG. 32 is a software flowchart displaying events when the employee card is inserted.
Figure 33:
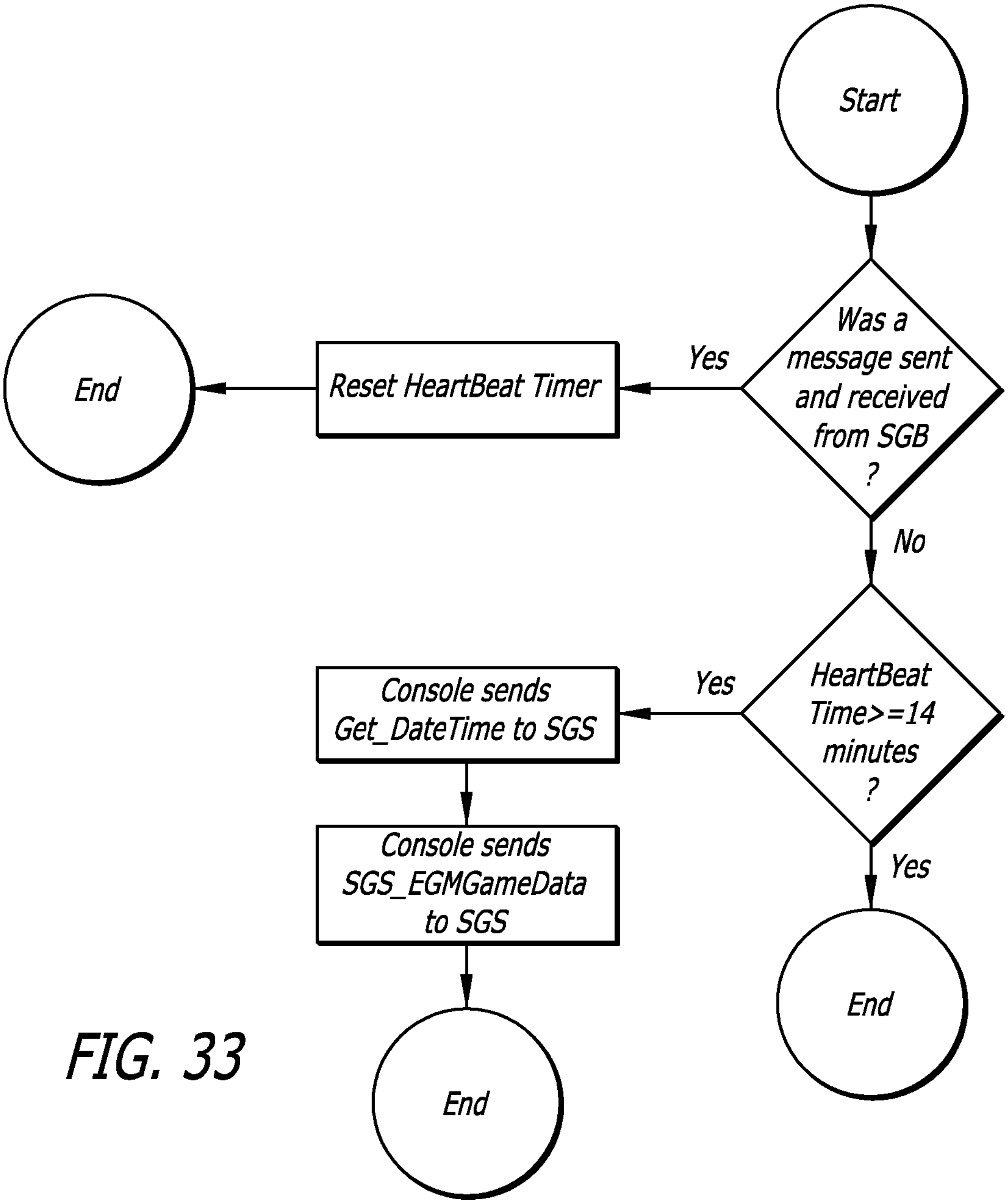
FIG. 33 is a software flowchart of heartbeat messages from the iVIEW to the Live Rewards server or formerly named SGS.
Figure 34:
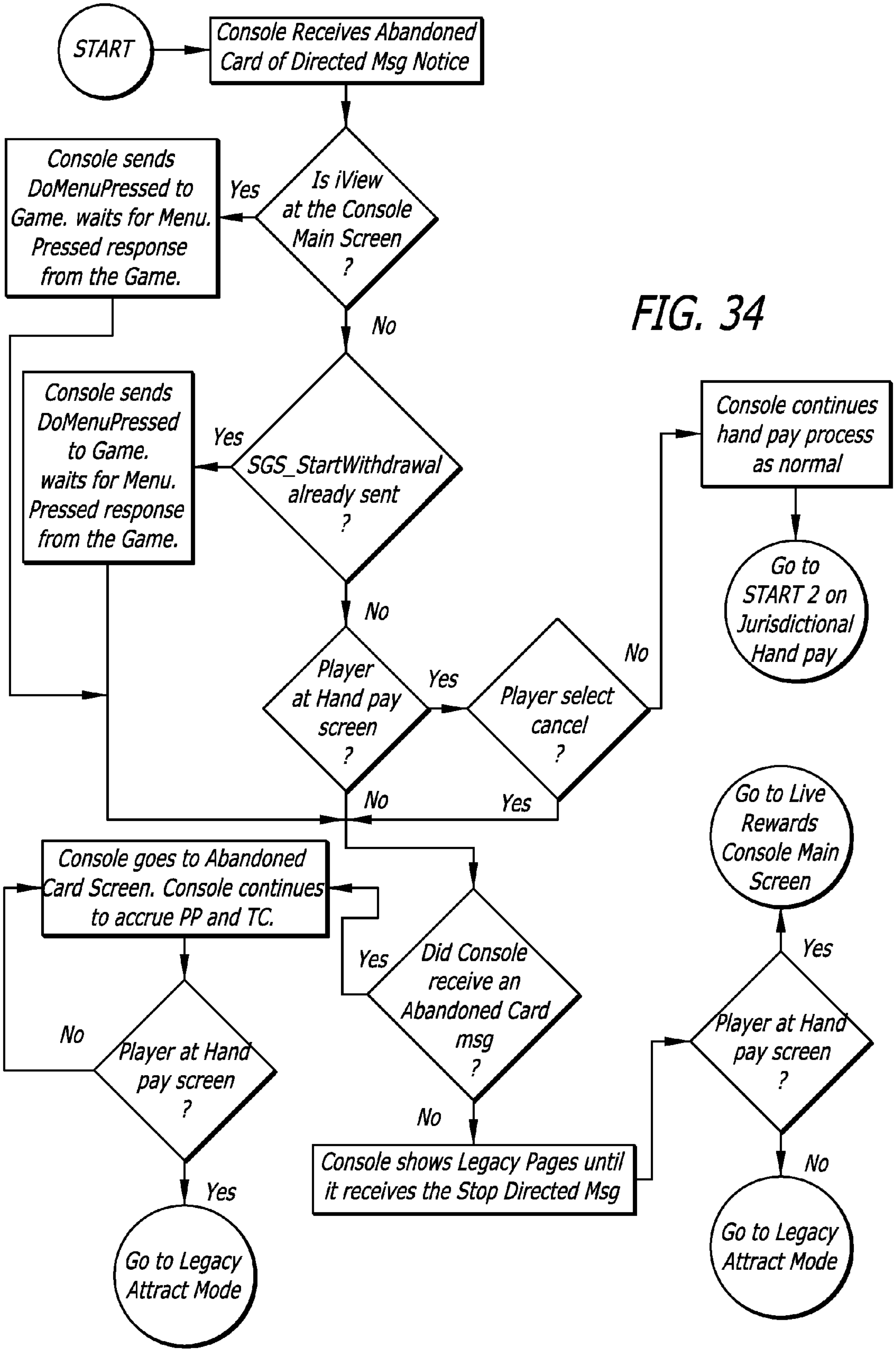
FIG. 34 is a software flowchart displaying events when abandoned player cards or directed messages come in from the game monitoring unit.
Figures 1, 35:
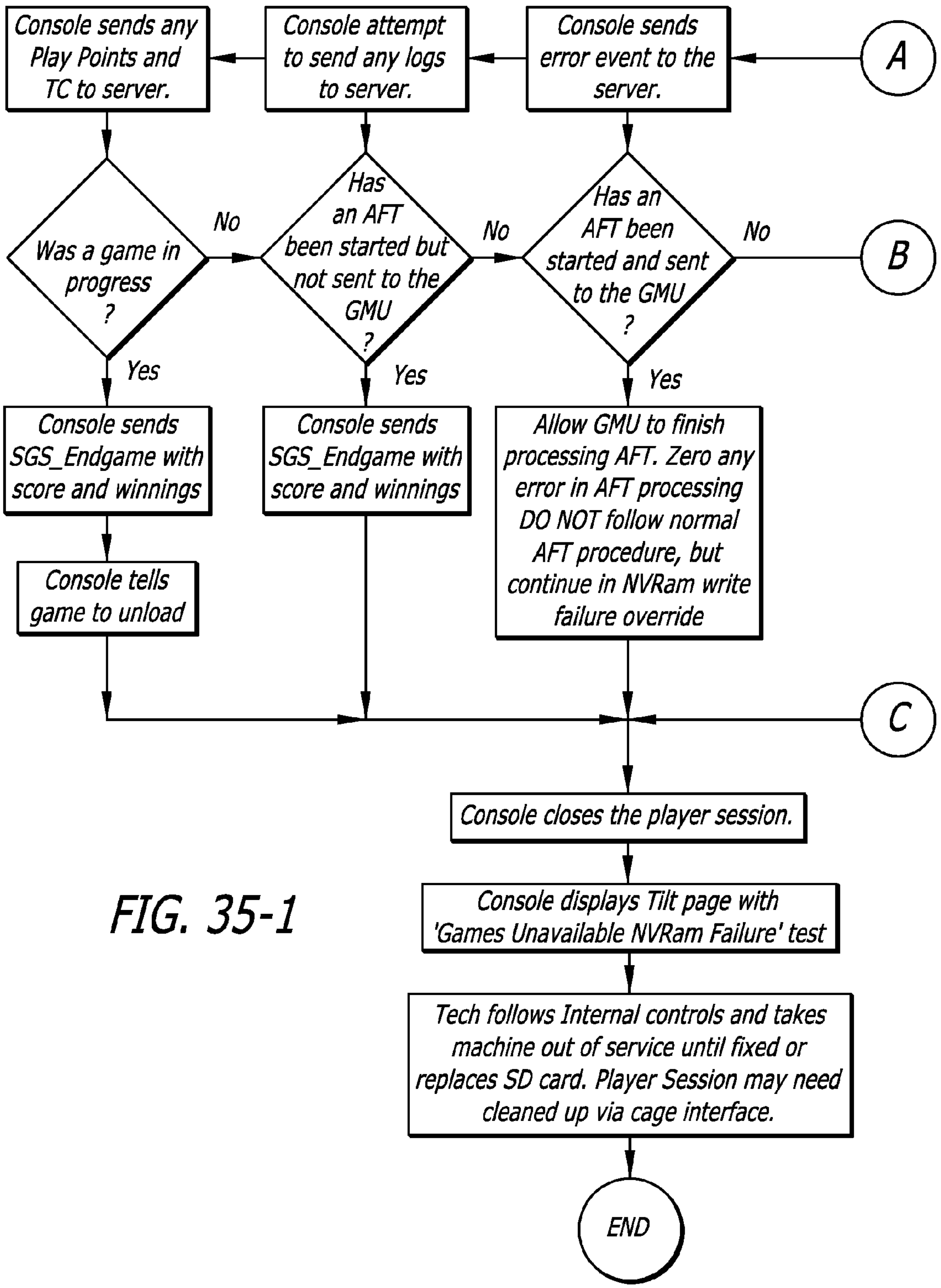
FIG. 35 is a software flowchart displaying events when writing to the non-volatile memory fails.
Figures 2, 35:
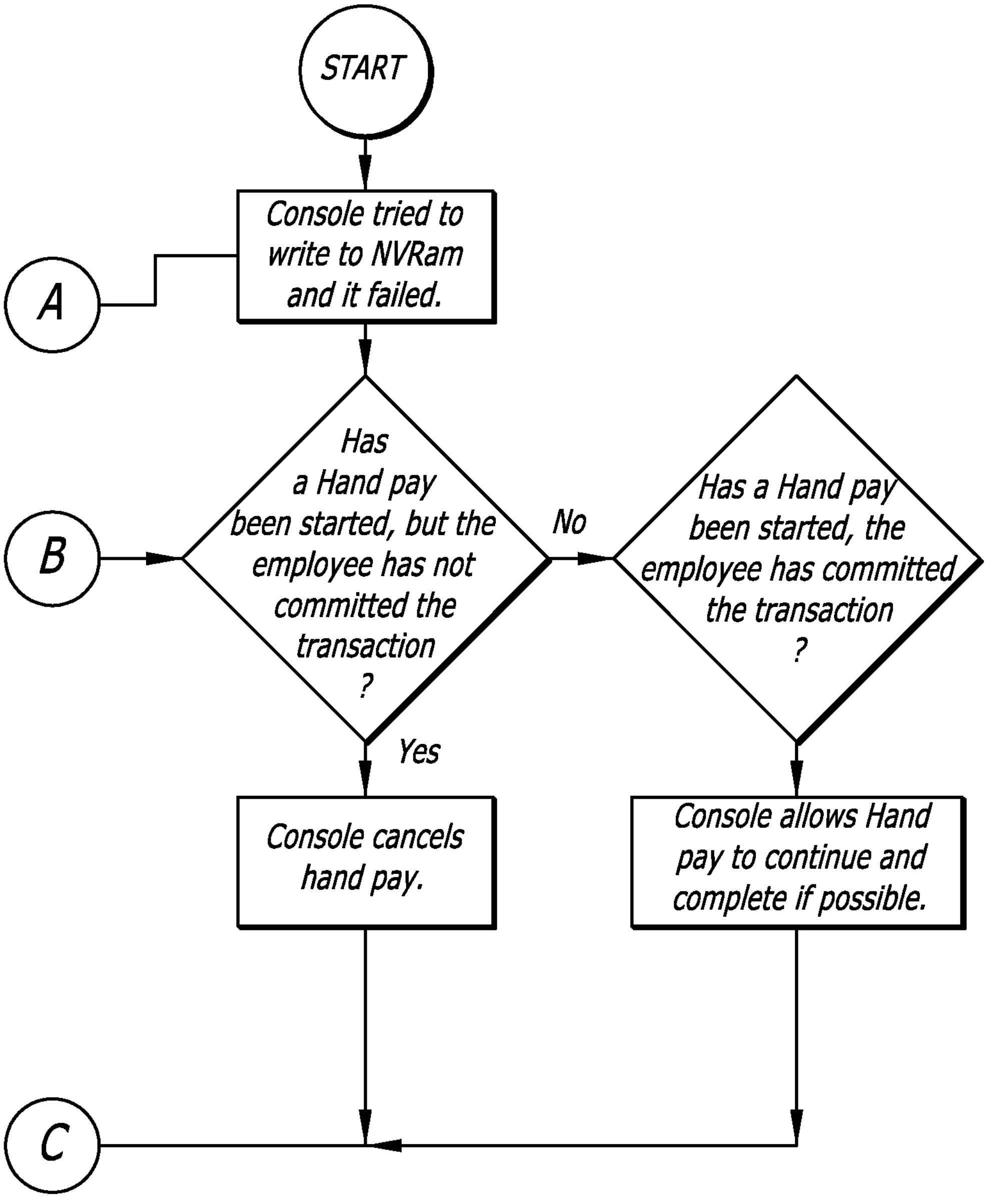

FIG. 28 is a software flowchart of what happens when the Employee Commits or closes the Jurisdictional Hand pay. FIG. 29 is a software flowchart of what happens when the player removes the player card. FIG. 30 is a software flowchart of what happens when the server connection is lost from the iVIEW. FIG. 31 is a software flowchart of how the Auto Play logic works. FIG. 32 is a software flowchart of what happens when the employee card is inserted. FIG. 33 is a software flowchart of heartbeat messages from the iVIEW to the Live Rewards server or formerly named SGS. FIG. 34 is a software flowchart of what happens when abandoned player cards or directed messages come in from the Game monitoring unit. FIG. 35 is a software flowchart of what happens when the writing to the non-volatile memory fails.

Figures 1, 36:
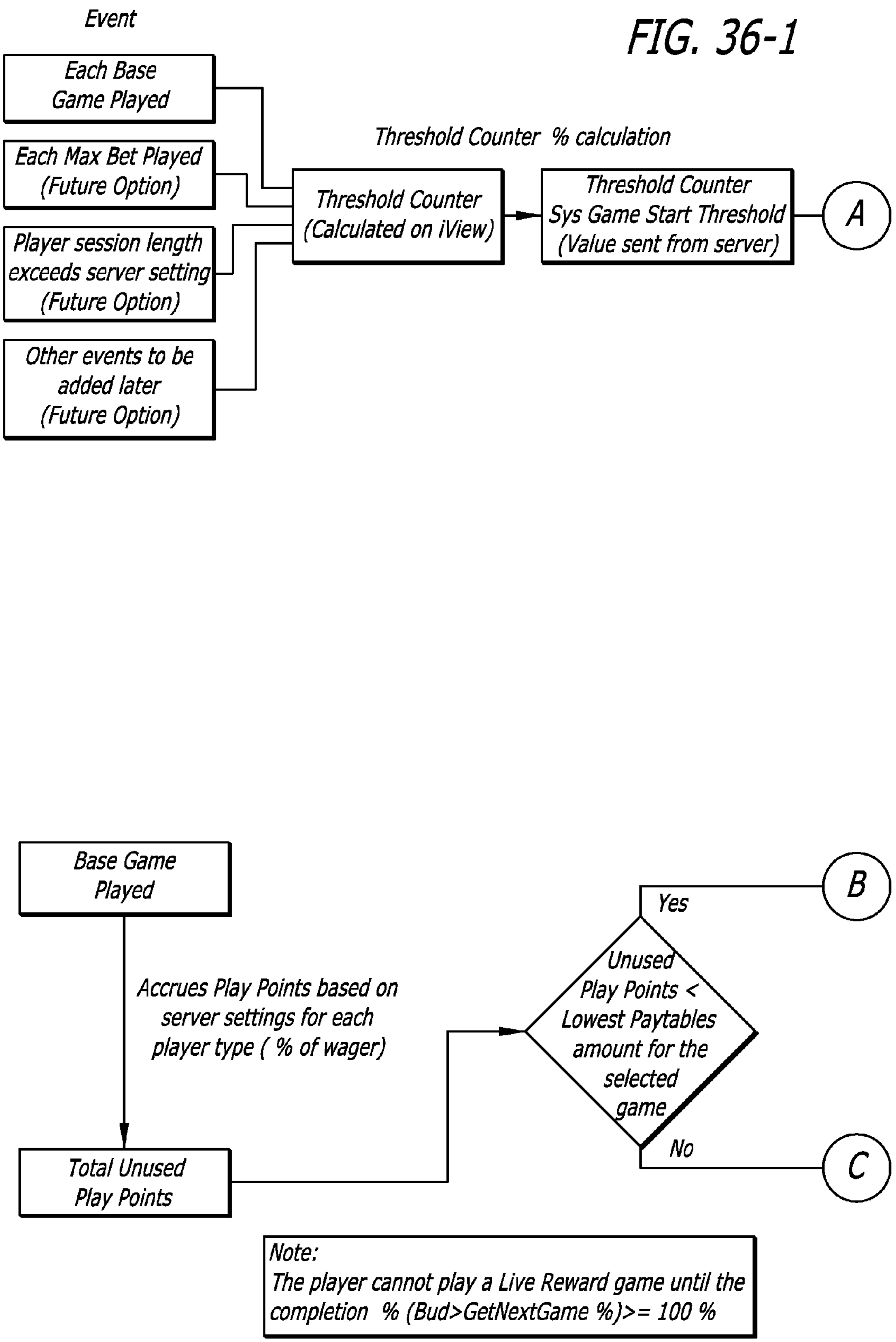
FIG. 36 is the BUD (balance update) technique to determine if a player can playa Live Rewards bonus game.
Figures 2, 36:
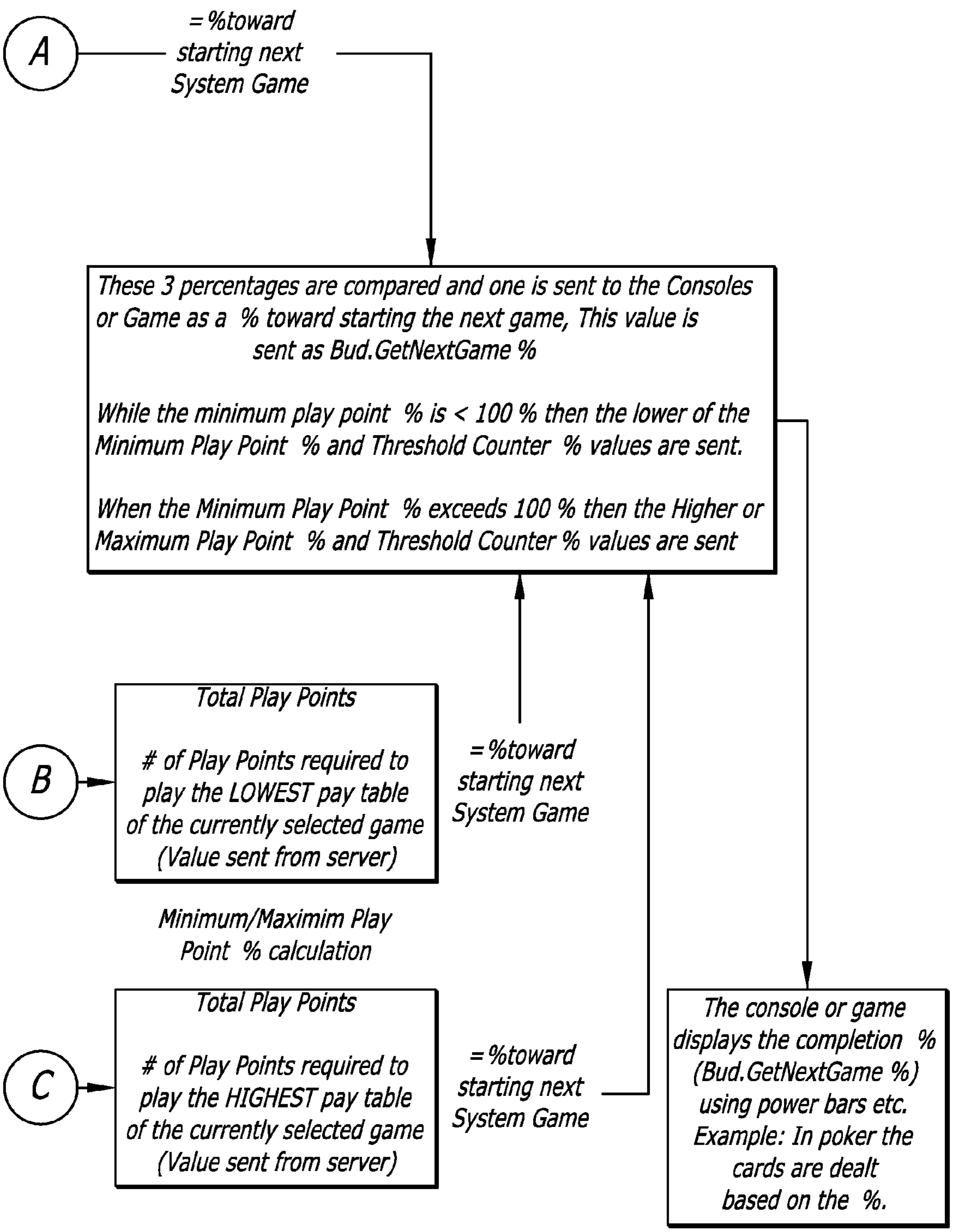
Figures 1, 37:
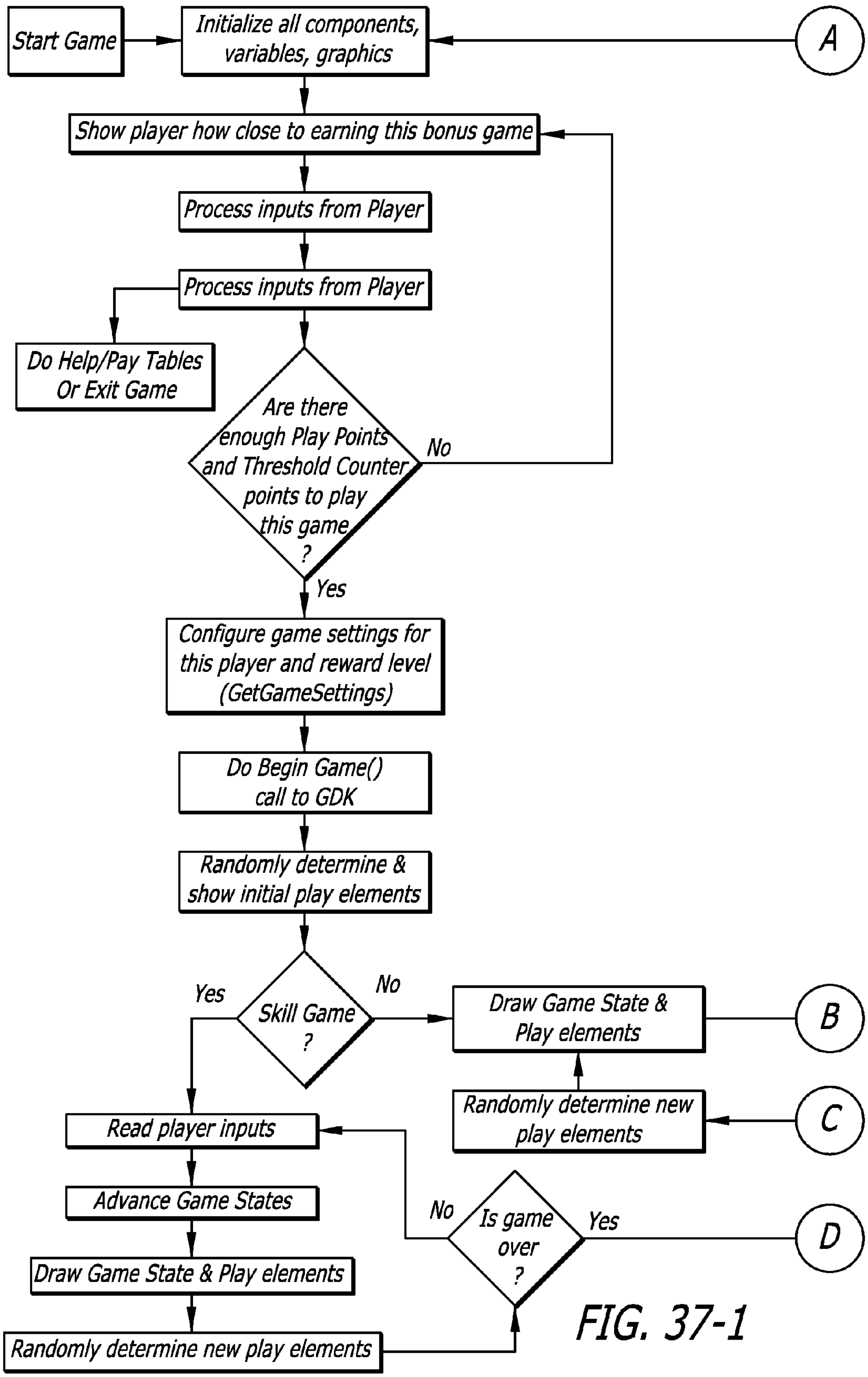
FIG. 37 is a game play flowchart for typical Live Rewards games.
Figures 2, 37:
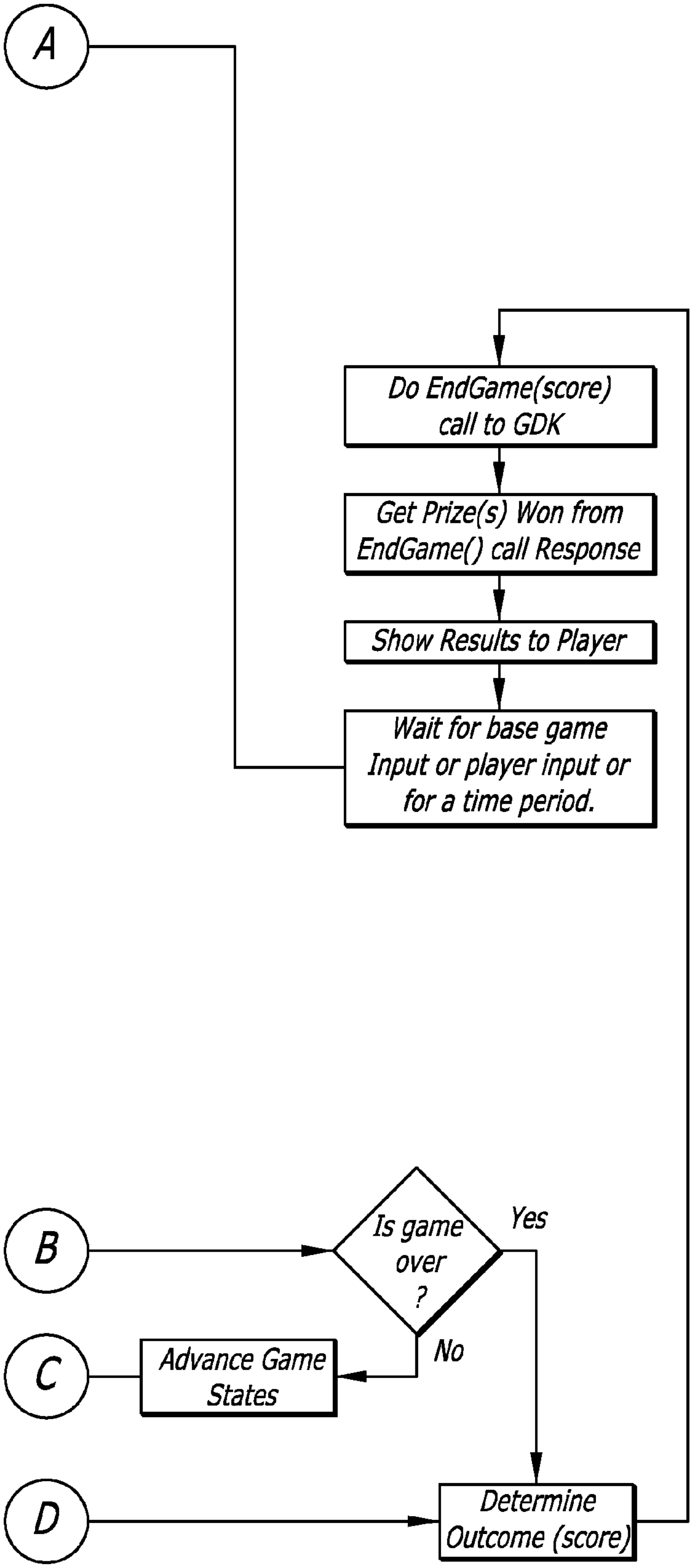
Figure 38:
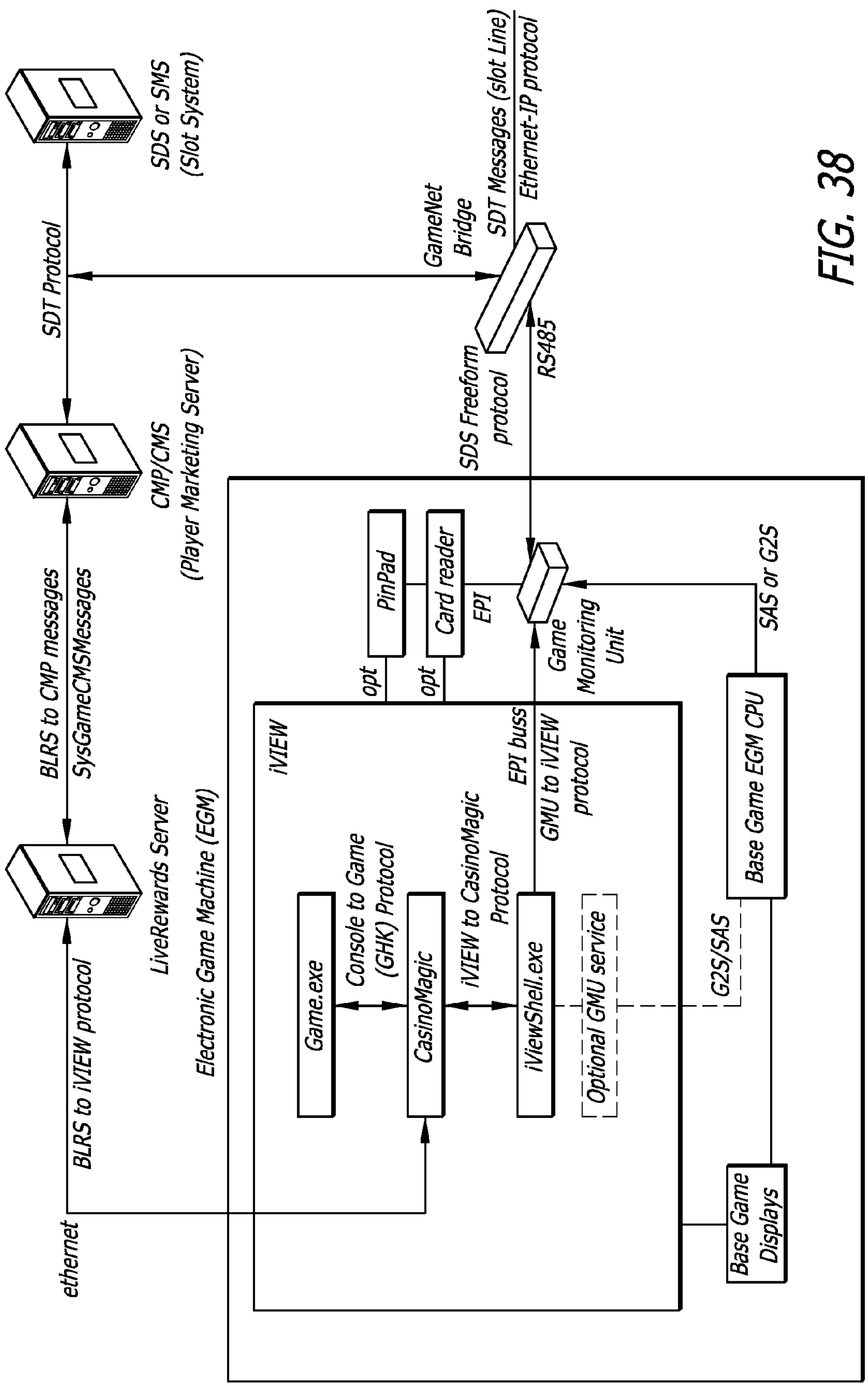
FIG. 38 is a drawing of the components of an example Live Rewards Gaming System.

FIG. 36 is the BUD technique used to determine if a player can play a Live Rewards bonus game. A player needs both the proper amount of Play Points to play the Live Rewards game and have met the threshold counter start rules. This mechanism controls the player's frequency of playing a Live Rewards bonus game. FIG. 37 is a game play flowchart for typical Live Rewards games. FIG. 38 is a drawing of the components of the Live Rewards System Gaming. It shows various message protocols, client hardware and servers used in associated with this invention.

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed:

1. A networked gaming system, comprising:

a physical game network, wherein the physical game network connect various components of the networked gaming system;

one or more player console devices connected to the physical game network, each player console device having a base game display and a base game processor, wherein a player console device presents on the base game display, via the base game processor, one or more base games to a player, and each player console device including a secondary device having a secondary display and a secondary processor, the secondary device being operatively associated with the player console device;

a system gaming server connected to the one or more player console devices via the physical game network, the server gaming server having a server processor, wherein the system gaming server administrates, via the server processor, one or more bonus games at one or more player console devices; and an activation system for recognizing at least one trigger that causes the system gaming server, via the server processor, to offer a bonus gaming opportunity to a player at one or more console player console devices;

wherein upon initiation by the activation system, a player console device presents, via the server processor, a bonus game to a player administrated by the system game server, wherein the bonus game includes a set of thresholds achievable by play of the base game, and wherein upon each of the thresholds being met, the presented bonus game is enabled for game play by the player;

wherein upon achieving one of the thresholds in the base game, a face down playing card is generated in the bonus game, wherein upon achieving all of the thresholds in the base game, a full hand of face down playing cards is generated in the bonus game;

wherein the playing cards are shown face up once the bonus game is fully initiated by the player, and wherein an award is provided based on any winning hands associated with a paytable.

2. The networked gaming system of claim 1, wherein the bonus game includes a bingo game with a set of bingo cards, the set of bingo cards being initially covered;

wherein upon achieving one of the thresholds, one or more of the bingo cards is partially uncovered;

wherein upon achieving all of the thresholds, all of the bingo cards are uncovered;

wherein a set of bingo card numbers on each of the bingo cards is determined and illuminated;

wherein the bingo game includes a set of selectable numbers, a subset of the selectable numbers being selected and corresponding locations on the bingo cards being designated;

wherein in the event that one or more sets of bingo card numbers are matched by the subset of the selectable numbers, then an award is provided.

3. The networked gaming system of claim 1, further comprising a player information system, wherein the player information system identifies the bonus game available and information for the player to activate the game.

4. The networked gaming system as in claim 3, the bonus game comprising a bingo game, wherein the player informational system provides information about the awards associated with each bingo card, and wherein potential awards comprise player points for one or more identified winning bingo cards and comprise a monetary amount for other identified of the winning bingo cards.

5. The networked gaming system of claim 3, the gaming apparatus main display including a player information system, causing the player information system to be provided to the player, the bonus game comprising a poker game;

the player information system providing information about requirements to activate the bonus game and further providing information about the awards associated with each winning hand of cards;

the awards comprising either player point or monetary values or a combination thereof depending upon the winning hand of cards.

6. The networked gaming system of claim 1, a partially appearing face down playing card appearing and associable with a player progress towards a achieving a threshold, the partially appearing playing card being complete upon the player achieving the threshold.

7. The networked gaming system of claim 1, further comprising a determination system, wherein the determination system provides information about an outcome of bonus game play, and wherein in the event of a winning result, the determination system includes an award distribution system that enables one or more players to receive an award.

8. The networked gaming system of claim 7, wherein the award distribution system includes a player identification system that enables player identification, a withdrawal system that enables a player to withdraw a portion of a player's winnings, and a status system that presents player information on the status of a withdrawal.

9. The networked gaming system of claim 1, further comprising an advertising system, the advertising system including information about game play and potential awards.

10. A networked gaming system, comprising:

a physical game network, wherein the physical game network connect various components of the networked gaming system;

one or more player console devices connected to the physical game network, each player console device having a base game display and a base game processor, wherein a player console device presents on the base game display, via the base game processor, one or more base games to a player, and each player console device including a secondary device having a secondary display and a secondary processor, the secondary device being operatively associated with the player console device;

a system gaming server connected to the one or more player console devices via the physical game network, the server gaming server having a server processor, wherein the system gaming server administrates, via the server processor, one or more bonus games at one or more player console devices; and an activation system for recognizing at least one trigger that causes the system gaming server, via the server processor, to offer a bonus gaming opportunity to a player at one or more console player console devices;

wherein a player console device includes a rewards level accumulator to apprise a player, via the game processor, as to a level that the player has achieved including player eligibility; and a game initiator component that enables a player to initiate a bonus game immediately after the player becomes eligible to play the bonus game;

wherein upon achieving one of the thresholds in the base game, a face down playing card is generated in the bonus game, wherein upon achieving all of the thresholds in the base game, a full hand of face down playing cards is generated in the bonus game;

wherein the playing cards are shown face up once the bonus game is fully initiated by the player, and wherein an award is provided based on any winning hands associated with a paytable.

11. The networked gaming system of claim 10, including a game eligibility illuminator for providing an indication of progress towards eligibility for the bonus game.

12. The networked gaming system of claim 11, the game eligibility illuminator including one or more light sections illuminating upon a playing threshold being achieved by a player;

upon each light section being illuminated, the game initiator component being illuminated and enabling the player to play the bonus game.

13. The networked gaming system of claim 10, the reward level accumulator indicating the level achieved by a player, the level determining a paytable associated with the bonus game.

14. The networked gaming system of claim 10, wherein the bonus game is a bingo game.

15. The networked gaming system of claim 10, further comprising a pre-bonus game for providing a rewards level and bonus game eligibility information, wherein the rewards level corresponds to a wagering level of the player, and wherein the bonus game eligibility corresponds to a frequency of a primary game play.

* * * * *

UNITED STATES PATENT AND TRADEMARK OFFICE

CERTIFICATE OF CORRECTION

PATENT NO. : 9,098,964 B2
APPLICATION NO. : 12/264203
DATED : August 4, 2015
INVENTOR(S) : Kelly It is certified that error appears in the above-identified patent and that said Letters Patent is hereby corrected as shown below:

In the specification

Column 10, Line 35, delete “with the” after “operable”

Column 18, Line 23, change “is” to --as--

Signed and Sealed this
Twenty-second Day of December, 2015

Michelle K. Lee
*Director of the United States Patent and Trademark Office*